(12) United States Patent
Sukegawa et al.

(10) Patent No.: US 7,120,278 B2
(45) Date of Patent: Oct. 10, 2006

(54) PERSON RECOGNITION APPARATUS

(75) Inventors: Hiroshi Sukegawa, Yokohama (JP); Kentaro Yokoi, Yokohama (JP); Hironori Dobashi, Tokyo (JP); Jun Ogata, Tokyo (JP); Toshio Sato, Yokohama (JP); Akio Okazaki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 749 days.

(21) Appl. No.: 10/226,329

(22) Filed: Aug. 23, 2002

(65) Prior Publication Data

US 2003/0039380 A1 Feb. 27, 2003

(30) Foreign Application Priority Data

Aug. 24, 2001 (JP) .............................. 2001-254774
Oct. 31, 2001 (JP) .............................. 2001-335842
Nov. 6, 2001 (JP) .............................. 2001-341040

(51) Int. Cl.
*G06K 9/00* (2006.01)

(52) U.S. Cl. ...................... 382/118; 348/152; 382/190; 382/209

(58) Field of Classification Search ................ 382/115, 382/117, 118, 190, 209; 348/143, 152
See application file for complete search history.

(56) References Cited

U.S. PATENT DOCUMENTS 6,345,111 B1 * 2/2002 Yamaguchi et al. ........ 382/118
6,700,998 B1 * 3/2004 Murata ....................... 382/117
2002/0176610 A1 * 11/2002 Okazaki et al. ............. 382/118
2003/0039380 A1 * 2/2003 Sukegawa et al. .......... 382/118
2004/0086157 A1 * 5/2004 Sukegawa ................... 382/115

FOREIGN PATENT DOCUMENTS

| EP | 1291807 A2 * | 3/2003 |
|---|---|---|
| JP | 7-312711 | 5/1996 |
| JP | 11-167632 | 12/1997 |
| JP | 11-191856 | 12/1997 |
| JP | 11-316836 | 5/1998 |
| JP | 10-134188 | 11/1998 |
| JP | 11-175718 | 7/1999 |
| JP | 2001-266153 | 3/2000 |
| WO | WO 91/08555 | 6/1991 |

OTHER PUBLICATIONS

Pentland et al., "Face Recognition for Smart Environments", IEEE, Feb. 2000, pp. 50-55.
Sakano et al., "Presence and Future of Authentication Technique," Information Processing, vol. 41, No. 7, pp. 816-822, Jul. 2000.
Fukui et al., "Face Feature Point Extraction . . . ," Journal of IEICE(D), vol. J80-D-II, No. 8, pp. 2170-2177.
Maeda et al., "Pattern matching method introducing local structure," Journal of IEICE(D), vol. J68-D, No. 3, pp. 345-352.

(Continued)

*Primary Examiner*—Gregory Desire
(74) *Attorney, Agent, or Firm*—Pillsbury Winthrop Shaw Pittman, LLP

(57) ABSTRACT

When authentication data of a person O to be authenticated is registered as dictionary data, this authentication data of the person to be authenticated is acquired and collated with the registered dictionary data. In accordance with the collation result, the dictionary data is updated.

7 Claims, 53 Drawing Sheets

OTHER PUBLICATIONS

U.S. Appl. No. 09/814,012, filed Mar. 22, 2001, Dobashi et al.
U.S. Appl. No. 10/091,569, filed Mar. 7, 2002, Dobashi.
U.S. Appl. No. 10/205,359, filed Jul. 26, 2002, Dobashi.
U.S. Appl. No. 10/153,641, filed May 24, 2002, Okazaki et al.
Rama Chellappa et al., "Human and Machine Recognition of Faces: A Survey," 8078 Proceedings of the IEEE, May 1995, vol. 83, No. 5, pp. 705-740.
Beymer, "Face Recognition Under Varying Pose," Computer Vision and Pattern Recognition, Jun. 21, 1994, pp. 756-761.
Kazunori Okada et al., "Automatic Video Indexing with Incremental Gallery Creation: Integration of Recognition and Knowledge Acquisition," Knowledge-Based Intelligent Information Engineering Systems, 1999. Third International Conference Adelaide, SA, Australia, Aug. 31-Sep. 1, 1999, pp. 431-434.

* cited by examiner

| User ID | IDs to be managed |
|---|---|
| 1 | 2,3,4,8,10 |
| 2 | |
| 3 | 6,7 |
| 4 | 7 |
| ⋮ | ⋮ |

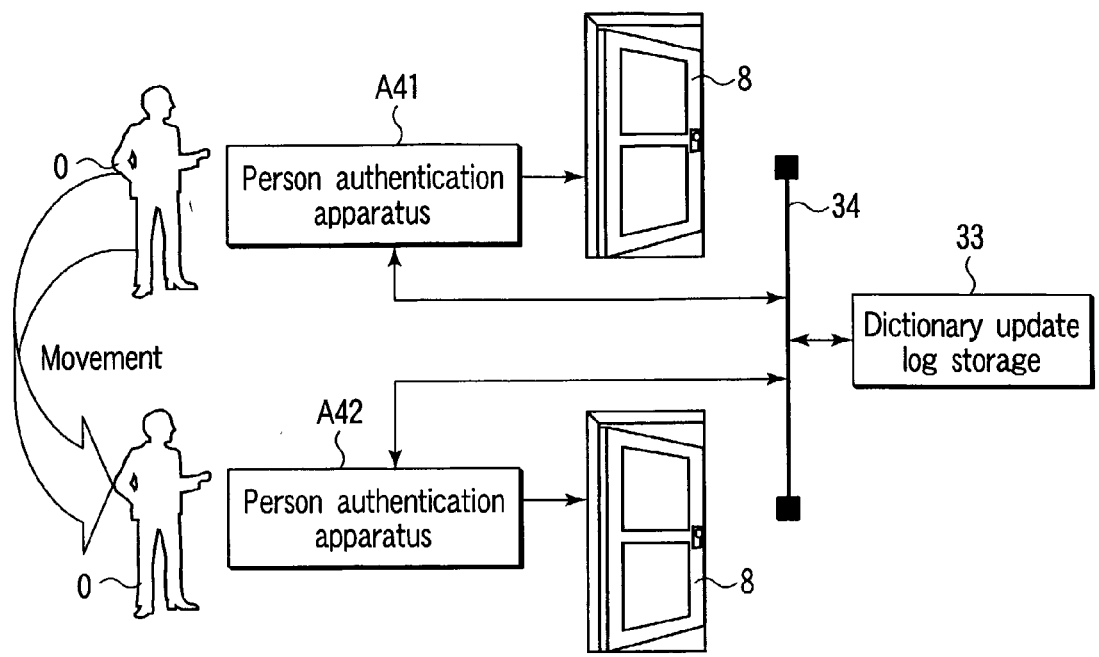
F I G. 14
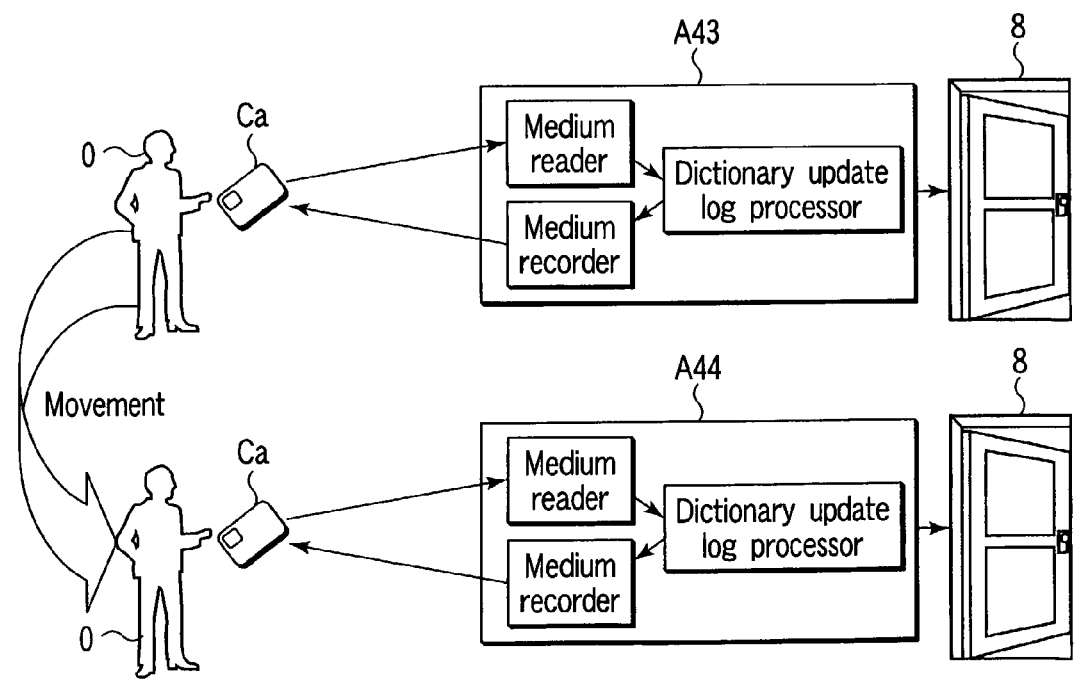
F I G. 15

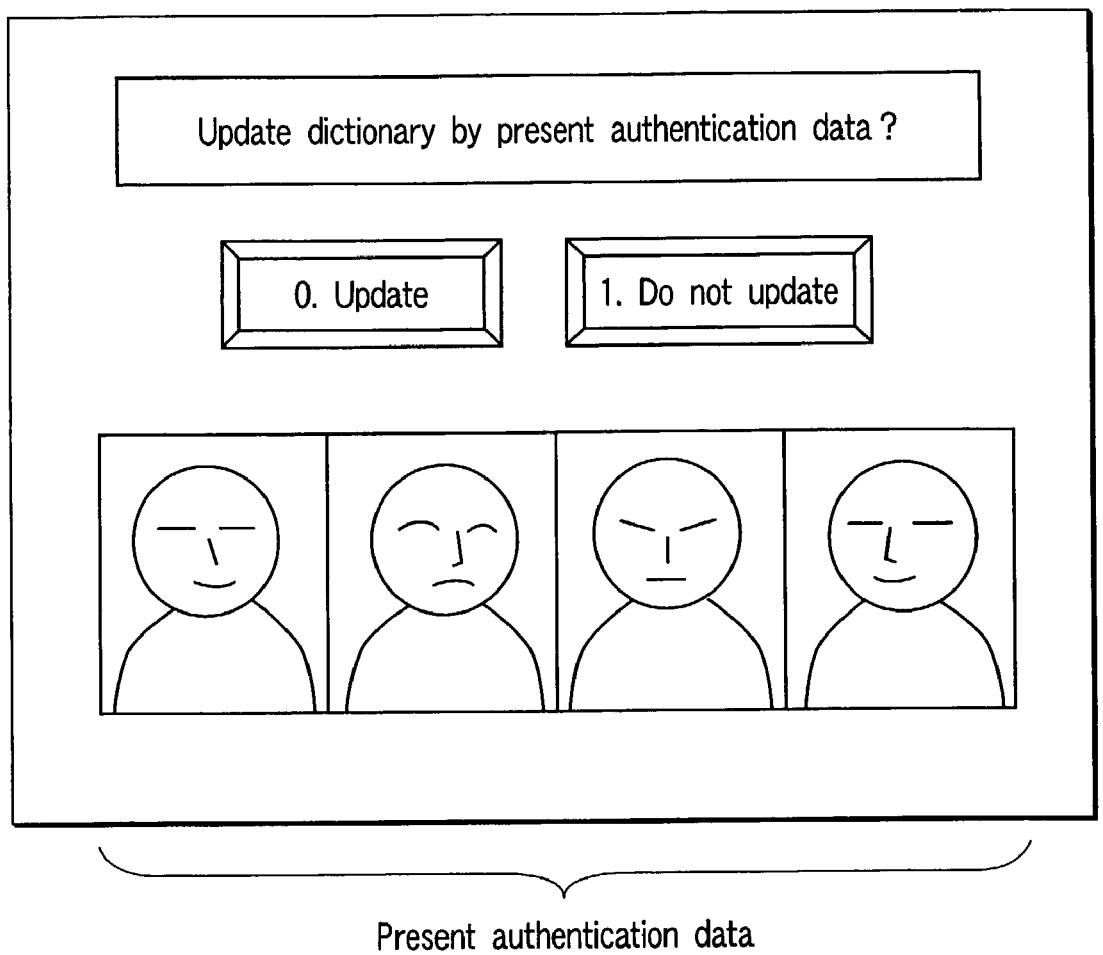
F I G. 18

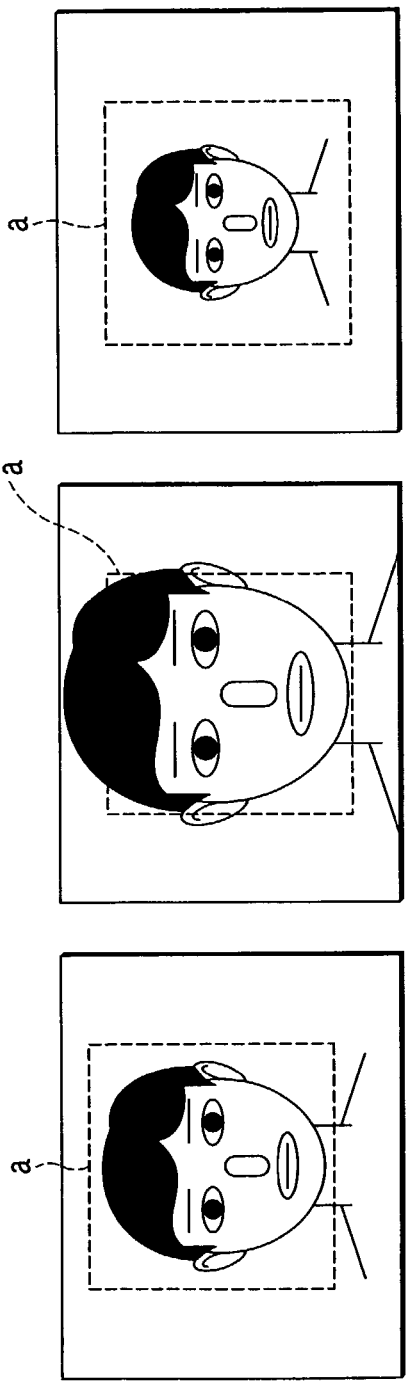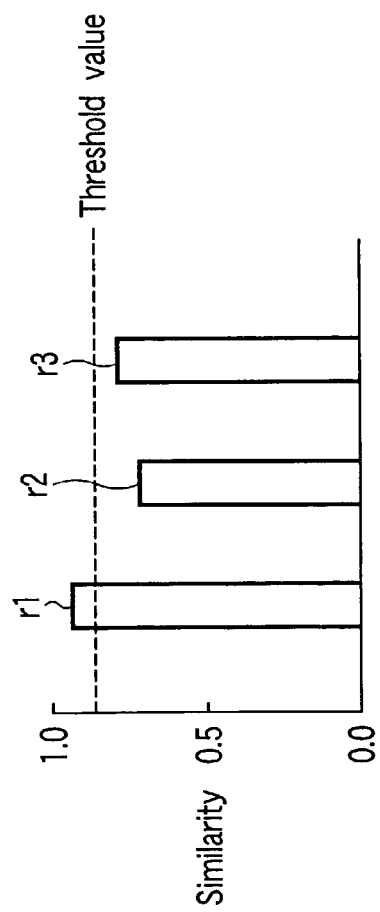
FIG. 26  FIG. 25  FIG. 24  FIG. 27

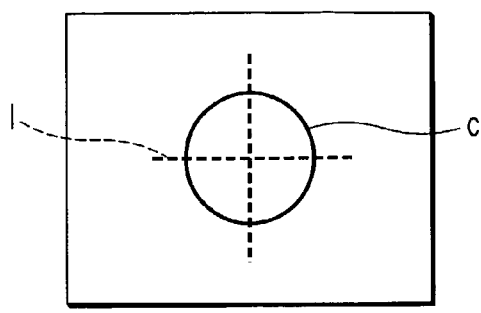
F I G. 37
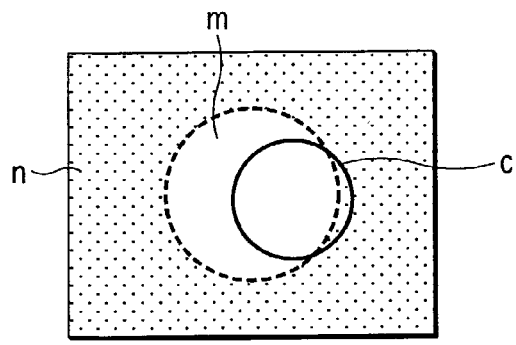
F I G. 38
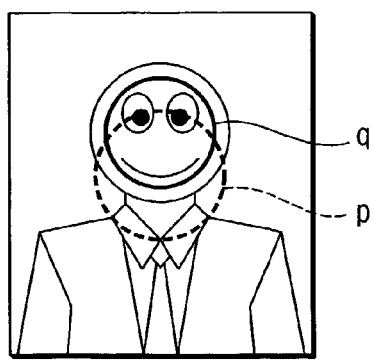
F I G. 39
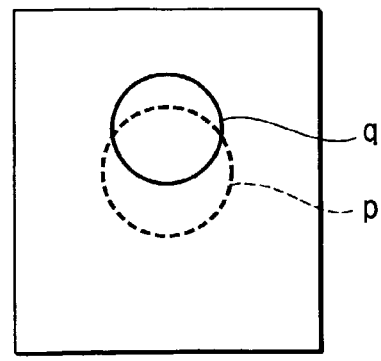
F I G. 40

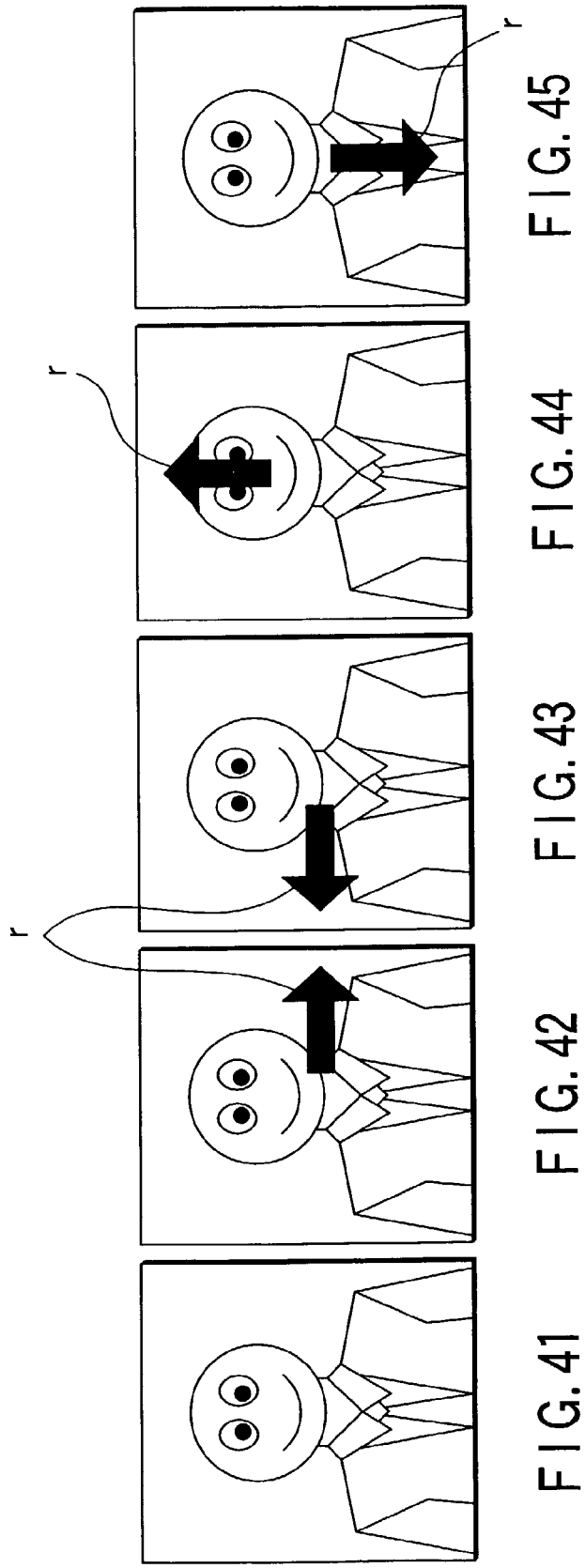

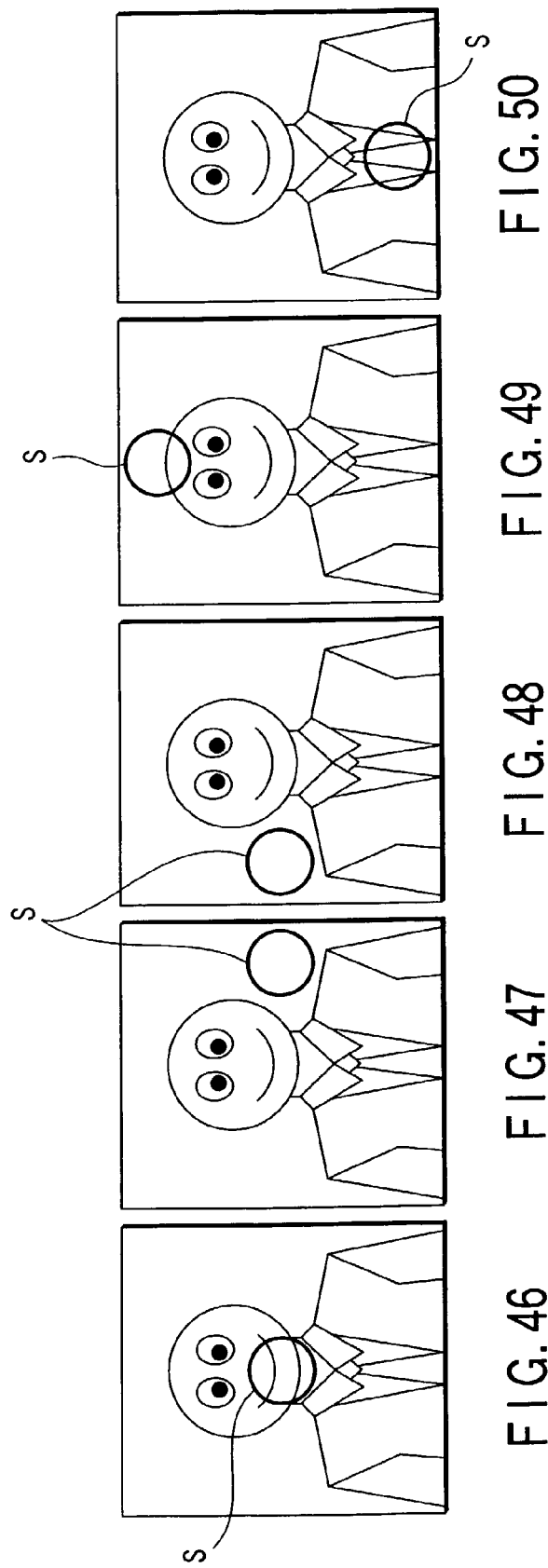

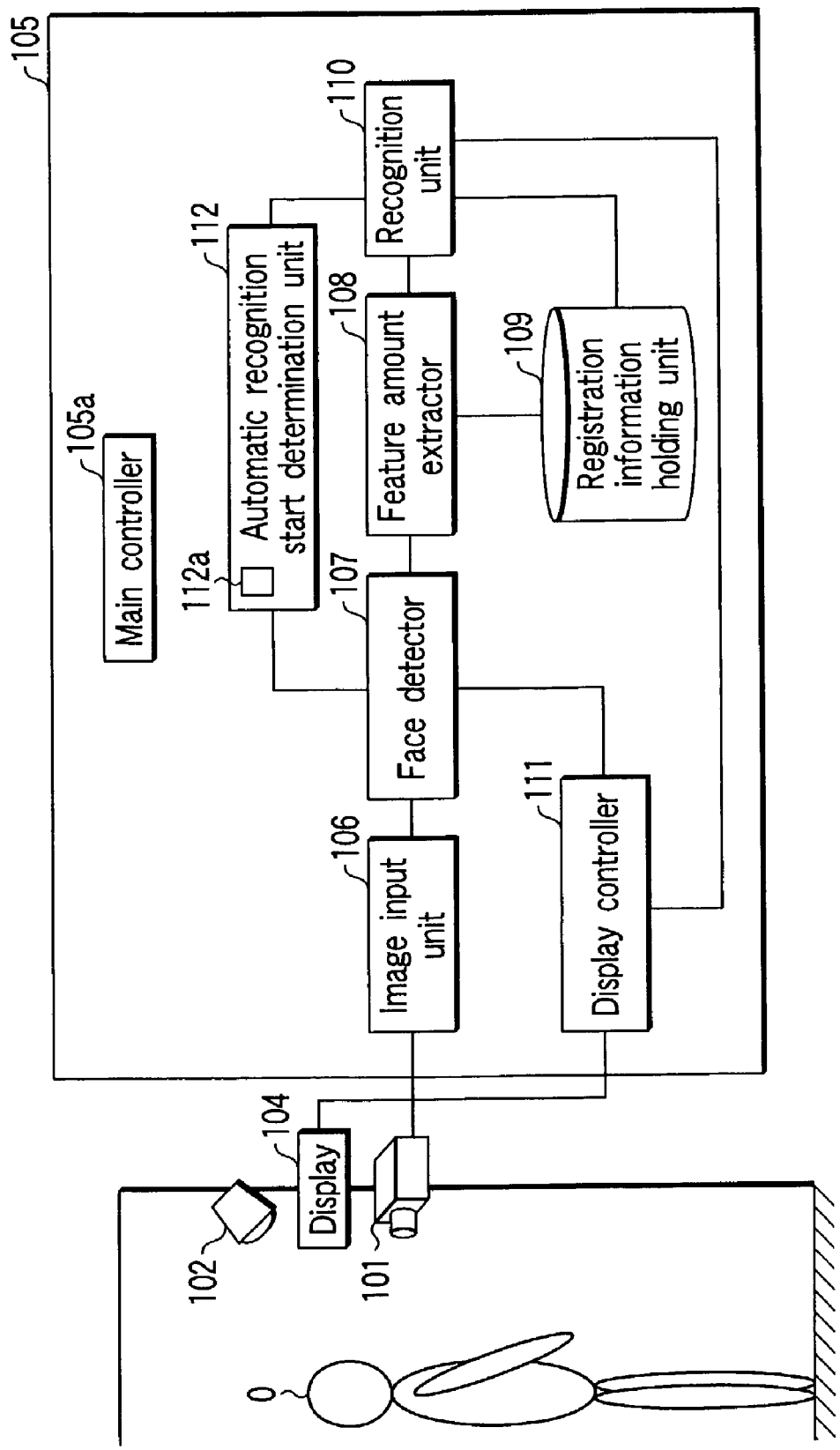
F I G. 51

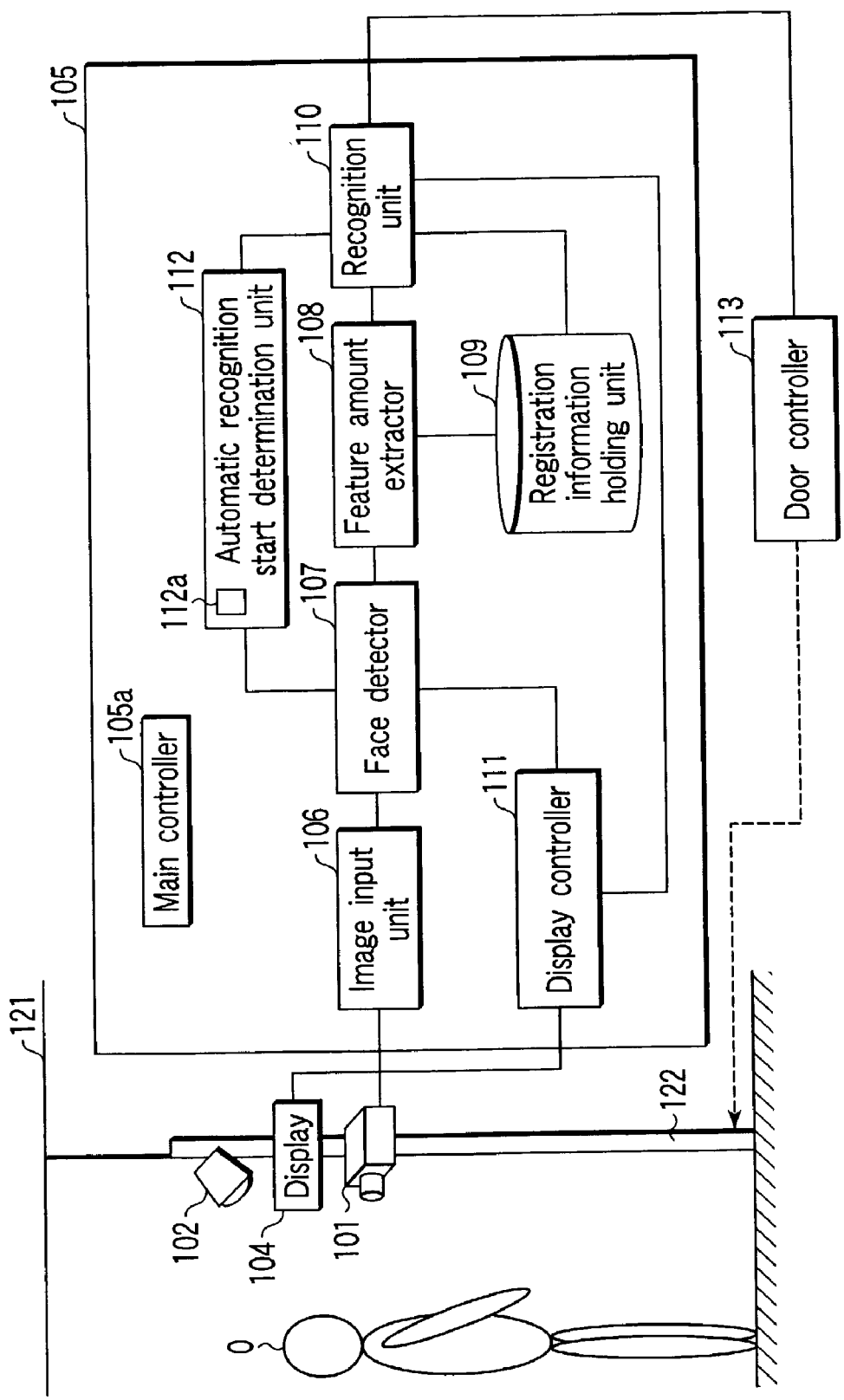
F I G. 54

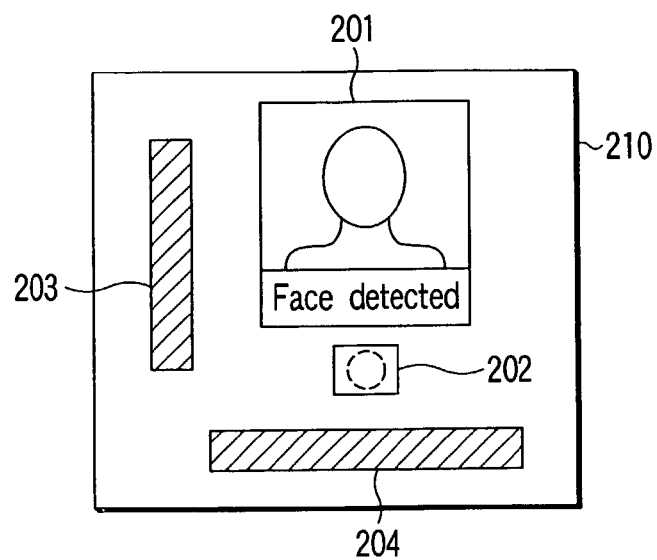
F I G. 55
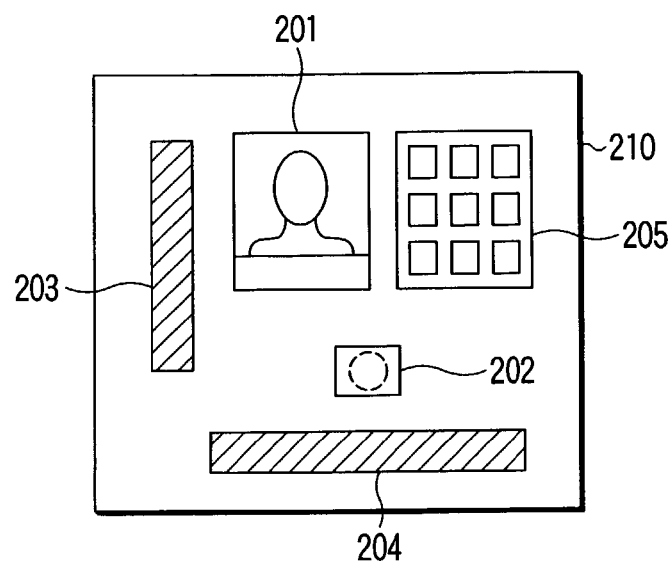
F I G. 56

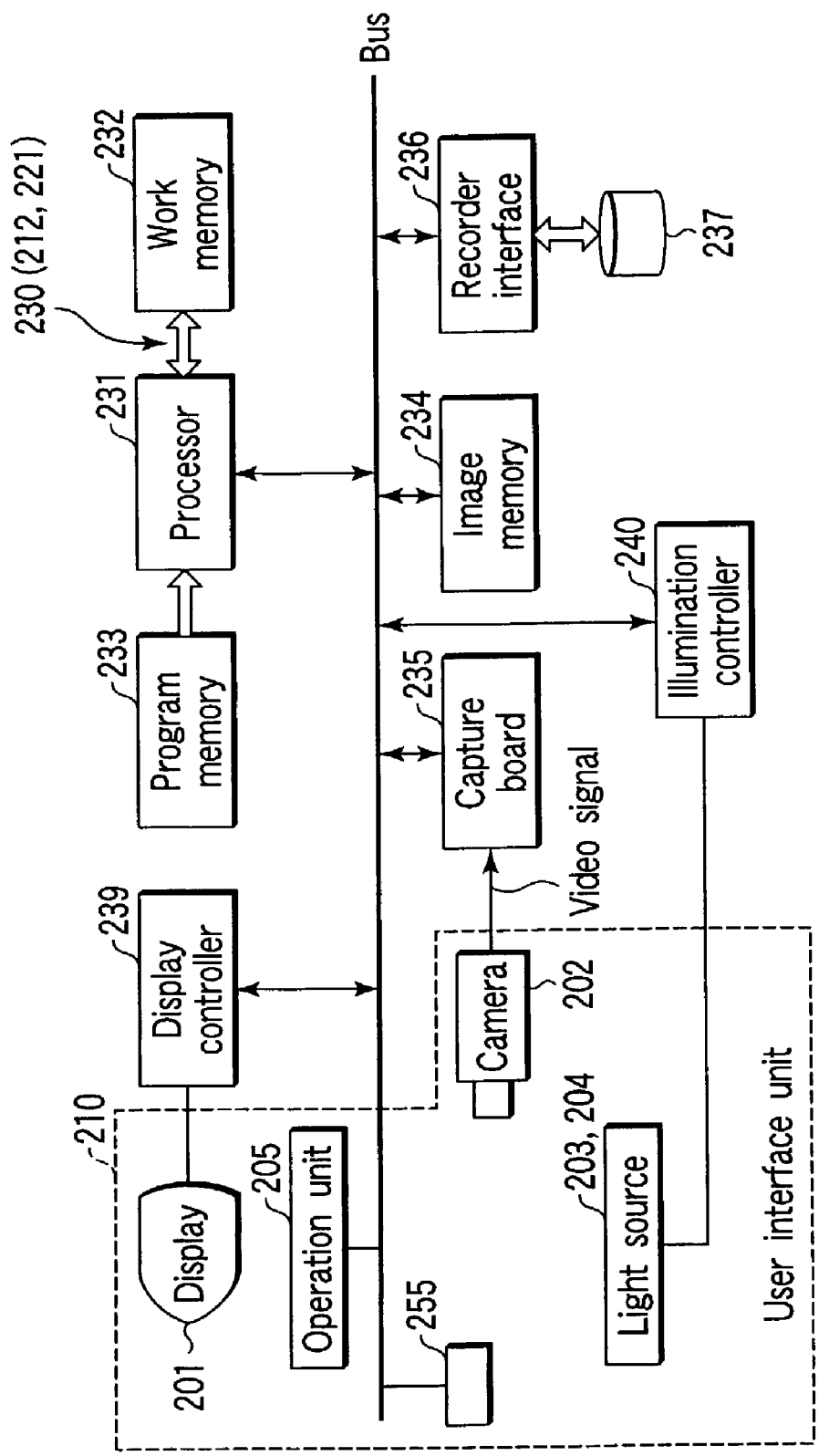
F I G. 60

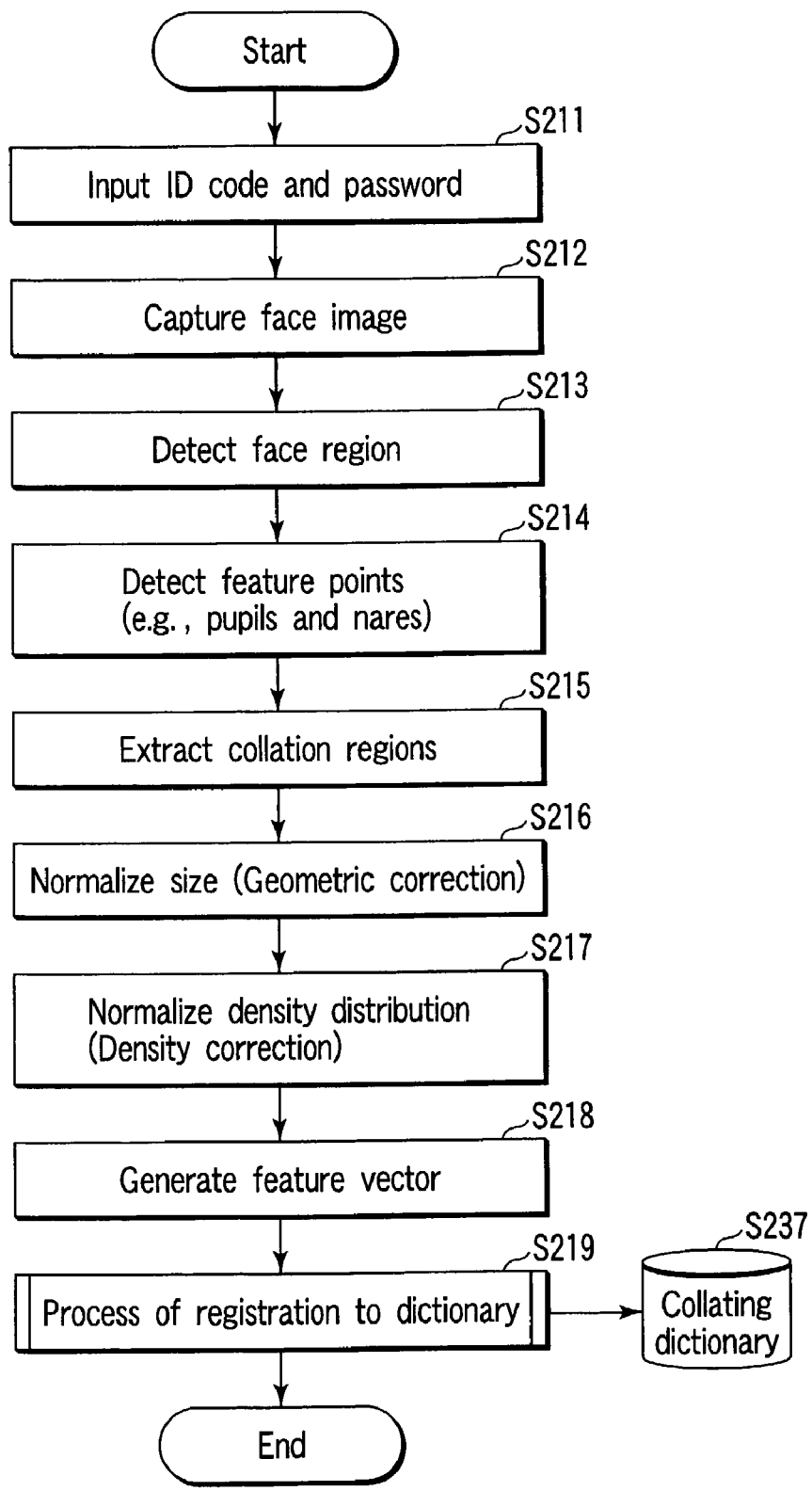
F I G. 61

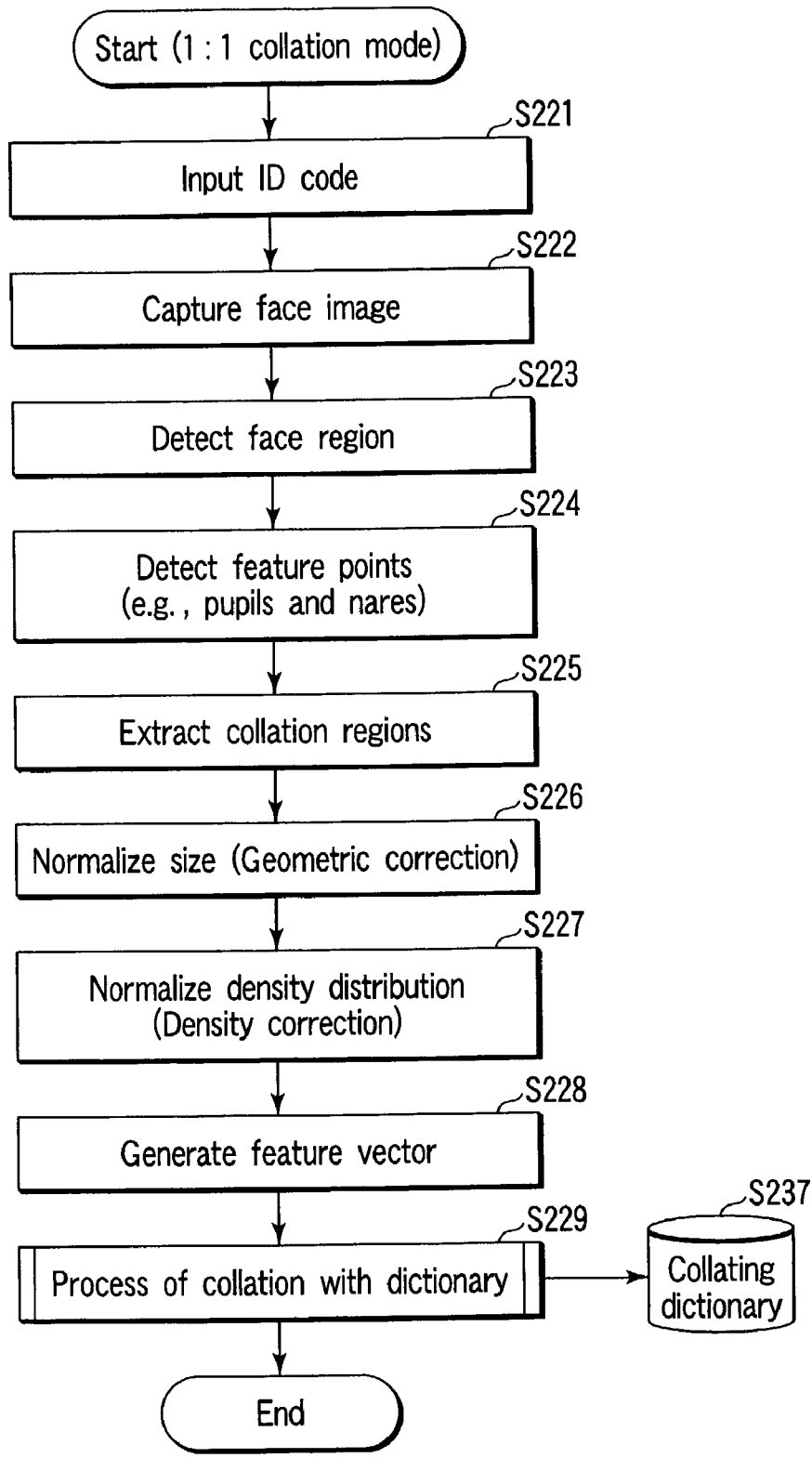
F I G. 62

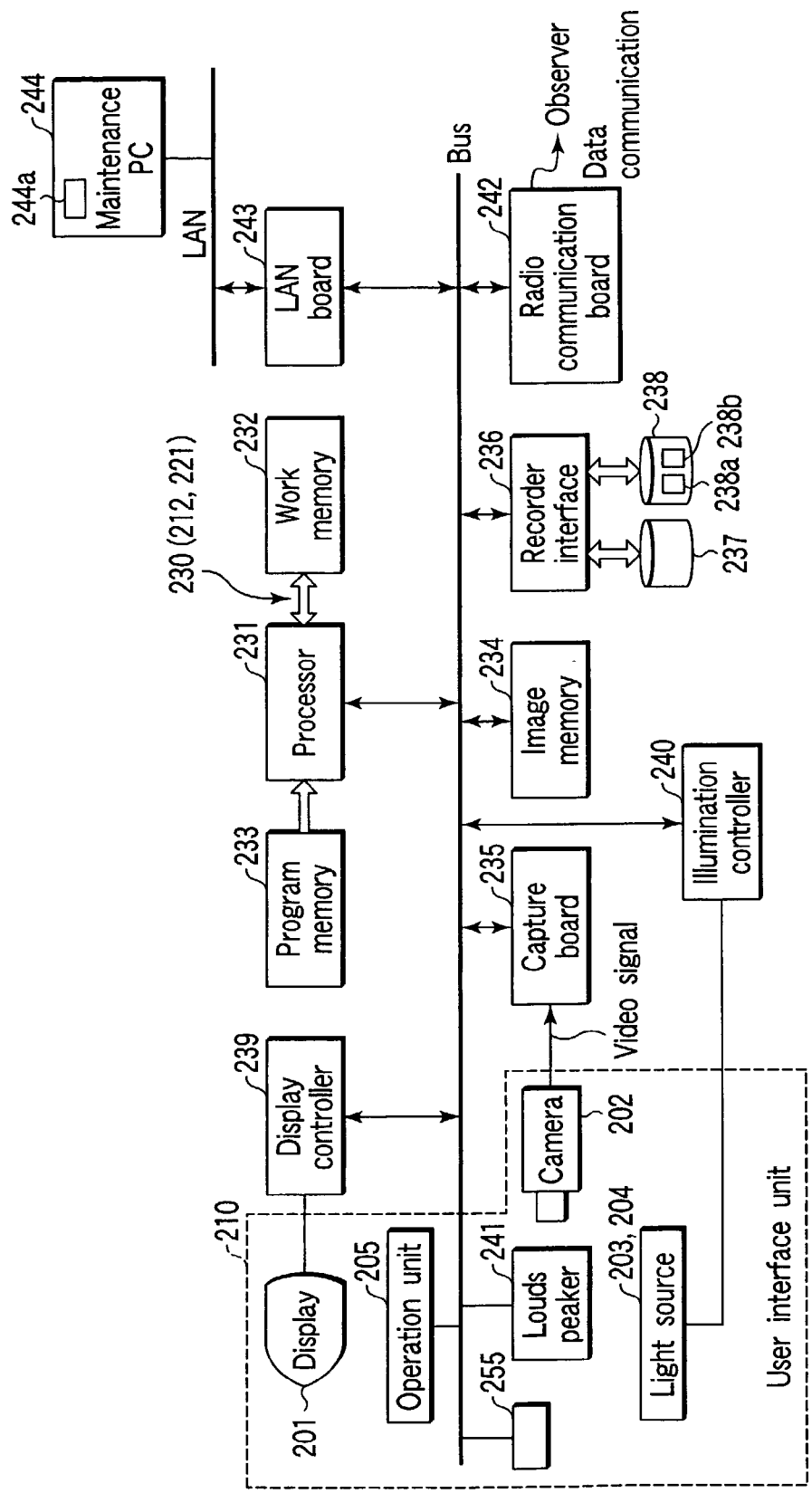
F I G. 72

PERSON RECOGNITION APPARATUS

CROSS-REFERENCE TO RELATED APPLICATIONS

This application is based upon and claims the benefit of priority from the prior Japanese Patent Applications No. 2001-254774, filed Aug. 24, 2001; No. 2001-335842, filed Oct. 31, 2001; and No. 2001-341040, filed Nov. 6, 2001, the entire contents of all of which are incorporated herein by reference.

BACKGROUND OF THE INVENTION

1. Field of the Invention

The present invention relates to a person recognition apparatus for recognizing a person to be authenticated by using authentication data such as a face image, and a gate control apparatus using this person recognition apparatus.

2. Description of the Related Art

Recently, a person recognition apparatus is developed which recognizes a person to be authenticated on the basis of authentication data recorded on a physical medium such as a key, magnetic card, or IC card, or on the basis of biometrical information such as a fingerprint, retina, iris, palm shape, or face image. For example, a person recognition apparatus which authenticates a person by using a face image captures the face image of a person to be authenticated, and collates this face image of the person to be authenticated with a face image stored (to be also referred to as registered hereinafter) in a dictionary beforehand, thereby recognizing the person to be authenticated.

This person recognition apparatus includes a dictionary storage which stores a dictionary for authentication, and recognizes a person to be authenticated by using the dictionary in this dictionary storage. This conventional person recognition apparatus acquires a plurality of authentication data from a person to be authenticated, forms dictionary data to be registered on the basis of these authentication data, and registers the formed dictionary data into the dictionary. Therefore, when registering the dictionary, a person to be authenticated inputs authentication data as dictionary data a plurality of number of times. Also, dictionary data registered in the dictionary is updated in accordance with an instruction by the manager or a person to be authenticated.

As described above, the conventional person recognition apparatus makes the user sometimes feel complexity when he or she registers or updates the dictionary.

Additionally, the conventional person recognition apparatus sometimes lowers its person recognition rate depending on the condition of a person to be authenticated, e.g., the standing position or posture of the person. For example, Jpn. Pat. Appln. KOKAI Publication No. 11-316836 or 11-191856 proposes a technique to reduce this lowering of the person recognition rate depending on the condition of a person to be authenticated.

Jpn. Pat. Appln. KOKAI Publication No. 11-316836 discloses a technique by which the direction of a camera for photographing a person to be authenticated is changed when the direction of a person during recognition is different from the direction of that person registered beforehand. Jpn. Pat. Appln. KOKAI Publication No. 11-191856 discloses a technique which guides the eyes of a person to be authenticated toward a predetermined position.

In the method described in Jpn. Pat. Appln. KOKAI Publication No. 11-316836 or 11-191856, however, it is necessary to additionally install a control circuit for controlling the direction of the camera for photographing a person to be authenticated, or an eye guiding device which guides the eyes of a person to be authenticated.

Furthermore, the conventional person recognition apparatus using face images is in some instances used by a plurality of users having similar faces such as twins and brothers. Also, a plurality of dictionary data may be required for a single person depending on the use/nonuse of glasses and the like. When the amount of dictionary data registered in the dictionary thus increases, the time of authentication increases and the recognition rate lowers in some cases.

BRIEF SUMMARY OF THE INVENTION

It is an object of the present invention to provide a person recognition apparatus capable of safely updating a dictionary without making a user feel any complexity in dictionary registration and update.

It is another object of the present invention to provide a person recognition apparatus and gate control apparatus capable of stable recognition with high accuracy.

It is still another object of the present invention to provide a face image collating apparatus, face image collating system, and face image collating method which is highly convenient for users and can improve the authentication accuracy and security level.

A person recognition apparatus having an authentication data input unit which acquires authentication data, and a dictionary storage which stores dictionary data for authentication, the person recognition apparatus authenticating a person to be authenticated on the basis of authentication data acquired from the person by the authentication data input unit and the dictionary data stored in the dictionary storage, comprising: a dictionary formation unit which forms new dictionary data for authentication on the basis of authentication data acquired by the authentication data input unit; an authenticator which, after the dictionary data is formed by the dictionary formation unit, reacquires authentication data by the authentication data input unit, and collates the reacquired authentication data from the authentication data input unit with the dictionary data formed by the dictionary formation unit; and a dictionary updating unit which, in a case where the collation by the authenticator is successful, updates the dictionary data by using the authentication data acquired by the authentication data input unit after the dictionary data is formed by the dictionary formation unit.

A person recognition apparatus having an authentication data input unit which acquires authentication data, a dictionary storage which stores dictionary data for authentication, and an authenticator which authenticates a person to be authenticated on the basis of authentication data acquired from the person by the authentication data input unit and the dictionary data stored in the dictionary storage, comprising: a determination unit which, in a case where the person to be authenticated is authenticated by the authenticator, determines whether to update dictionary data stored in the dictionary storage; a dictionary updating unit which updates the dictionary data found to be updated by the determination unit, on the basis of the authentication data acquired by the authentication data input unit; a dictionary update log storage which stores a dictionary update log indicating contents of the dictionary data updated by the dictionary updating unit; and a display which, in a case where the person to be authenticated is authenticated by the authenticator, displays the authentication result and a dictionary update log of the last dictionary update stored in the dictionary update log storage.

A person recognition apparatus for recognizing a person by a face image, comprising: an image input unit which inputs an image containing at least the face of a person; a face detector which detects the region of the face of the person from the image input by the image input unit; a feature amount extractor which extracts a feature amount of the face of the person on the basis of the detection result from the face detector; a registration information holding unit which, when an image to be registered is input by the image input unit, holds as registration information of the person a feature amount extracted by the feature amount extractor; a recognition unit which, when an image to be recognized is input by the image input unit, recognizes the person to be authenticated by collating a feature amount extracted by the feature amount extractor with registration information held in the registration information holding unit; and a display which, when the recognition unit is to perform a recognizing process, displays, on the same screen, information indicating the state of the face in the image to be recognized and information indicating the state of the face in the registration information which is held in the registration information holding unit and is to be collated with the image to be recognized.

A person recognition apparatus for recognizing a person by a face image, comprising: an image input unit which inputs an image containing at least the face of a person; a face detector which detects the region of the face of the person from the image input by the image input unit; a feature amount extractor which extracts a feature amount of the face of the person on the basis of the detection result from the face detector; a registration information holding unit which, when an image to be registered is input by the image input unit, holds as registration information of the person a feature amount extracted by the feature amount extractor; a recognition unit which, when an image to be recognized is input by the image input unit, recognizes the person to be authenticated by collating a feature amount extracted by the feature amount extractor with registration information held in the registration information holding unit; and a display which, when an image to be registered is to be input by the image input unit, displays, on the same screen, guidance information indicating conditions under which the image to be registered is to be input, and information indicating the state of a face in the image being input by the image input unit.

A person recognition apparatus for recognizing a person by a face image, comprising: an image input unit which inputs an image containing at least the face of a person; a face detector which detects the region of the face of the person from the image input by the image input unit; a feature amount extractor which extracts a feature amount of the face of the person on the basis of the detection result from the face detector; a registration information holding unit which, when an image to be registered is input by the image input unit, holds as registration information of the person a feature amount extracted by the feature amount extractor; a determination unit which continuously inputs an image by the image input unit, and determines whether a person to be authenticated exists on the basis of a change with time in the region of the face detected by the face detector; and a recognition unit which, in a case where the determination unit determines that a person to be authenticated exists, recognizes the person to be authenticated by collating a feature amount extracted by the feature amount extractor from the image input by the image input unit with registration information held in the registration information holding unit.

A person recognition apparatus for recognizing a person by a face image, comprising: a storage unit which stores face images of users in one-to-one correspondence with identification information given to these users, and which also stores, for a face image having a similar face image, information indicating the existence of the similar face image; an input unit which inputs identification information of a user; a photographing unit which photographs a face image of the user corresponding to the identification information input by the input unit; a first face collator which, in a case where information indicating the existence of a face image similar to a face image corresponding to the identification information input by the input unit is not stored in the storage unit, collates the face image photographed by the photographing unit with the face image stored in the storage unit and corresponding to the identification information input by the input unit; and a second face collator which, in a case where information indicating the existence of a face image similar to a face image corresponding to the identification information input by the input unit is stored in the storage unit, collates, by a collating process different from the process performed by the first face collator, the face image photographed by the photographing unit with the face image stored in the storage unit and corresponding to the identification information input by the input unit.

A person recognition apparatus for recognizing a person by a face image, comprising: a storage unit which stores face images of users in one-to-one correspondence with identification information; a determination unit which determines degrees of collation between a face image to be stored in the storage unit and other face images already stored in the storage unit; a setting unit which sets a threshold value for the face image to be stored in the storage unit, on the basis of those degrees of collation between that face image and the other face images, which are determined by the determination unit; an input unit which inputs identification information of a user; a photographing unit which photographs a face image of the user corresponding to the identification information input by the input unit; and a face collator which performs a collating process for determining whether collation is successful or unsuccessful by checking whether the degree of collation between the face image of the user photographed by the photographing unit and a face image registered in the storage unit and corresponding to the identification information input by the input unit is not less than the threshold value set by the setting unit.

A person recognition apparatus for recognizing a person by a face image, comprising: a storage unit which stores face images of users in one-to-one correspondence with identification information given to the users; a registration unit which stores in the storage unit another face image of a user whose face image is stored in the storage unit, in one-to-one correspondence with additional information corresponding to each face image of the user and with identification information of the user; an input unit which inputs identification information and additional information of a user; a photographing unit which photographs a face image of the user corresponding to the identification information input by the input unit; and a face collator which collates a face image corresponding to the identification information and additional information input by the input unit with the face image photographed by the photographing unit.

A person recognition apparatus for recognizing a person by a face image, comprising: a storage unit which stores face images of users in one-to-one correspondence with identification information given to the users; a registration unit which stores in the storage unit another face image of a user whose face image is stored in the storage unit, in one-to-one correspondence with additional information corresponding to each face image of the user and with identification information of the user, and which sets a default face image of face images of a user corresponding to each identification information; an input unit which inputs at least identification information; a photographing unit which photographs a face image of a user corresponding to the identification information input by the input unit; a first face collator which, in a case where additional information is input in addition to the identification information by the input unit, collates a face image corresponding to the identification information and additional information input by the input unit with the face image photographed by the photographing unit; and a second face collator which, in a case where only the identification information is input by the input unit, collates a face image set as a default face image corresponding to the identification information input by the input unit with the face image photographed by the photographing unit.

A person recognition apparatus for recognizing a person by a face image, comprising: a first storage unit which stores a face image of a user; a second storage unit which stores information indicating a user present in a predetermined region; a photographing unit which photographs a face image of a user entering the predetermined region; a face collator which, when a face image is photographed by the photographing unit, specifies a person present in the predetermined region on the basis of stored contents of the second storage unit, and collates the face image photographed by the photographing unit with a face image stored in the first storage unit and other than that of the user stored in the second storage unit; a permitting unit which, in a case where it is found by the face collator that the face image photographed by the photographing unit matches the face image other than that of the user present in the predetermined region, permits entrance of the person whose face image is photographed by the photographing unit; and a rejecting unit which, in a case where it is found by the face collator that the face image photographed by the photographing unit does not match the face image other than that of the user present in the predetermined region, rejects entrance of the person whose face image is photographed by the photographing unit.

A person recognition apparatus for recognizing a person by a face image, comprising: a storage unit which stores face images of users in one-to-one correspondence with identification information given to the users; a photographing unit which photographs a face image of a user; a sensor which senses existence of a user photographable by the photographing unit; a first face collator which, in a case where the existence of a user is sensed by the sensor, causes the photographing unit to photograph a face image of the user, and collates the photographed face image with all the face images stored in the storage unit; an input unit which inputs identification information of a user; and a second face collator which, in a case where identification information is input by the input unit while the first face collator is executing a collating process, interrupts the collating process by the first face collator, and collates the face image photographed by the photographing unit with a face image corresponding to the identification information input by the input unit.

A person recognition system having a face image collating apparatus which photographs a user's face image and collates the photographed face image with a face image stored beforehand in a collating dictionary, a server apparatus connected to the face image collating apparatus, and an information terminal connectable to the server apparatus, wherein the information terminal comprises: a photographing unit which photographs a user's face image; a personal dictionary formation unit which forms a personal dictionary on the basis of the face image photographed by the photographing unit; and a transmitter which transmits the personal dictionary formed by the personal dictionary formation unit to the server apparatus, and the server apparatus comprises a collating dictionary formation unit which receives the personal dictionary transmitted from the information terminal, and forms a dictionary for use in the face image collating apparatus by integrating personal dictionaries transmitted from a plurality of information terminals.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate an embodiment of the invention, and together with the generation description given above and the detailed description of the embodiment given below, serve to explain the principles of the invention.

FIG. 14 is a view showing the configuration of a person authentication system comprising a plurality of person recognition apparatuses connected by a network and the like;

FIG. 15 is a view showing the configuration of a person authentication system comprising a plurality of person recognition apparatuses to which the fourth embodiment is applied;

FIG. 18 is a view showing a display example of a dictionary update selecting window in the fifth embodiment;

FIGS. 24 to 26 are views showing display examples of the condition of a face upon registration and an input image;

FIG. 27 is a graph showing the relationship between the similarity to an input image and a threshold value;

FIGS. 28 to 50 are views showing display examples on a display;

FIG. 51 is a block diagram schematically showing the arrangement of a person recognition apparatus according to the ninth embodiment of the present invention;

FIG. 54 is a block diagram schematically showing the arrangement of a gate control apparatus according to the 11th embodiment;

FIGS. 55 and 56 are front views showing examples of the external appearances of user interface units of face image collating apparatuses according to the 12th to 17th embodiments;

FIG. 60 is a block diagram showing the whole configuration of a control system of the face image collating apparatus;

FIG. 61 is a flow chart showing the flow of face image registration performed by a processor;

FIG. 62 is a flow chart for explaining face image collation performed by the processor;

FIG. 72 is a view schematically showing the arrangement of a face image collating apparatus according to the 14th embodiment;

DETAILED DESCRIPTION OF THE INVENTION

Embodiments of the present invention will be described in detail below with reference to the accompanying drawing.

First, the first embodiment will be explained.

Figure 1:
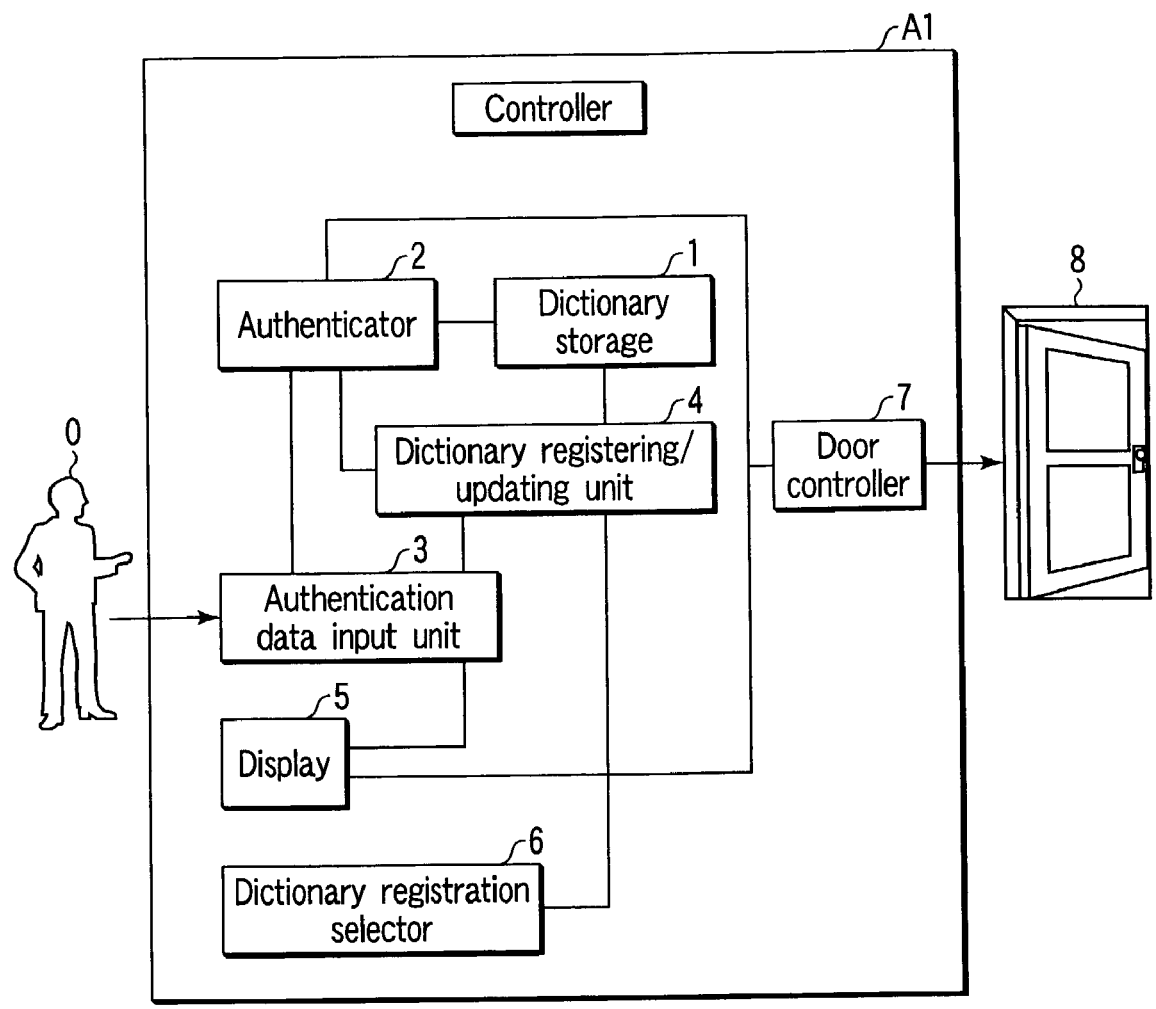
FIG. 1 is block diagram schematically showing the arrangement of a person recognition apparatus according to the first embodiment.

FIG. 1 schematically shows the arrangement of a person recognition apparatus (person authentication apparatus) A1 according to the first embodiment. This person recognition apparatus A1 performs authentication to check whether a person O to be authenticated is the person himself or herself, and, on the basis of this authentication result, performs doorway monitoring of a building or room which gives importance to security. As shown in FIG. 1, this person authentication apparatus A1 comprises a controller, dictionary storage 1, authenticator 2, authentication data input unit 3, dictionary registering/updating unit 4, display 5, dictionary registration selector 6, door 8, and door controller 7.

The controller controls the whole person recognition apparatus by controlling the operation of each unit. The dictionary storage 1 stores data as a dictionary for authentication. This dictionary storage 1 is a storage device such as a hard disk device. The authenticator 2 performs authentication to check whether the person O to be authenticated is the person himself or herself, on the basis of authentication data obtained from the person O and data registered in the dictionary of the dictionary storage 1.

The authentication data described above can be data recorded on a physical medium or biometrical data obtainable from the person O to be authenticated. For example, when data recorded on a physical medium is to be used as the authentication data, the authentication data of each person O to be authenticated is recorded on a key, magnetic card, or IC card of this person O. When biometrical information is to be used as the authentication data, biometrical information as a physical feature amount such as a fingerprint, retina, iris, palm shape, or face image is obtained from each person O to be authenticated as the authentication data of that person O. The authenticator 2 includes a CPU and a memory storing control programs.

The authentication data input unit 3 obtains authentication data and dictionary data from the person O to be authenticated. This authentication data input unit 3 is an input device corresponding to the authentication data obtained from the person O. For example, when a face image is to be used as the authentication data, the authentication data input unit 3 comprises a camera for photographing an image and an image interface which captures the image photographed by the camera. The dictionary registering/updating unit 4 forms, registers, and updates the dictionary. The display 5 displays the input data, authentication result, and the like to the person O to be authenticated. This display 5 is a display device or the like.

The dictionary registration selector 6 allows the person O to be authenticated to check the appropriateness of data displayed on the display 5, and select whether to register the data into the dictionary. This dictionary registration selector 6 includes, e.g., a ten-key pad or touch panel. The door controller 7 controls opening/closure of the door 8 of a room as an object of doorway monitoring on the basis of the authentication result from the authenticator 2.

Figure 2:
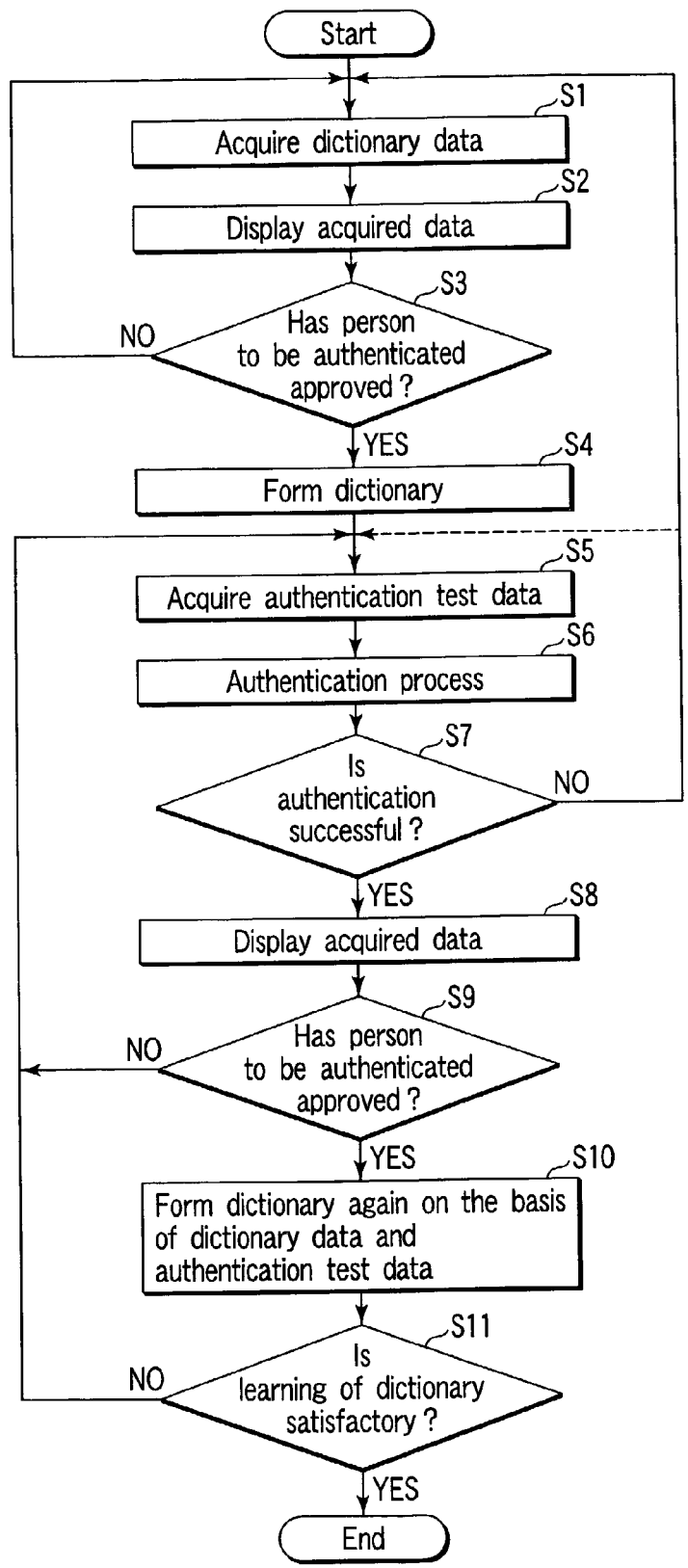
FIG. 2 is a flow chart for explaining the flow of a dictionary registration process by the person recognition apparatus according to the first embodiment.

A dictionary registration process by the person recognition apparatus A1 configured as above will be described below with reference to a flow chart shown in FIG. 2.

First, the authentication data input unit 3 obtains data (dictionary data) Data-dic to be registered in the dictionary, from the person O to be authenticated (step S1). This dictionary data Data-dic is, e.g., fingerprint data of the person O if the authenticator 2 performs person authentication by using a fingerprint, voiceprint data of the person O if the authenticator 2 performs person authentication by using a voiceprint, signature data of the person O if the authenticator 2 performs person authentication by using a signature, and face image data of the person O if the authenticator 2 performs person authentication by using a face image. The dictionary data Data-dic input from the authentication data input unit 3 is displayed on the display 5 (step S2).

If the dictionary data Data-dic is face image data, the person O to be authenticated checks the appropriateness of the input dictionary data Data-dic on the basis of the face image as the dictionary data Data-dic displayed on the display 5. For example, if the dictionary data Data-dic is face image data, the person O to be authenticated can easily check, from the face image displayed on the display 5, the accuracy of a face extraction position and the appropriateness of a face direction, expression, and illumination.

If determining in step S3 that the dictionary data Data-dic displayed on the display 5 is inappropriate, the person O instructs the dictionary registration selector 6 not to select registration of this dictionary data Data-dic. If the dictionary registration selector 6 is thus instructed not to select registration, the authentication data input unit 3 returns to step S1 to perform the dictionary data Data-dic acquisition process again.

If determining in step S3 that the dictionary data Data-dic displayed on the display 5 is appropriate, the person O instructs the dictionary registration selector 6 to select registration of this dictionary data Data-dic. If the dictionary registration selector 6 is thus instructed to select registration, the dictionary registering/updating unit 4 forms a dictionary Dic1 on the basis of the dictionary data Data-dic obtained from the authentication data input unit 3, and stores (registers) the formed dictionary Dic1 into the dictionary storage 1 (step S4).

When the new dictionary Dic1 is thus registered in the dictionary storage 1, the person authentication apparatus A1 prompts the person O to be authenticated to conduct an authentication test (trial of authentication), thereby checking whether the registered dictionary Dic1 is proper.

That is, the authentication data input unit 3 acquires authentication data (authentication test data) Data-test from the person O to be authenticated (step S5). This authentication test data Data-test obtained by the authentication data input unit 3 is supplied to the authenticator 2. The authenticator 2 performs a collating process (authentication process) for collating the authentication data from the authentication data input unit 3 with the dictionary Dic1 in the dictionary storage 1 (step S6). On the basis of the collation result obtained by this collating process, the authenticator 2 determines whether the person O to be authenticated is the person himself or herself (step S7).

If in step S7 the person O cannot be authenticated as the person himself or herself, the authenticator 2 determines that the quality of the authentication test data Data-test obtained from the authentication data input unit 3 or of the dictionary data Data-dic is unsatisfactory. That is, if the person O cannot be authenticated as the person himself or herself, the authenticator 2 performs the dictionary data acquisition process in step S1 or the authentication test data acquisition process in step S5 again.

If the person O is authenticated as the person himself or herself in steps 6 and 7, the authenticator 2 determines that the qualities of the dictionary data Data-dic obtained from the authentication data input unit 3 and the authentication test data Data-test are satisfactory. Also, if the person O is authenticated as the person himself or herself, the display 5 displays the authentication test data Data-test input from the authentication data input unit 3 as in step S2 described above (step S8).

If determining in step S9 that the authentication test data Data-test displayed on the display 5 is inappropriate, the person O to be authenticated instructs the dictionary registration selector 6 not to select reregistration of this authentication test data Data-test into the dictionary storage 1. If the dictionary registration selector 6 is thus instructed not to select reregistration of the authentication test data Data-test, the dictionary registering/updating unit 4 returns to step S5 to perform the process of acquiring the authentication test data Data-test from the authentication data input unit 3 again.

If determining in step S9 that the authentication test data Data-test displayed on the display 5 is appropriate, the person O instructs the dictionary registration selector 6 to select reregistration of this authentication test data Data-test into the dictionary storage 1. If the dictionary registration selector 6 is thus instructed to select reregistration of the authentication test data Data-test, the dictionary registering/updating unit 4 forms a new dictionary Dic2 by using the dictionary data Data-dic already stored as the dictionary Dic1 in the dictionary storage 1 and the authentication test data Data-test (step S10), and stores this dictionary Dic2 in the dictionary storage 1.

After registering the dictionary Dic2 into the dictionary storage 1, the dictionary registering/updating unit 4 checks whether this dictionary Dic2 stored in the dictionary storage 1 is a well-learned dictionary (formal dictionary). Whether the dictionary is a formal one is determined by checking whether the amount of data (authentication test data Data-test) used in learning of the dictionary exceeds a predetermined threshold value. Alternatively, whether the dictionary is a formal one can be determined by checking whether the collation degree (score) calculated by the collating process in step S6 exceeds a predetermined threshold value.

If the dictionary registered in the dictionary storage 1 is found to be a formal dictionary by the above determination (YES in step S11), the person recognition apparatus A completes the dictionary registration process. If the dictionary registered in the dictionary storage 1 is not found to be a formal dictionary by the above determination (NO in step S11), the dictionary registering/updating unit 4 returns to step S5 to perform the authentication test data Data-test acquisition process by the authentication data input unit 3 again. By the processes in steps S5 to S11 described above, the dictionary registering/updating unit 4 performs sufficient dictionary learning until a dictionary found to be a formal one is registered in the dictionary storage.

In the dictionary registration process as described above, a dictionary is first formed by loading dictionary data, and authentication test data is repetitively acquired until a sufficient learning process is completely performed for the dictionary. In dictionary registration, therefore, the person O to be authenticated can realize the dictionary data registration, authentication test, and dictionary learning only by inputting authentication data. That is, during this dictionary registration, the process such as the authentication test or dictionary learning can be executed without the person O knowing it. This reduces the troublesome of the dictionary registration work for the person O to be authenticated. Also, since dictionary learning is performed using the large amount of authentication test data in dictionary registration, it is possible to form and register a dictionary including many variations and having high authentication accuracy.

In the first embodiment as described above, when dictionary data is initially registered, an authentication test for checking whether authentication can be accurately performed can be performed without a person to be authenticated knowing it. Also, when dictionary data is initially registered, learning data of a dictionary can be acquired. This reduces the operation of obtaining sample data as learning data. Furthermore, a person to be authenticated is unaware of the dictionary registration operation such as the authentication test. This can reduce the complexity of the operation in the initial stages of installation of the person recognition apparatus.

The second embodiment will be explained below.

Figure 3:
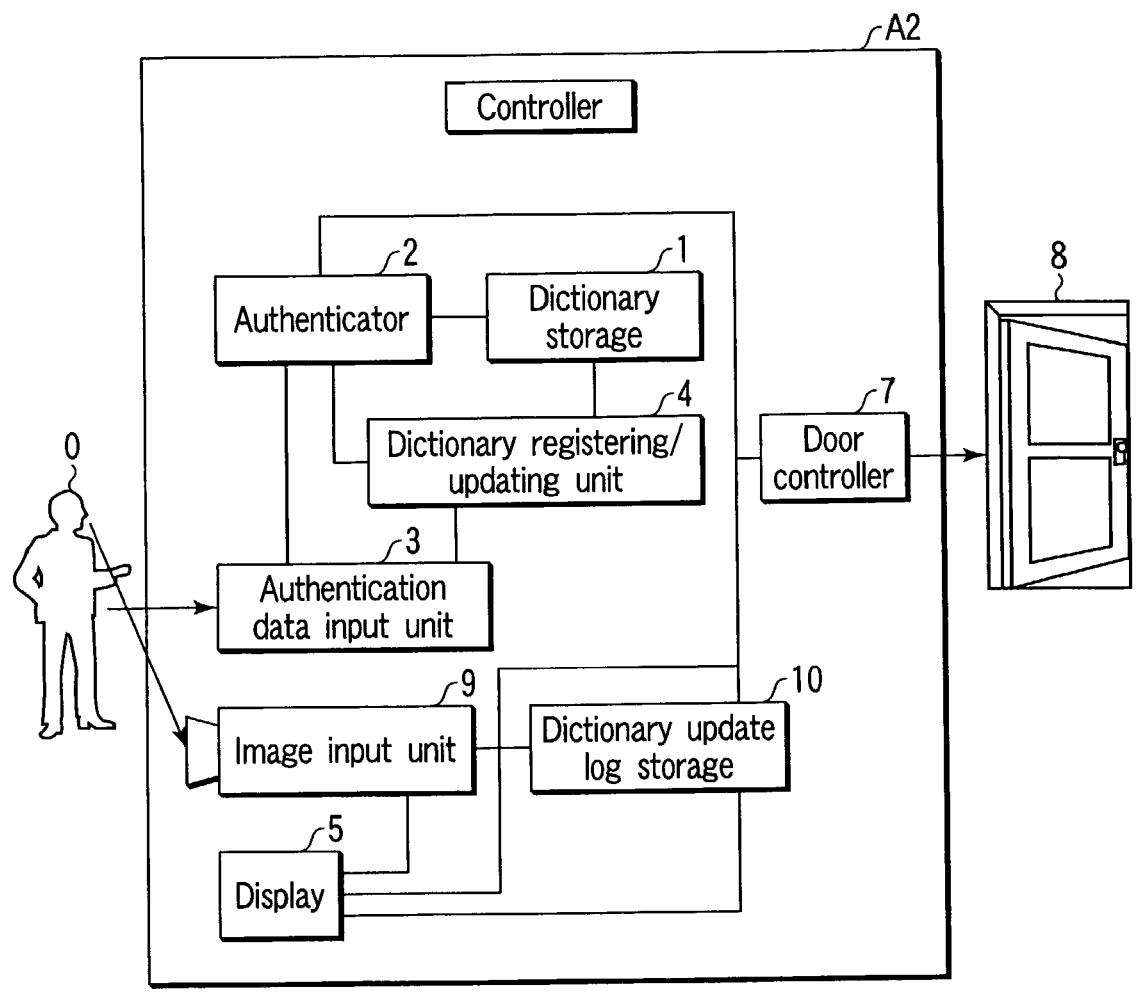
FIG. 3 is a block diagram schematically showing the arrangement of a person recognition apparatus according to the second embodiment.

FIG. 3 schematically shows the arrangement of a person recognition apparatus A2 according to the second embodiment. This person recognition apparatus A2 of the second embodiment shown in FIG. 3 has an image input unit 9 and authentication log storage 10 in addition to the arrangement of the person recognition apparatus A1 of the first embodiment shown in FIG. 1. In the following explanation of the second embodiment, the same reference numerals as in the first embodiment shown in FIG. 1 denote the same parts, and a detailed description thereof will be omitted.

The image input unit 9 acquires at least a face image of a person O to be authenticated. This image input unit 9 includes a camera for photographing an image, and an image interface for capturing the image photographed by the camera. When a dictionary in a dictionary storage 1 is updated, the authentication log storage 10 stores a dictionary update log containing the update result of the dictionary. This authentication log storage 10 is a storage device such as a hard disk drive. When only a face image is to be used as authentication data, the image input unit 9 and an authentication data input unit 3 may be combined into a single image input unit 9. This configuration will be explained later.

Figure 4:
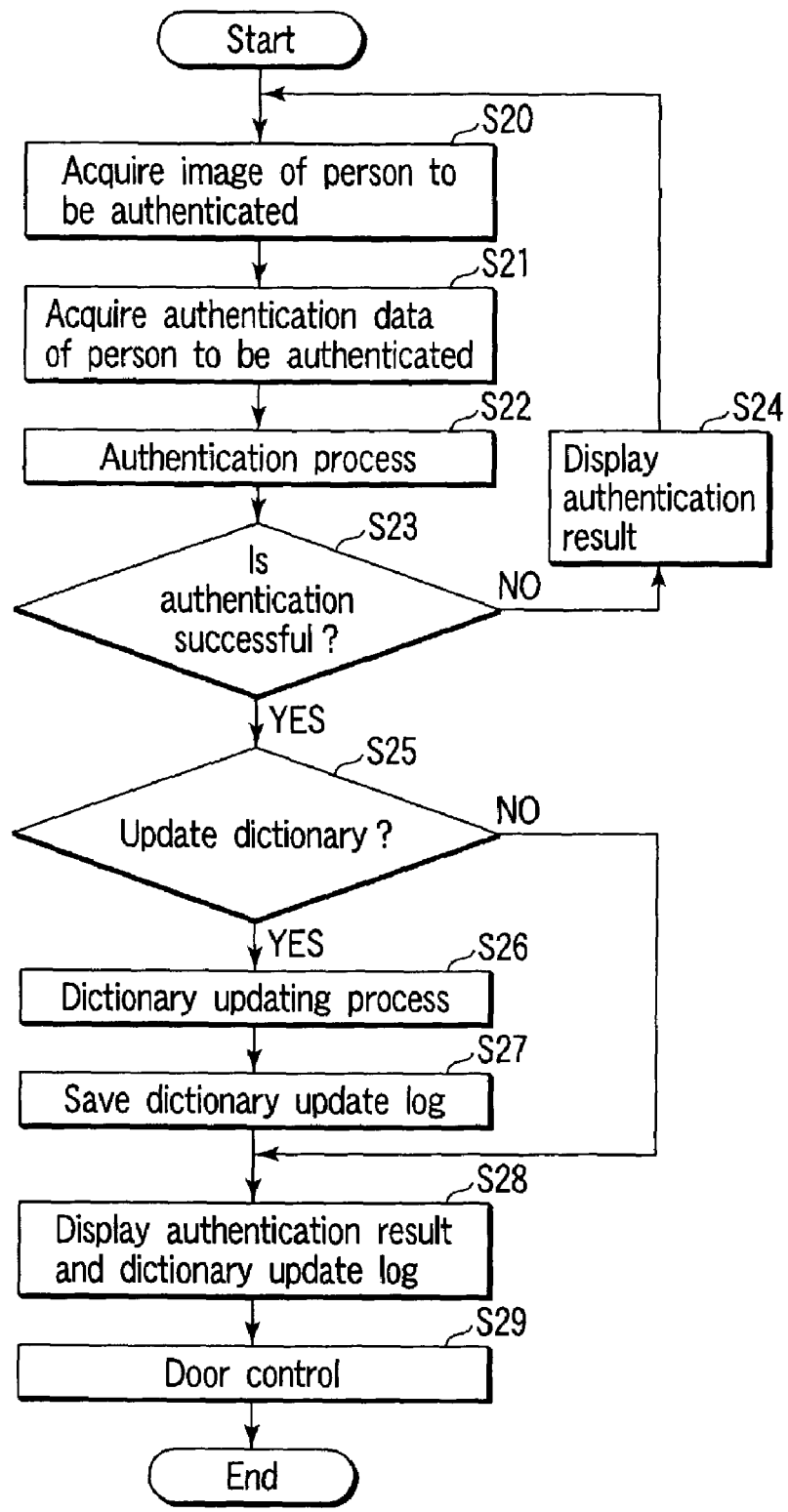
FIG. 4 is a flow chart for explaining the flow of person authentication and dictionary update by the person recognition apparatus according to the second embodiment.

The flow of authentication and dictionary update by the person recognition apparatus A2 will be described below with reference to a flow chart shown in FIG. 4.

First, the image input unit 9 acquires an image (including a face image) of the person O to be authenticated (step S20). The authentication data input unit 3 acquires authentication data from the person O (step S21). When a face image is to be used as authentication data, the face image acquired by the image input unit 9 can also be used as the authentication data.

An authenticator 2 performs collation (authentication) on the basis of the authentication data acquired by the authentication data input unit 3 and the dictionary stored in the dictionary storage 1 (step S22).

When authentication is to be performed using a face image, an authentication method described in, e.g., Toshi Sakano and Toshikazu Nakamura, "Presence and Future of Authentication Technique", Information Processing, Vol. 41, No. 7, pp. 816–822, July 2000" (reference 1) or Alex Pentland Tanzeem Choudhury, "Face Recognition for Smart Environments", IEEE Computer Magazine, Vol. 49, No. 2, pp. 50–55, February 2000 (reference 2), can be applied to the authentication process executed by the authenticator 2.

When collation is to be performed using biometrical information, such as a fingerprint, retina, iris, or palm shape, other than a face image, the authenticator 2 performs the collating process on the basis of this biometrical information acquired by the authentication data input unit 3. Also, when the collating process is to be performed using a magnetic card or IC card of the person O to be authenticated, the authenticator 2 collates data stored in the dictionary storage with data which is recorded on a magnetic card or IC card of the person O and input from the authentication data input unit 3. When collation is to be performed using a key of the person O to be authenticated, the authenticator 2 collates a lock pattern stored in the dictionary storage 1 with that pattern of the key of the person O, which is input from the authentication data input unit 3 (matching check).

If the person O is not authenticated as the person himself or herself in step S22 (NO in step S23), a display 5 displays, as the authentication result, information indicating that authentication is unsuccessful (step S24).

If the person O is authenticated as the person himself or herself in step S22 (YES in step S23), the dictionary registering/updating unit 4 checks whether to update the dictionary of the person O stored in the dictionary storage 1

(step S25). For example, this dictionary updating process is performed at a predetermined period, for every predetermined number of times, or if the similarity (authentication score) as the collation result is smaller than a predetermined threshold value.

If determining in step S25 that the dictionary of the person O to be authenticated is to be updated (YES in step S25), the dictionary registering/updating unit 4 performs a dictionary updating process on the basis of the authentication data acquired from the person O in step S21. In this manner, the dictionary registering/updating unit 4 updates the dictionary of the person O stored in the dictionary storage 1 (step S26).

When this dictionary updating process is performed, the dictionary update log storage 10 stores dictionary update log information containing the face image of the person O acquired from the image input unit 9 and the result of this dictionary update (step S27). Furthermore, when this dictionary updating process is performed, the display 5 displays the authentication result, and the dictionary update log stored in the dictionary update log storage 10 when dictionary update is performed last time (step S28).

Figure 5:
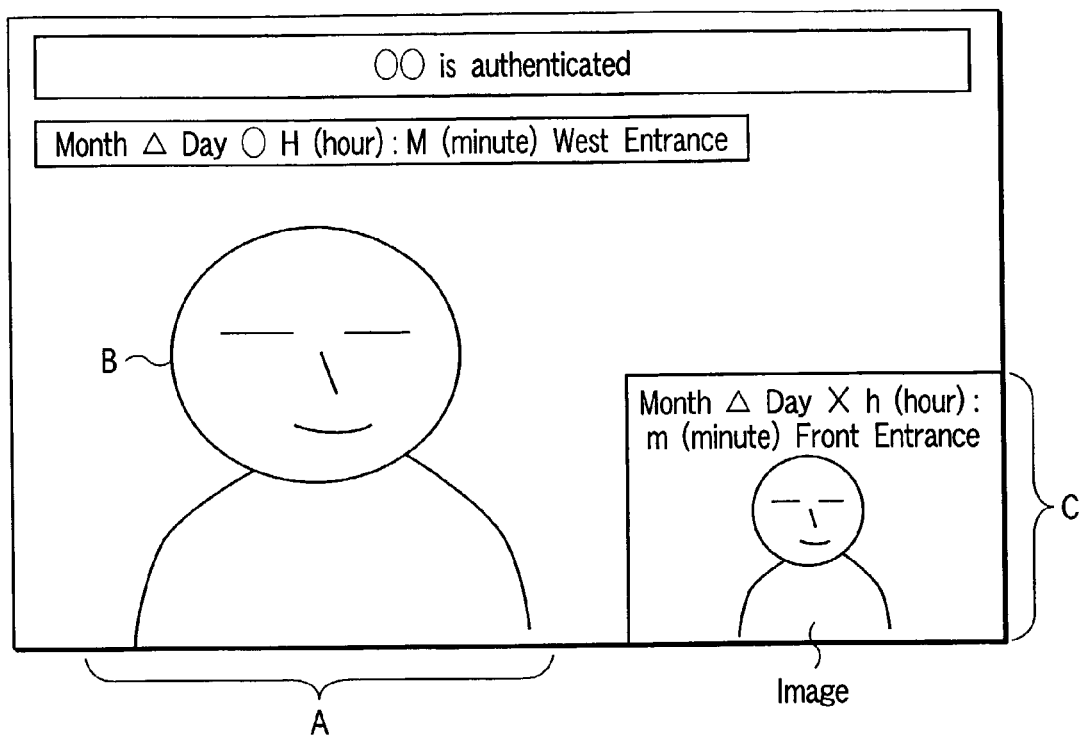
FIG. 5 is a view showing a display example of the authentication result and dictionary update log in the second embodiment.

FIG. 5 is a view showing an example of a window displayed on the display 5. This example of the window displays the present authentication result and the last dictionary update log. As shown in FIG. 5, the display 5 displays a present authentication result (including a face image B of the person O to be authenticated input from the image input unit 9) A, and also displays a last dictionary update log C. As this last dictionary update log, it is only necessary to display, e.g., the date/time of dictionary update, the location of dictionary update, and a face image of a person to be authenticated when dictionary update is performed.

When the dictionary updating process up to step S28 is completed, a door controller 7 opens a door 8 (step S29), thereby permitting the passage of the person to be authenticated and completing the processing.

If in step S25 it is determined that the dictionary of the person O need not be updated (YES in step S25), the dictionary update log storage 10 sends the dictionary update log (last dictionary update log) of the last dictionary update to the display 5. The display 5 displays this last dictionary update log and the authentication result (step S28). When the last dictionary update log and the authentication result are thus displayed on the display 5, the door controller 7 opens the door 8 (step S29), thereby permitting the passing of the person to be authenticated and completing the processing.

As described above, when the dictionary is updated, the past dictionary update log information is stored, and information indicating the update of the dictionary is displayed. Accordingly, even if another person poses a person to be authenticated (or another person is authenticated as the person to be authenticated by mistake) and the dictionary is updated, the status of dictionary update performed in the past can be checked. Also, when a true person to be authenticated (registrant) is authenticated, the contents of the last dictionary update are displayed as the log of the dictionary update.

This allows the person to be authenticated to find dictionary update done without person's knowledge in early stages. If the result of the last dictionary update surely indicates the registrant himself or herself, it is possible to confirm that "no dictionary update by another person is performed from the last authentication to the present authentication". Therefore, the registrant can use this system with a sense of security and confidence. Furthermore, since image information such as a face image of a person to be authenticated upon dictionary update is displayed, the registrant can readily notice abnormalities such as posing by another person.

In a system which automatically updates a dictionary, a registrant is afraid of dictionary update by another person. Therefore, allowing a person to be authenticated to readily confirm the contents of dictionary update by data of another person as described above greatly improves the satisfaction and sense of security of the person to be authenticated. In addition, since dictionary update by a third person is easily revealed, the effect of inhibiting such actions is large.

Figure 6:
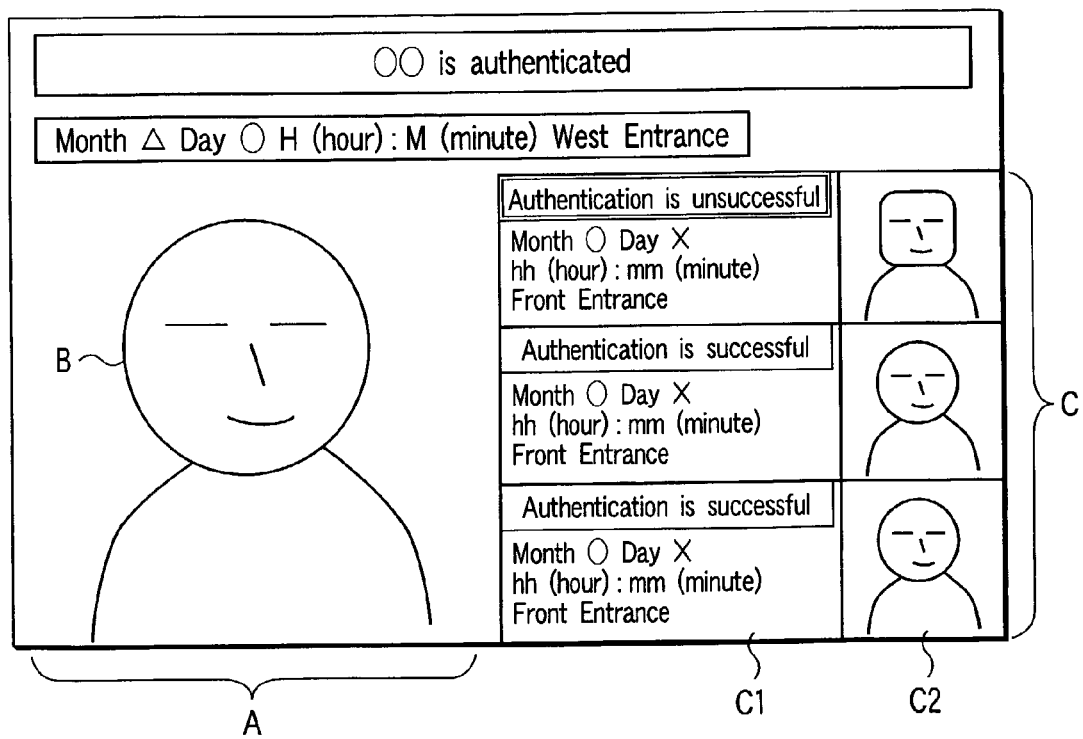
FIG. 6 is a view showing another display example of the authentication result and dictionary update log in the second embodiment.

Note that in step S28, a plurality of dictionary update logs C can also be displayed as shown in FIG. 6. In this case, the number of the dictionary update logs and the display contents such as log information and display forms can be set by one or both of a registrant and the manager. In the example shown in FIG. 6, C1 is information indicating the status when the dictionary is updated, and C2 is a face image of a person to be authenticated photographed when the dictionary is updated.

Figure 7:
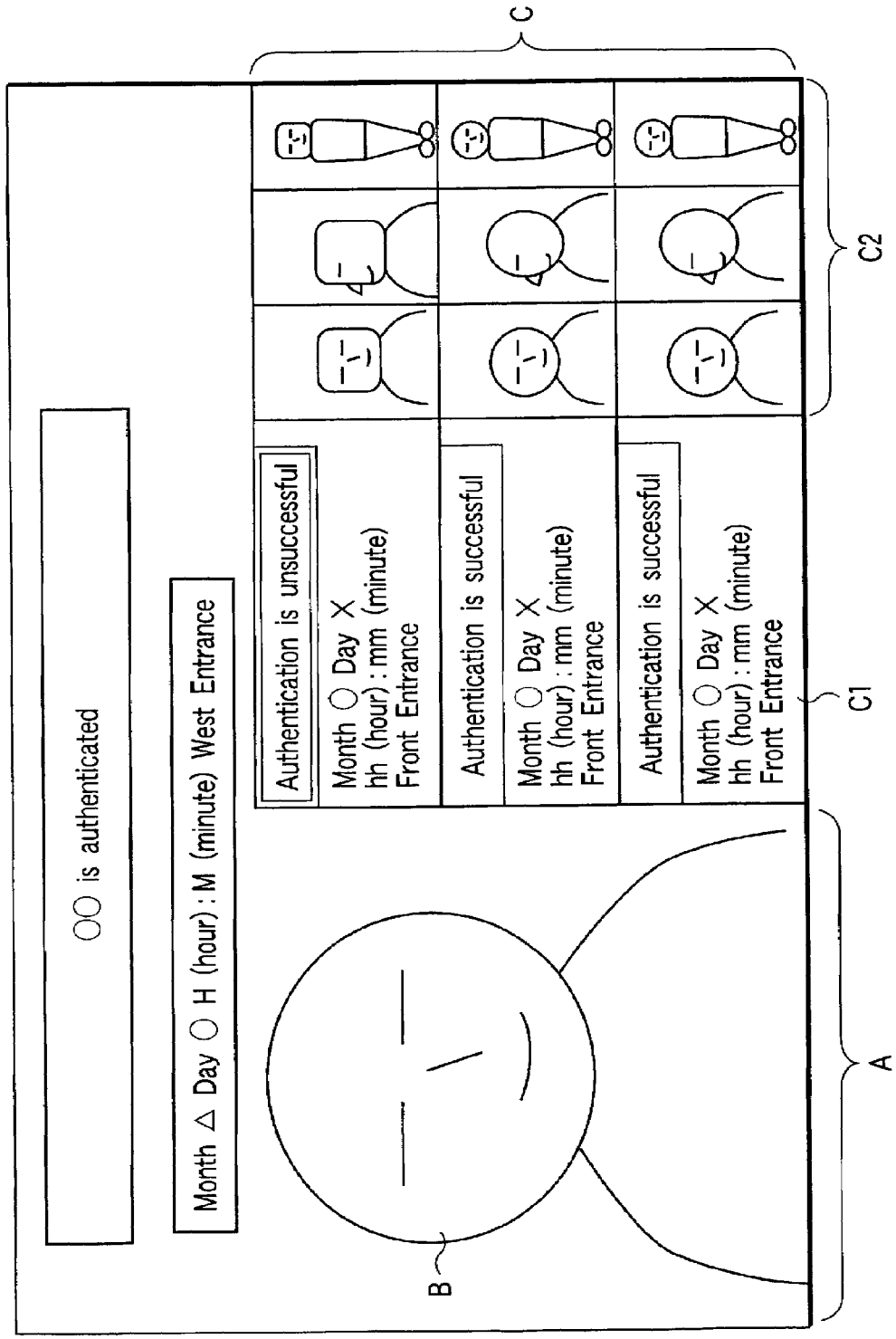
FIG. 7 is a view showing still another display example of the authentication result and dictionary update log in the second embodiment.

Note also that in step S28, it is also possible, as shown in FIG. 7, to display face images C2 upon dictionary update by thinning these images or to display images of the person O to be authenticated input from a plurality of image input units. When this is the case, these image input units are so installed as to photograph the person O to be authenticated at various angles with various sizes.

Figure 8:
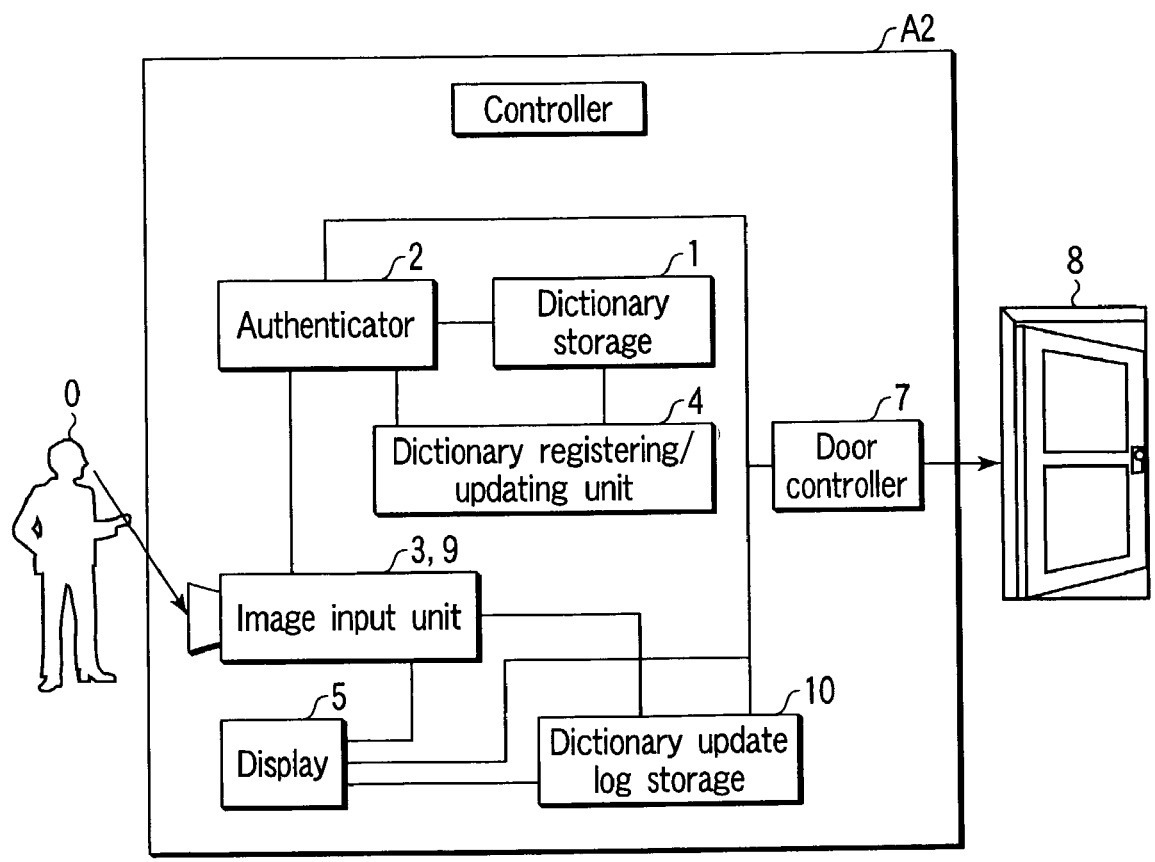
FIG. 8 is a block diagram schematically showing the arrangement of a person recognition apparatus when an authentication technique using a face image is used in an authentication unit in the second embodiment.

In this second embodiment, when the authenticator 2 performs authentication by using a face image, the whole configuration of the person recognition apparatus A2 is as shown in FIG. 8. In this configuration shown in FIG. 8, the image input unit 9 also functions as the authentication data input unit 3, so this authentication data input unit 3 need not be included in addition to the image input unit 9 unlike in the arrangement shown in FIG. 4. Accordingly, in the person recognition apparatus A2 having the configuration shown in FIG. 8, the authenticator 2 authenticates the person O to be authenticated by collating a face image input from the image input unit 9 with the dictionary in the dictionary storage 1.

The third embodiment will be described below.

Figure 9:
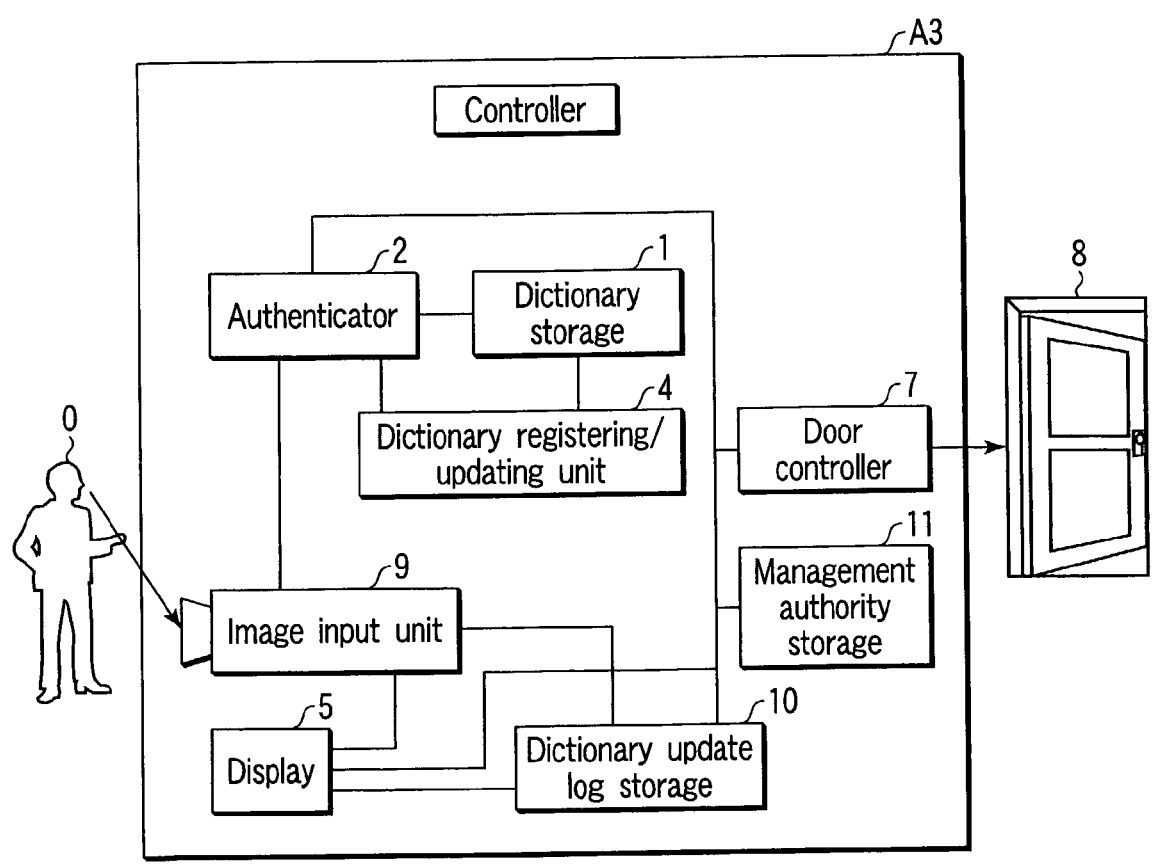
FIG. 9 is a block diagram schematically showing the arrangement of a person recognition apparatus according to the third embodiment.

FIG. 9 schematically shows the arrangement of a person recognition apparatus 3A according to the third embodiment. This arrangement of the person recognition apparatus 3A shown in FIG. 9 differs from the arrangement of the person recognition apparatus A2 shown in FIG. 8 described above in that a management authority storage 11 is added. The rest of the arrangement except for this management authority storage 11 of the person recognition apparatus A3 shown in FIG. 9 is the same as the arrangement of the person recognition apparatus A2 shown in FIG. 8. Therefore, the same reference numerals denote the same parts, and a detailed explanation thereof will be omitted.

Figures 10, 11:
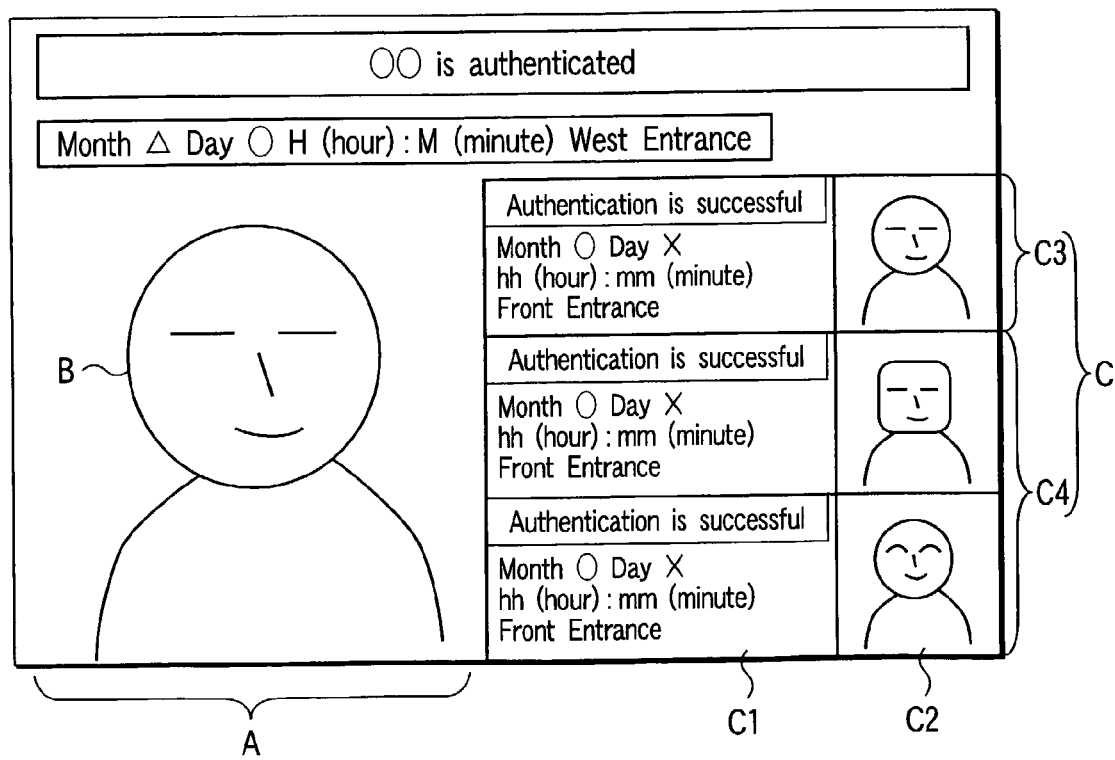
FIG. 10 is a view showing an example of management authorization information used in the third embodiment.
FIG. 11 is a view showing a display example of the authentication result and dictionary update log in the third embodiment.

The management authority storage 11 stores information indicating registrants over whom each registrant (user) has management authority. As shown in FIG. 10, this management authority storage 11 stores information (user ID) indicating each registrant and information (IDs to be managed) indicating registrants over whom each registrant has management authority. In this example shown in FIG. 10, a registrant having user ID 3 has management authority over registrants having user IDs 6 and 7.

When a registrant is authenticated, a display 5 displays not only the dictionary update log of the person but also the dictionary update log of a registrant having management authority, on the basis of the management information stored in the management authority storage 11. For example, when the management information as shown in FIG. 10 is stored in the management authority storage 11 and the registrant having user ID 3 is authenticated, the display 5 displays, as shown in FIG. 11, not only a dictionary update log C3 of that person but also a dictionary update log C4 of the registrants having user IDs 6 and 7 at the same time.

Assume, for example, that the person recognition apparatus A3 as described above is applied to the entrance of a general house. In this case, if the parents are given management authority over their child, whenever either parent is authenticated the display displays the dictionary update log of the child. This allows the parents to constantly check with ease the update status of the dictionary of their child.

Also, when this person recognition apparatus A3 is applied to the entrance of a highly confidential room of an office and the manager or supervisor is given management authority over other registrants, whenever the manager is authenticated the display displays the update logs of dictionaries of the other registrants. Accordingly, the manager can constantly check the update statuses of the dictionaries of the other registrants without difficulty.

The fourth embodiment will be described below.

Figure 12:
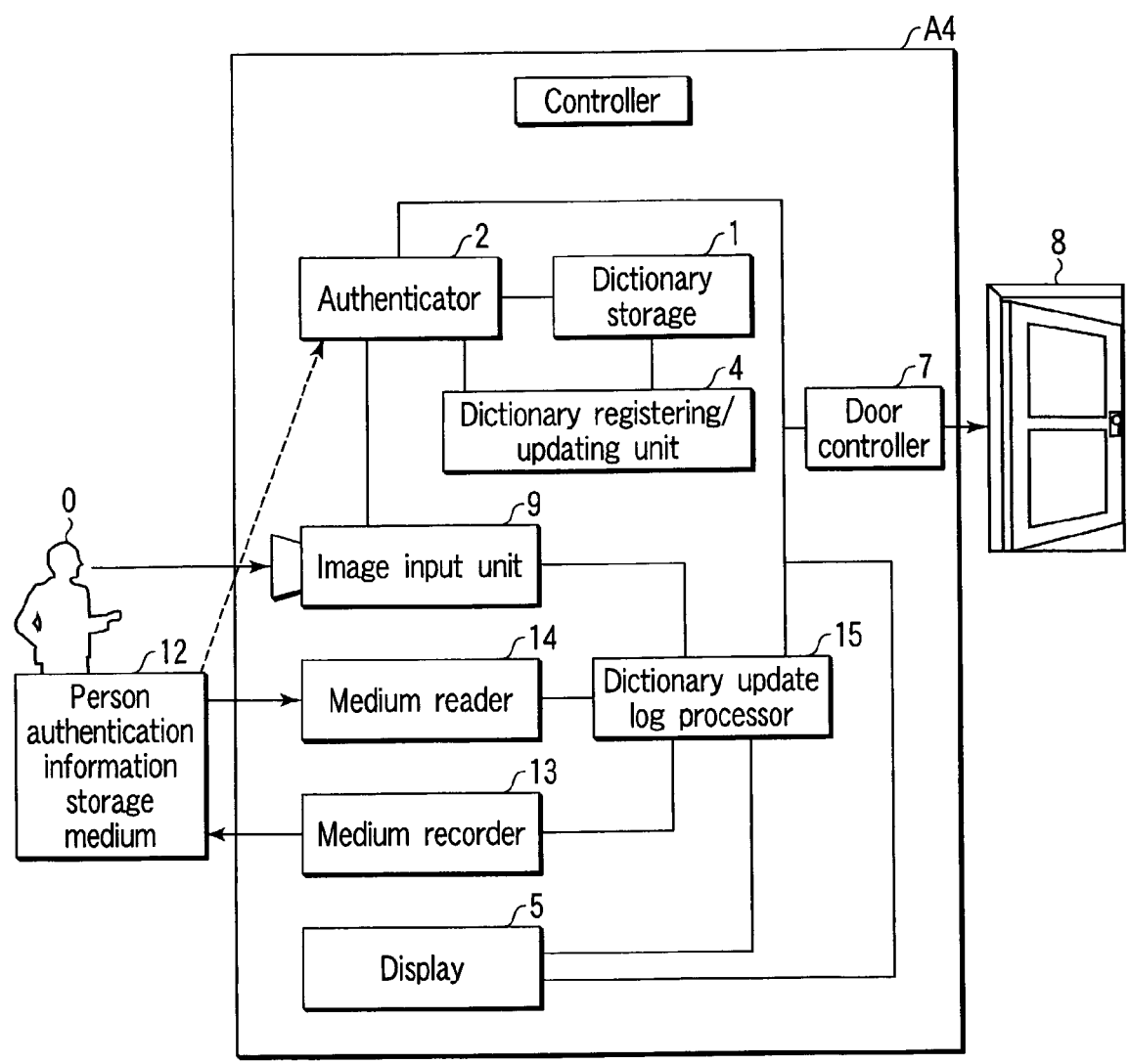
FIG. 12 is a block diagram schematically showing the arrangement of a person recognition apparatus according to the fourth embodiment.

FIG. 12 schematically shows the arrangement of a person recognition apparatus A4 according to the fourth embodiment. This arrangement of the person recognition apparatus A4 according to the fourth embodiment shown in FIG. 12 differs from the arrangement of the person recognition apparatus A2 shown in FIG. 8 described previously in that a medium recorder 13 and medium reader 14 are added and the dictionary update log storage 10 is replaced with a dictionary update log processor 15. The rest of the arrangement is the same as the arrangement shown in FIG. 8, so the same reference numerals denote the same parts, and a detailed description thereof will be omitted. Also, as shown in FIG. 12, in this fourth embodiment each registrant is given a personal information recording medium 12. This personal information recording medium 12 is a portable information recording medium such as a magnetic card, IC card, cell phone, or portable information terminal.

The medium recorder 13 records the past (last) dictionary update log on the personal authentication information recording medium 12 of each registrant O. The medium reader 14 reads information such as the authentication data and dictionary update log recorded on the person authentication information recording medium 12. The dictionary update log processor 15 generates a dictionary update log to be recorded on the person authentication information recording medium 12.

That is, in this fourth embodiment, each registrant has the person authentication information recording medium 12 recording authentication data such as biometrical information (e.g., a face image, fingerprint, or iris) of that person. The person recognition apparatus A4 performs authentication by using the authentication data recorded on the person authentication information recording medium of each registrant. This person recognition apparatus A4 also records the past dictionary update log on the person authentication information recording medium 12 used in the authentication process.

More specifically, the medium reader 14 reads the authentication data and the past authentication log from the person recognition information recording medium 12 presented by the person O to be authenticated, and sends the read information to the dictionary update log processor 15. The medium recorder 13 records, as a dictionary update log, the contents (present dictionary update result) of dictionary update including a face image of the person O supplied from the dictionary update log processor 15, on the person authentication information recording medium 12.

Figure 13:
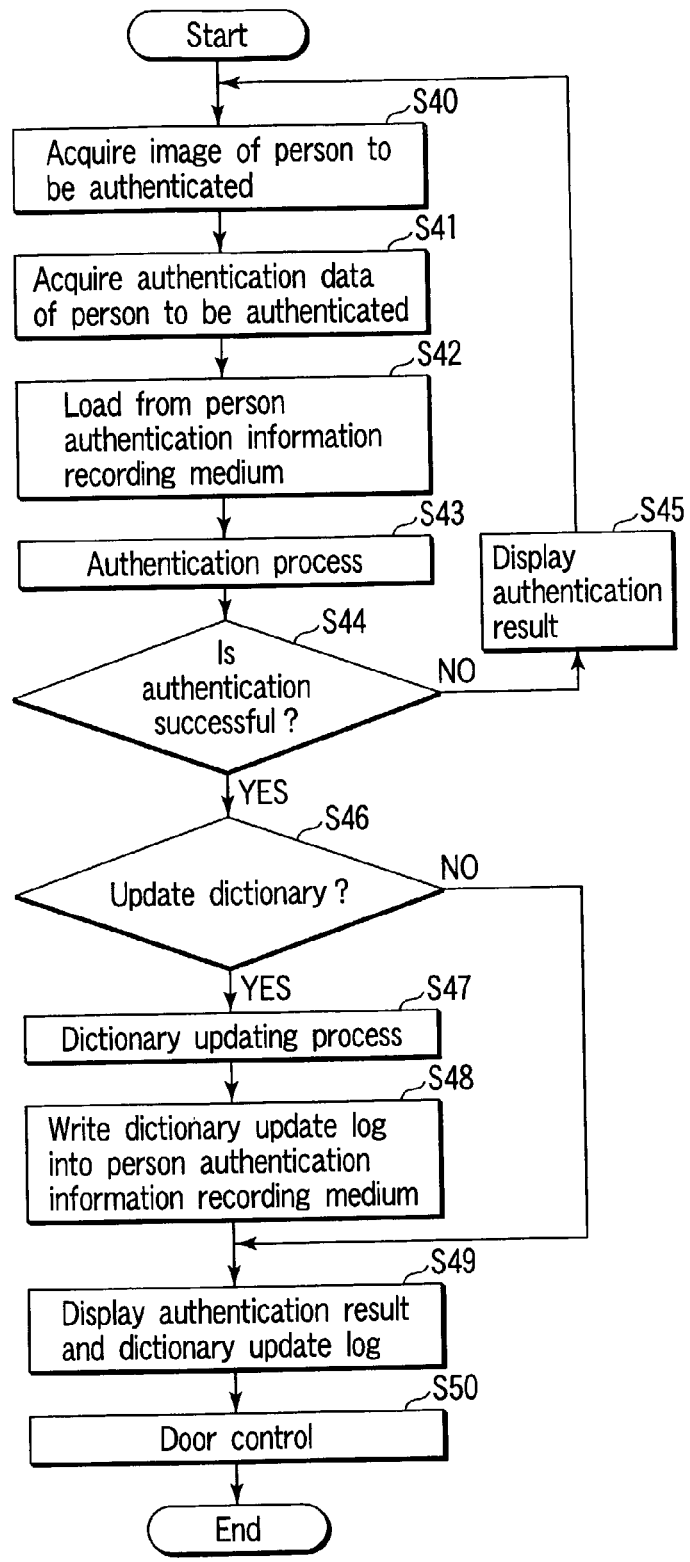
FIG. 13 is a flow chart for explaining the flow of person authentication and dictionary update by the person recognition apparatus according to the fourth embodiment.

The flow of authentication and dictionary update performed by the above person recognition apparatus A4 will be explained below with reference to a flow chart shown in FIG. 13. The basic flow of processing shown in FIG. 13 is substantially the same as the processing shown in FIG. 4.

First, an image input unit 9 acquires an image such as a face image of the person O to be authenticated (step S40). In addition to acquiring this image of the person O, the person recognition apparatus A4 acquires authentication data from the person authentication information recording medium 12 of this person O (step S41).

That is, the person O to be authenticated inserts the person authentication information recording medium 12 into the medium reader 14. The medium reader 14 reads the face image as the authentication data from the person authentication information recording medium 12 presented by the person O, and sends the read image to the dictionary update log processor 15 (step S42). The dictionary update log processor 15 sends this face image read from the person authentication information recording medium 12 to an authenticator 2. This authenticator 2 performs a collating process (authentication process) by which the authentication data read from the person authentication information recording medium 12 is collated with dictionary data stored in a dictionary in a dictionary storage 1 (step S43). Whether the person O to be authenticated is the person himself or herself is checked by this authentication process, and the authenticator 2 sends the result of the authentication process to the dictionary update log processor 15 (step S44).

Note that in step S43, the authenticator 2 may perform person authentication by using only the authentication data recorded on the person authentication information recording medium 12, or may perform both authentication using the authentication data recorded on the person authentication information recording medium 12 and authentication based on biometrical information, other than the authentication data, acquired from the person O to be authenticated.

If the person O is not authenticated as the person himself or herself (NO in step S44), the display 5 displays, as the authentication result, information indicating that authentication is unsuccessful (step S45).

If the person O is authenticated as the person himself or herself (YES in step S44), a dictionary registering/updating unit 4 checks whether to update the dictionary (step S46). If determining that the dictionary is to be updated, the dictionary registering/updating unit 4 updates the dictionary in the dictionary storage 1 on the basis of the authentication data acquired in step S42 (step S47).

After the dictionary is updated, the dictionary update log processor 15 supplies to the medium recorder 13 a dictionary update log containing the image of the person O to be authenticated obtained from the image input unit 9 and the updated contents (e.g., the update time and update location) of the dictionary. The medium recorder 13 records this dictionary update log on the person authentication information recording medium 12 (step S48).

The dictionary update log processor 15 also sends to the display 5 the last dictionary update log read from the person authentication information recording medium 12 by the medium reader 14, and the result (present authentication result) of the authentication process performed by the authenticator 2. Accordingly, the display 5 displays the last dictionary update log and the authentication result (step S49). Also, if the person O to be authenticated is authenticated as the person himself or herself, a door controller 7 opens a door 8 (step S50).

If it is determined in step S46 that the dictionary need not be updated (NO in step S46), the dictionary update log processor 15 sends to the display 5 the last dictionary update log read from the person authentication information recording medium 12 by the medium reader 14, and the result (present authentication result) of the authentication process performed by the authenticator 2. The displays 5 displays the last dictionary update log and the authentication result (step S49). If the person O is authenticated as the person himself or herself, the door controller 7 opens the door 8 (step S50).

In the fourth embodiment as described above, the dictionary update log is recorded on the person authentication information recording medium 12. This obviates the need to hold the dictionary update log in the person recognition apparatus.

When a plurality of person recognition apparatuses are to be installed, therefore, the fourth embodiment eliminates the need to share the update logs of dictionaries of all registrants among all these person recognition apparatuses. Consider, for example, a person authentication system which performs person authentication by using a plurality of person recognition apparatuses. If the person authentication information recording medium 12 is not used, it is necessary to install a means by which the person recognition apparatuses share dictionary update log information. For example, when person recognition apparatuses A41 and A42 are to be installed in a person authentication system shown in FIG. 14, it is necessary to construct a wire or wireless network which connects a dictionary update log storage 33 storing dictionary update log information to these person recognition apparatuses A41 and A42.

In contrast, when the person authentication information recording medium 12 is used as in the fourth embodiment, no means for allowing a plurality of person recognition apparatuses to share dictionary update log information is necessary. For example, in a person authentication system shown in FIG. 15, each of person recognition apparatuses A43 and A44 can process dictionary update log information recorded on the person authentication information recording medium 12.

That is, in this fourth embodiment the whole person authentication system can be constructed inexpensively even when a plurality of person recognition apparatuses are installed. Also, person recognition apparatuses can be added easily and inexpensively.

The fifth embodiment will be explained below.

Figure 16:
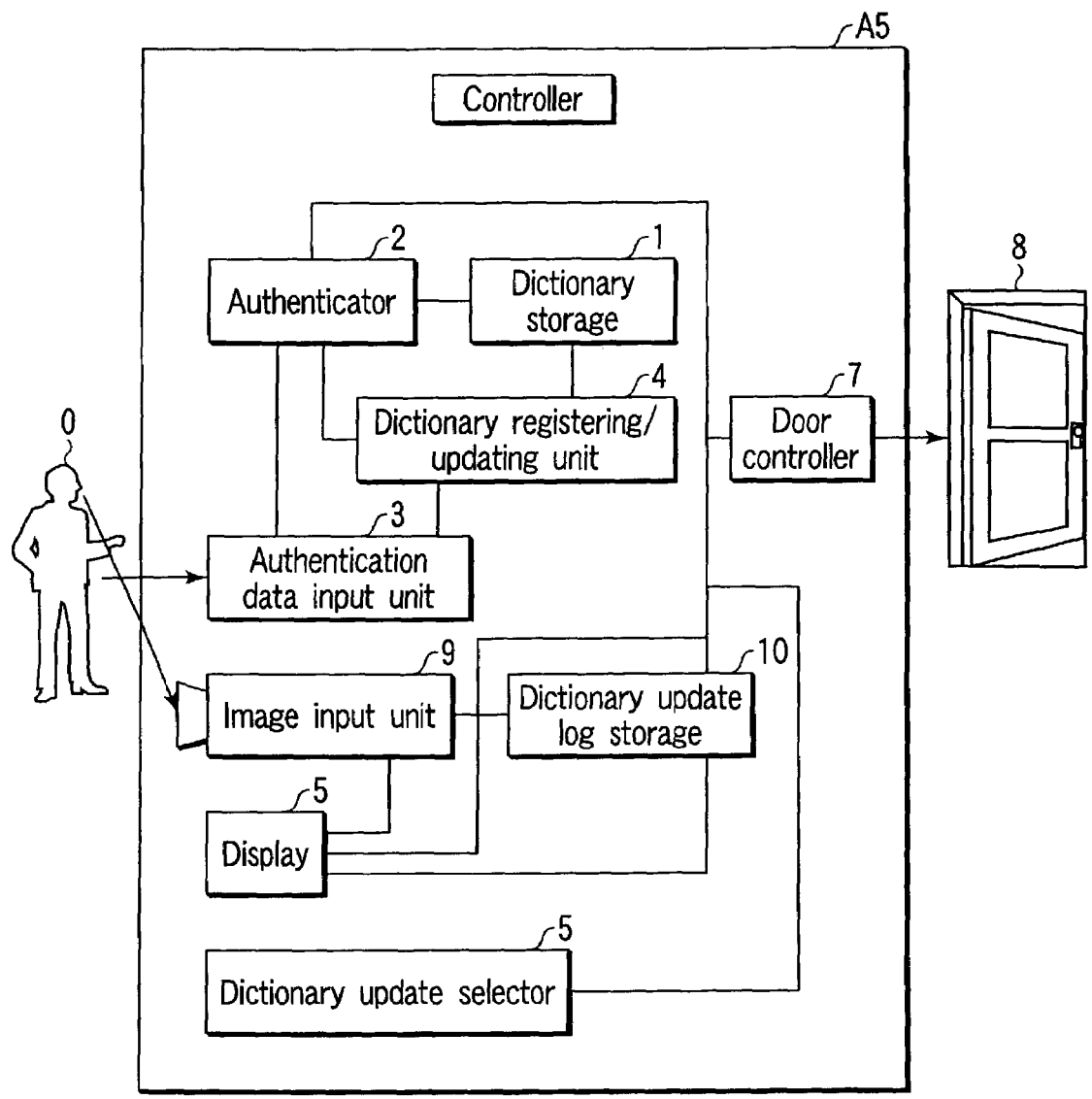
FIG. 16 is a block diagram schematically showing the arrangement of a person recognition apparatus according to the fifth embodiment.

FIG. 16 schematically shows the arrangement of a person recognition apparatus A5 according to the fifth embodiment. In this arrangement of the person recognition apparatus A5 shown in FIG. 16, a dictionary update selector 16 is added to the arrangement of the person recognition apparatus A2 shown in FIG. 3 described earlier. This dictionary update selector 16 is an input device by which a person to be authenticated selects whether to update a dictionary. The dictionary update selector 16 is a touch panel, a ten-key pad, or a user interface such as a voice interface. For example, this dictionary update selector 16 and a display 5 are integrated into a display device having a built-in touch panel. The rest of the arrangement except for the dictionary update selector 16 of the person recognition apparatus A5 shown in FIG. 16 is the same as the arrangement of the person recognition apparatus A2 shown in FIG. 3. Therefore, the same reference numerals denote the same parts, and a detailed description thereof will be omitted.

Figure 17:
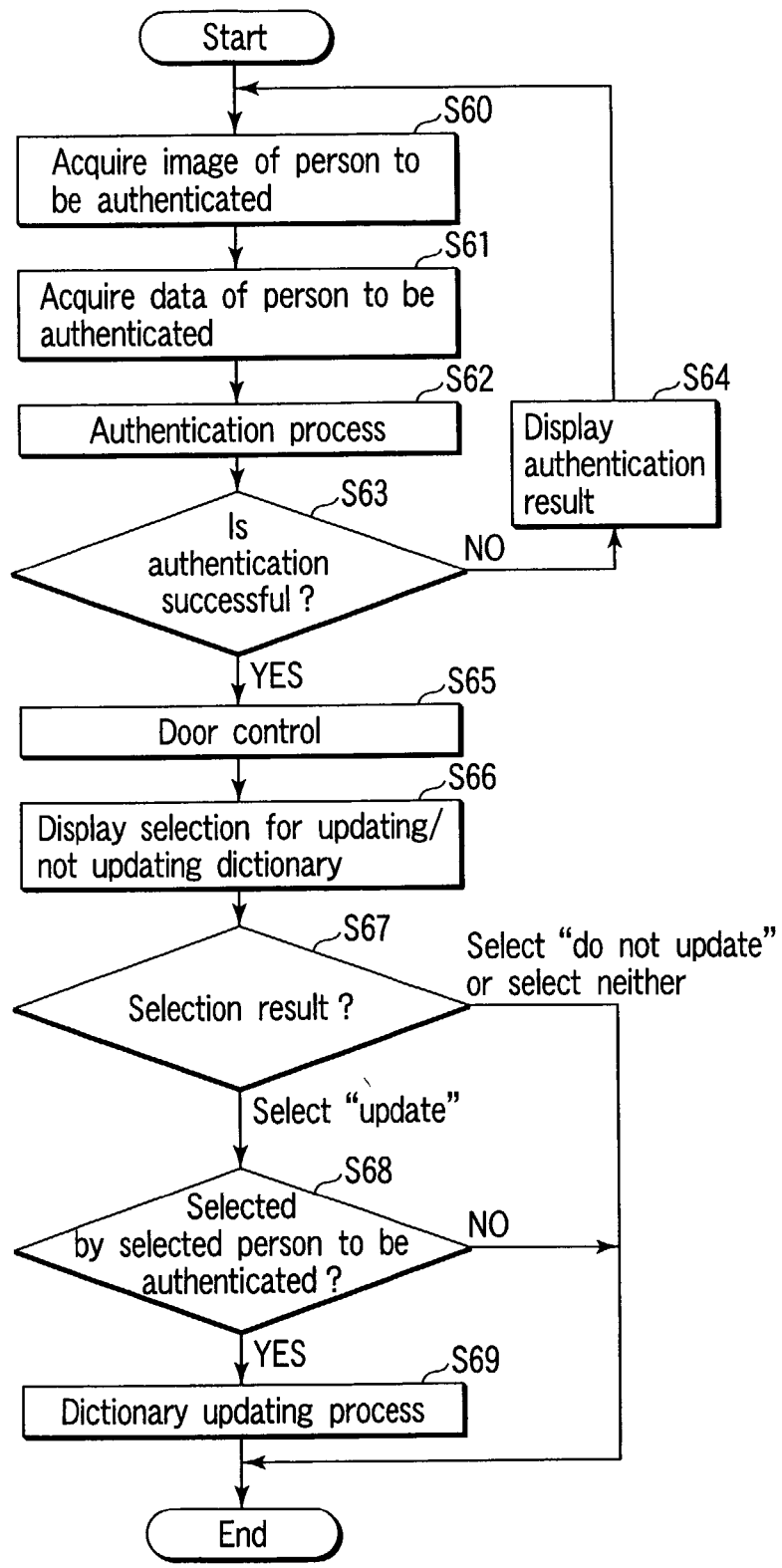
FIG. 17 is a flow chart for explaining the flow of person authentication and dictionary update by the person recognition apparatus according to the fourth embodiment.
Figure 19:
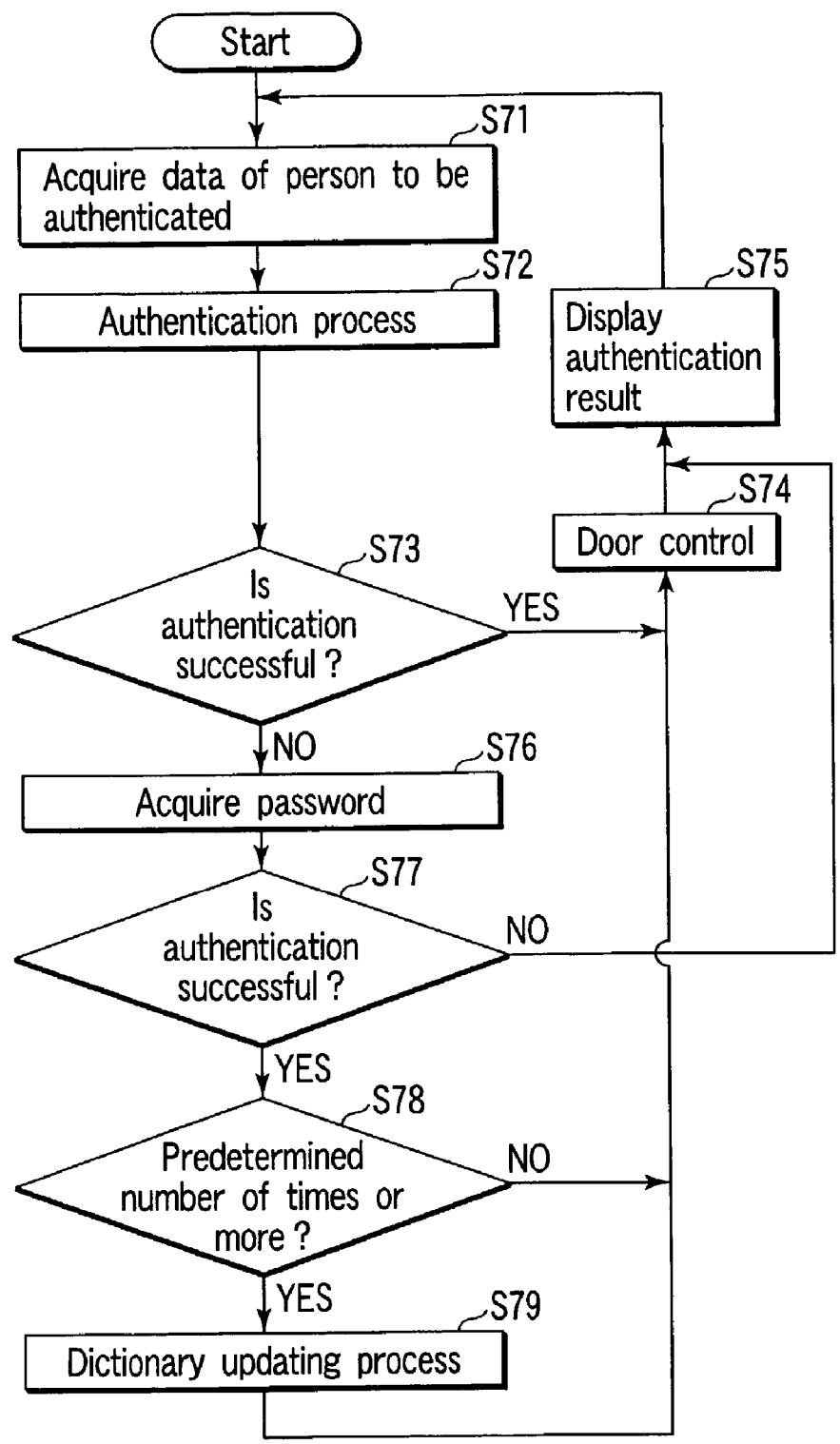
FIG. 19 is a flow chart for explaining the flow of dictionary update when password authentication is performed by a person recognition apparatus according to the sixth embodiment.

The flow of authentication and dictionary update by the person recognition apparatus A5 will be explained below with reference to a flow chart shown in FIG. 17.

First, an image input unit 9 acquires an image such as a face image of a person O to be authenticated (step S60). An authentication data input unit 3 acquires authentication data from this person O as an object of authentication (step S61), and supplies the authentication data to an authenticator 2. When the face image is to be used as this authentication data, the input face image from the image input unit 9 can also be supplied as the authentication data to the authenticator 2.

Upon receiving the authentication data, the authenticator 2 performs authentication on the basis of the received authentication data. For example, when the face image is to be used as the authentication data, the authenticator 2 performs authentication based on the face image of the person O to be authenticated (step S62). If the authenticator 2 does not authenticate the person O as a registrant (YES in step S63), the display 5 displays, as the authentication result, information indicating that the person O is not authenticated as a registrant (step S64).

If the authenticator 2 authenticates the person O as a registrant, a door controller 7 opens a door 8 (step S65) to permit the passage of this person O. Also, if the authenticator 2 authenticates the person O as a registrant, the display 5 displays a dictionary update selection window, as shown in FIG. 18, which allows the person O to select whether to update the dictionary (step S66).

In this window, the person O to be authenticated selects whether to update the dictionary by using the dictionary update selector 16 (step S67). If the person O authenticated as a registrant by the authenticator 2 selects "Update" on the dictionary update selector 16 (YES in step S68), a dictionary registering/updating unit 4 updates the dictionary of this registrant (step S69). If "Do not update" is selected on the dictionary update selector 16, the dictionary registering/updating unit 4 does not update the dictionary. If nothing is selected within a predetermined time on the dictionary update selector 16, or if a person other than the person O authenticated as a registrant by the authenticator 2 inputs something into the dictionary update selector 16, the dictionary registering/updating unit 4 does not update the dictionary.

As described above, whenever authentication is successful the dictionary update selection window as shown in FIG. 18 is displayed. However, if update of the dictionary is unnecessary, the person O to be authenticated need not select update. Hence, the person O feels no complexity.

In step S68, the dictionary registering/updating unit (confirmation unit) 4 is checked whether a person who has selected "Update" on the dictionary update selector 16 is the person authenticated as a registrant by the authentication process in step S62. This is to prevent update of the dictionary of an authenticated person by a third person after the authenticated person leaves without performing any selection.

The dictionary update process is performed if in step S68 the time from success of authentication to selection of "Update" on the dictionary update selector 16 is equal to or shorter than a certain threshold value.

The dictionary update process may also be performed if in step S68 "Update" is selected while the face region of a person to be authenticated is kept correctly detected. In this case, the image input unit 9 continuously acquires the image of the person O to be authenticated from success of authentication to selection input from the dictionary update selector 16. Furthermore, the image input unit 9 or the authenticator 2 repeats a face region detecting process of detecting a face region from the image continuously acquired by the image input unit 9. This makes it possible to check whether the authenticated person leaves from success of authentication to selection input from the dictionary update selector 16.

Even when the person O to be authenticated does not select "Update" in step S67, dictionary update can be performed for every predetermined period or for every predetermined number of times of use. This is to automatically update the dictionary for every predetermined period or for every predetermined number of times of use, even if the person O to be authenticated does not select anything, when it is undesirable that the state in which dictionary update is not performed continues. Accordingly, even if the person O does not select anything, the dictionary can be updated for every predetermined period or for every predetermined number of times of use, thereby preventing the use of the old dictionary.

In the fifth embodiment as described above, when a person to be authenticated is authenticated as a registrant, this person can select whether to update the dictionary by using authentication data acquired in the authentication process. Accordingly, the dictionary can be updated on the basis of the intention of a person to be authenticated. If a person to be authenticated designates nothing, processing is performed by assuming that no dictionary update is selected. Therefore, a person to be authenticated who requires no dictionary update need not designate anything. This saves the person to be authenticated the trouble of operating the apparatus.

The sixth embodiment will be described below.

In a person recognition apparatus which performs an authentication process (first authentication method) using biometrical information such as a face image, authentication cannot sometimes be performed owing to changes in the biometrical information of a person O to be authenticated. Some of these person recognition apparatuses perform authentication to check whether the person O to be authenticated is an authorized registrant by another method (second authentication method) using, e.g., a password (such as a code number or ID number), even if authentication cannot be performed by the biometrical information. This sixth embodiment relates to a person recognition apparatus which, even when authentication cannot be performed using biometrical information, performs authentication to check whether the person O to be authenticated is an authorized registrant by another authentication method using, e.g., a password (such as a code number or ID number).

The person recognition apparatus according to the sixth embodiment has the arrangement as shown in FIG. 1, 3, or 16. In this person recognition apparatus according to the sixth embodiment, an image input unit 9 acquires a face image as biometrical information from a person to be authenticated, and an authentication data input unit 3 acquires a password as authentication data other than biometrical information from a person to be authenticated. A dictionary in a dictionary storage 1 of the person recognition apparatus according to the sixth embodiment stores a face image as biometrical information (first authentication data) of each registrant and a password of each registrant as second authentication data for use in a second authentication method. Furthermore, an authenticator 2 performs an authentication process (second authentication method) using biometrical information (face image) and an authentication process (second authentication method) using second authentication data (password).

A dictionary updating process by the person recognition apparatus according to the sixth embodiment will be described below with reference to a flow chart shown in FIG. 18.

First, the image input unit 9 acquires a face image of the person O to be authenticated using authentication data (step S71). The authenticator 2 performs authentication on the basis of this face image of the person O acquired by the image input unit 9 and the dictionary stored in the dictionary storage 1 (step S72). If the person O is authenticated as a registrant by this authentication process using the face image (YES in step S73), a door controller 7 opens a door 8 (step S74). Also, a display 5 displays the authentication result (step S75).

If the person O is not authenticated as a registrant by the authentication process using the face image (NO in step S73), the authentication data input unit (second authentication data input unit) 3 accepts inputting of a password from the person O. When the authentication data input unit 3 acquires the password from the person O (step S76), the authenticator (second authenticator) 2 performs authentication using the password (step S77). If the person O is not authenticated as a registrant by this authentication using the password (NO in step S77), the display 5 displays the authentication result indicating that the person O is not authenticated as a registrant (step S75).

If in step S77 the person O is authenticated as a registrant by this authentication using the password (YES in step S77), a dictionary registering/updating unit 4 checks the number of times of execution of password authentication since the last dictionary update (step S78). Note that if the person O is authenticated as a registrant by the authentication using the password, the dictionary registering/updating unit 4 stores in the dictionary storage 1 the number of times of password authentication since the last dictionary update for each registrant.

If the result of the check in step S78 indicates that the number of times of password authentication of the person (registrant) O to be authenticated is smaller than a predetermined threshold value (NO in step S78), the door controller 7 opens the door 8 to permit the passing of the person O (step S74). The display 5 displays, as the authentication result, information indicating that the password authentication is successful (step S75).

If the result of the check in step S78 indicates that the number of times of password authentication of the person (registrant) O to be authenticated is equal to or larger than the predetermined threshold value (YES in step S78), the dictionary registering/updating unit 4 updates the dictionary of that registrant (step S79). That is, if an authorized registrant cannot be authenticated by biometrical information for a predetermined number of times or more, biometrical information registered in the dictionary of that registrant is updated. When the dictionary is updated by the dictionary registering/updating unit 4, the door controller 7 opens the door 8 to permit the passage of the person O to be authenticated (step S74). The display 5 displays, as the authentication result, information indicating that the password authentication is successful and that the dictionary of biometrical information (face image) is updated (step S75).

As described above, in the person recognition apparatus of the sixth embodiment, if a person to be authenticated is authenticated for a predetermined number of times or more by an authentication method other than biometrical information, the dictionary of biometrical information of that person is updated. Accordingly, the dictionary can be easily updated even if biometrical information changes.

In the first to sixth embodiments as described in detail above, dictionary data of a person to be authenticated can be registered or updated without any burden on that person. It is particularly possible to provide a person recognition apparatus and person authentication method by which a person to be authenticated feels no complexity in initial registration of dictionary data upon installation of the method and apparatus. Also, the first to sixth embodiments can provide a person recognition apparatus and person authentication method by which a person to be authenticated can use an automatic dictionary updating function with a sense of security and confidence.

The seventh to 11th embodiments will be explained below.

First, the seventh embodiment will be described.

Figure 20:
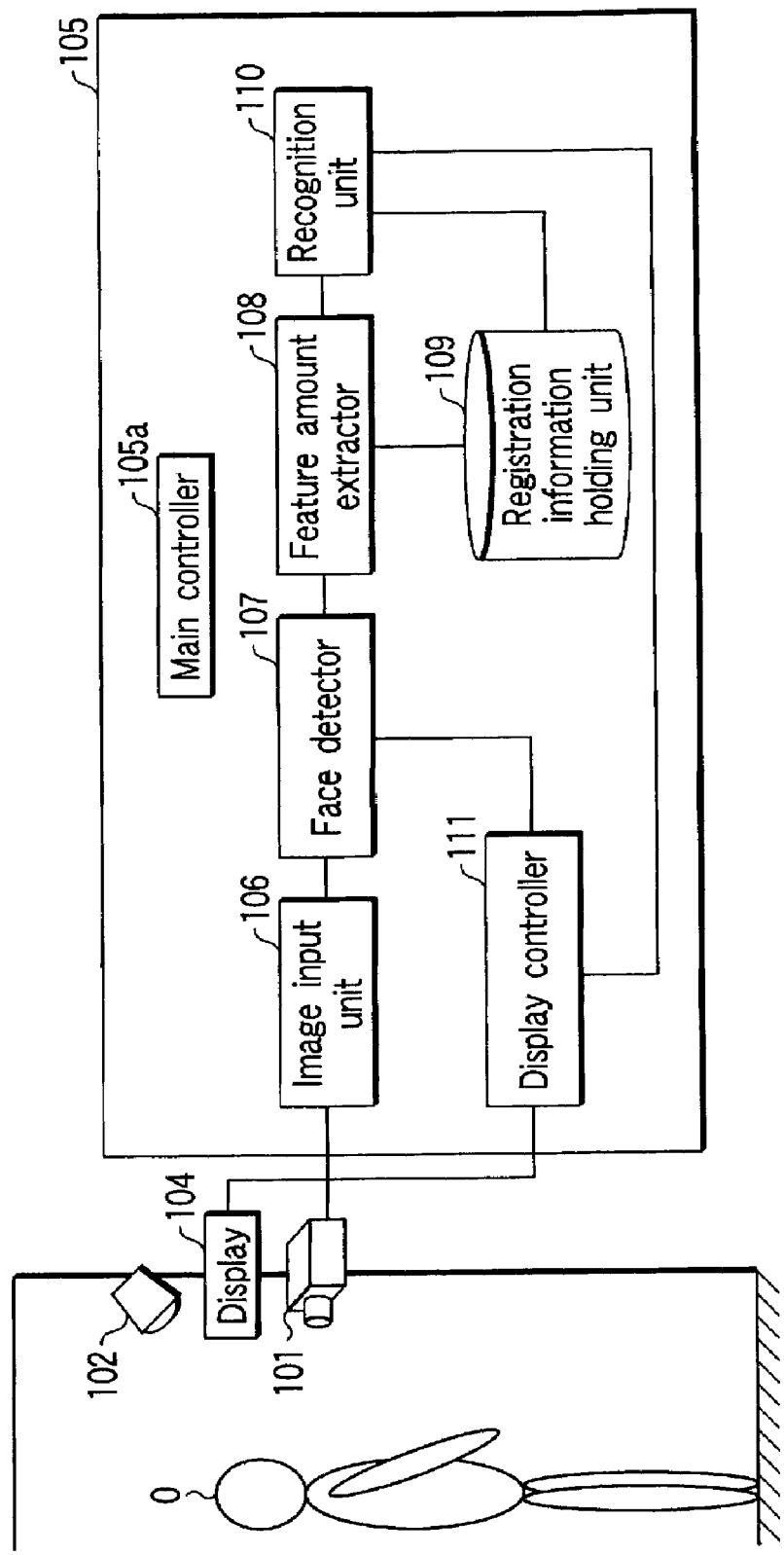
FIG. 20 is a block diagram schematically showing the arrangement of a person recognition apparatus according to the seventh embodiment.

FIG. 20 schematically shows the arrangement of a person recognition apparatus according to the seventh embodiment. This person recognition apparatus comprises a camera 101, illuminator 102, display 104, processor 105, and the like.

The camera 101 senses and inputs a face image (an image containing at least the face) of a person O to be recognized (authenticated). The illuminator 102 illuminates at least the face of the person O with light having predetermined illuminance from a nearby portion (e.g., a portion off to the upper right or upper left) of the camera 101. The display 104 displays the input face image and various information to the person O. The processor 105 processes the input face image from the camera 101 to perform a face image recognition process and the like.

The following explanation of the seventh to 11th embodiments will describe various pieces of information such as image input data, an extracted feature amount, a partial space, an eigenvector for forming the partial space, a correlation matrix, status information, e.g., the date, time, and location of registration, and personal information, e.g., a password and ID code. Recognition data contains a partial space or an eigenvector for forming the partial space. Registration information contains image input data, an extracted feature amount, a partial space, an eigenvector for forming the partial space, a correlation matrix, status information, and personal information. Accordingly, the recognition data is contained in the registration information.

The camera 101 is a television camera using an image sensing device such as a CCD sensor. This camera 101 senses and inputs a face image of the person O to be recognized.

The illuminator 102 is an illuminating apparatus such as a fluorescent lamp. This illuminator 102 is set as to illuminate the face of the person O with light having predetermined illuminance from a nearby portion (e.g., a portion off to the upper right or upper left) of the camera 101.

The display 104 is a display device. This display 104 displays, e.g., the face image of the person O sensed by the camera 101, various guides, and processing results.

The processor 105 includes a main controller 105a, image input unit 106, face detector 107, feature amount extractor 108, registration information holding unit 109, recognition unit 110, and display controller 111.

The main controller 105a controls the overall processor 105. The image input unit 106 is connected to the camera 101. This image input unit 106 is an image input interface including an A/D converter and the like. That is, the image input unit 106 receives a face image from the camera 101, converts the image into a digital image by A/D conversion, and supplies this digital image to the face detector 107.

The face detector 107 detects a face image of a person from the image obtained by the image input unit 101. This face detector 107 detects the positions of a face and face parts such as the eyes and nose by collating the image obtained by the image input unit 101 with a pattern dictionary prepared beforehand.

On the basis of the face detection result from the face detector 107, the feature amount extractor 108 extracts a feature amount of the face image. As this feature amount of the face image, the feature amount extractor 108 extracts, e.g., halftone information or partial space information.

The registration information holding unit 109 is a recording device or the like. This registration information holding unit 109 holds the feature amount extracted by the feature amount extractor 108 as recognition (authentication) data (registration information) of the corresponding person.

The recognition unit 110 collates the feature amount extracted by the feature amount extractor 108 with the recognition data registered in the registration information holding unit 109. The recognition unit 110 recognizes (authenticates) the person O to be recognized (authenticated) by this collating process. The display controller 111 is connected to the display 110. This display controller 111 controls the display contents of the display 104.

The face detector 107 first detects a region of the face of the person O to be recognized from the input face image from the image input unit 106. For example, the face detector 107 calculates correlation values by moving a template prepared beforehand in the input face image, and detects a portion having the largest correlation value as a face region. It is also possible to use a face detecting means such as a face region extracting method using an intrinsic space method or a partial space method.

As the method of detecting face parts such as the eyes, nose, and mouth by the face detector 107, it is possible to apply a detection method described in, e.g., Kazuhiro Fukui and Osamu Yamaguchi: "Face Feature Point Extraction by Combination of Shape Extraction and Pattern Collation", Journal of IEICE (D), vol. J80-D-II, No. 8, pp. 2,170–2,177 (1997) (reference 3).

Figure 21:
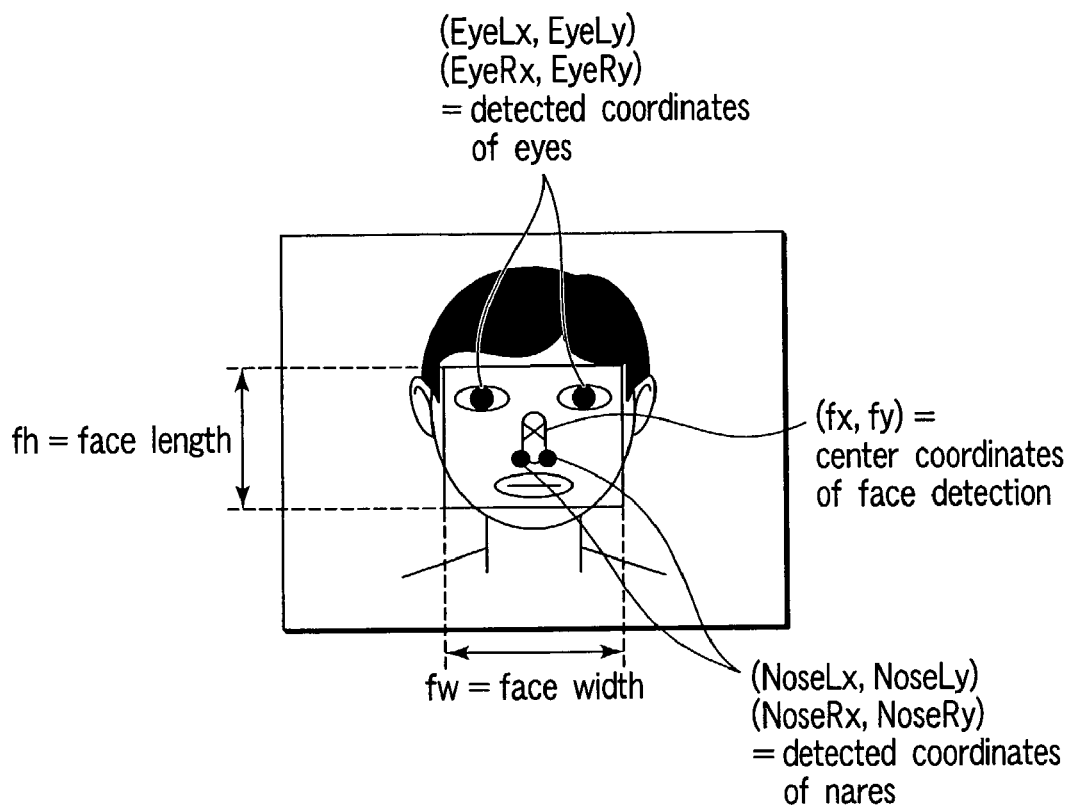
FIG. 21 is a view for explaining the processing by a face detector.

The face detector 107 can also check the direction of the face. This face direction can be detected by the relative positions of face parts such as the eyes and nose in the entire face region. The face detector 107 can detect the positions of face parts such as the eyes and nose by coordinates. For example, assume, as shown in FIG. 21, that the central coordinates of the face are (fx,fy), the size of the face is (fw,fh), the coordinates of the left eye are (EyeLx,EyeLy), the coordinates of the right eye are (EyeRx,EyeRy), the coordinates of the left naris are (NoseLx,NoseLy), and the coordinates of the right naris are (NoseRx,NoseRy). In this case, the direction of the face can be determined by the following method.

Face direction ($X$ direction)=((Eye$Rx$+Eye$Lx$)/2−$fx$)/$fw$

Face direction ($Y$ direction)=((Eye$Ry$+Eye$Ly$)/2−$fy$)/$fh$

Assuming the origin of these coordinates are the upper left corner of the screen, values in the X and Y directions increase as the face turns more to the lower right corner.

The feature amount extractor 108 extracts a face region having a predetermined size and shape on the basis of the positions of face parts detected by the face detector 107, and uses halftone information of the region as a feature amount. For example, the tone value of a region of m×n pixels is directly used as halftone information. Accordingly, a feature vector having m×n-dimensional information is used as a feature amount.

Figure 22:
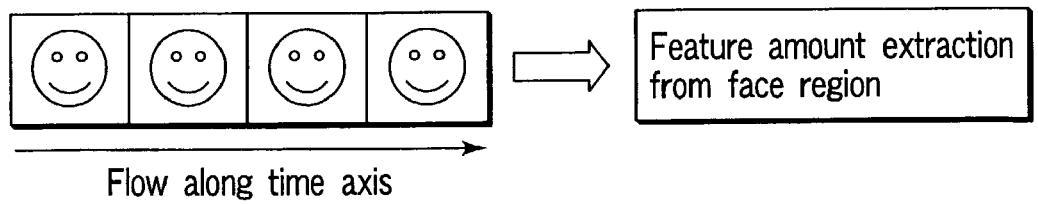
FIG. 22 is a view for explaining the processing by a feature amount extractor.

FIG. 22 shows time-series face image data obtained when the feature amount extractor 108 processes an input image. For these face image data, the feature amount extractor 108 obtains a correlation matrix of a feature vector and also obtains an orthonormal vector by known K—L expansion, thereby calculating a partial space. That is, the partial space is calculated by obtaining a correlation matrix (or a covariance matrix) of a feature vector, and obtaining an orthonormal vector (eigenvector) of this correlation matrix by K—L expansion. More specifically, k eigenvectors corresponding to eigenvalues are selected in descending order of the eigenvalues, and the partial space is expressed by using an eigenvector set of these k eigenvectors.

In this embodiment, a correlation matrix Cd is calculated from a feature vector and diagonalized to a correlation matrix represented by Cd=ΦdΛdΦdT thereby calculating Φ of an eigenvector. This partial space is used as a recognition dictionary for specifying a person. This information is registered beforehand as a dictionary.

As will be described later, this partial space can also be used as authentication (input) data for recognition. Therefore, the calculation result of the partial space is supplied to the recognition unit 110 and the registration information holding unit 109.

This registration information holding unit 109 records information indicating a registrant and status information (e.g., the date, time, and location of registration) in accordance with registration information (dictionary data). The registration information holding unit 109 also registers a partial space, correlation matrix, and the like as registration information in accordance with a recognition method performed by the recognition unit 110. This registration information can also be face image data of a corresponding person (registrant), or a feature amount extracted by the feature amount extractor 108.

The recognition unit 110 collates (compares) the recognition (dictionary) data (partial space) stored in the registration information holding unit 109 with the feature amount (halftone information or partial space information) obtained by the feature amount extractor 108. For example, to recognize a person O to be recognized taken by the camera 101 (i.e., to perform a recognition process), the recognition unit 110 calculates the similarities between input data obtained from the person to be recognized and all the dictionary data registered in the registration information holding unit 109, and selects a person corresponding to dictionary data having the maximum similarity as a recognition result. Accordingly, it is possible to determine a person registered in the dictionary, to whom the person O to be recognized is most similar.

Also, to check whether a person to be authenticated is a specific person (to be collated), the recognition unit 110 calculates the similarity between input data of this person O to be authenticated and dictionary data of the person to be collated registered in the registration information holding unit 109. On the basis of the calculated similarity, the recognition unit 110 authenticates (identifies) whether the person O is surely the person to be collated. For example, in this identification process, a person is identified by personal information, and a face image corresponding to the specified personal information is collated with a face image of a person to be authenticated. The result of this collation is given as similarity. In this identification process, therefore, if the similarity obtained by the collation exceeds a predetermined threshold value, it is determined that the identification is successful. The personal information is discriminated on the basis of a registration number or password input by a person to be authenticated. When this is the case, the person recognition apparatus is equipped with a key input means by which a person to be authenticated inputs a registration number or password. The personal information may also be discriminated on the basis of information recorded on a portable storage medium (a card such as an IC card, ID card, or wireless card) of a person to be authenticated. In this case, the person recognition apparatus is equipped with a card reader for reading the information recorded on the card. Furthermore, the personal information may be discriminated on the basis of the pattern of a key of a person to be authenticated. In a case like this, the person recognition apparatus is equipped with a key processor for discriminating the pattern of the key.

The recognition unit 110 uses a partial space method or a composite similarity method as a recognition method. These recognition methods are performed using information of the feature amount extracted by the feature amount extractor 108. For example, the recognition unit 110 uses a known recognition method described in Kenichi Maeda and Teiichi Watanabe: "Pattern Matching Method Introducing Local Structure", Journal of IEICE (D), vol. J68-D, No. 3, pp. 345–352 (1985) (reference 4). This reference 2 describes a recognition method using a mutual partial space method.

In this mutual partial space method, both recognition data as registration information stored beforehand and recognition data as input data are expressed as partial spaces. In the mutual partial space method, an "angle" formed by two partial spaces, i.e., registration information and input data, is defined as similarity, and a partial space which is input is defined as an input partial space. A correlation matrix Cin is similarly calculated with respect to an input data string and diagonalized into Cin=ΦinΛinΦinT thereby calculating an eigenvector Φin. The partial space similarity (0.0 to 1.0) of partial spaces represented by the two vectors Φin and Φd is calculated as similarity.

Figure 23:
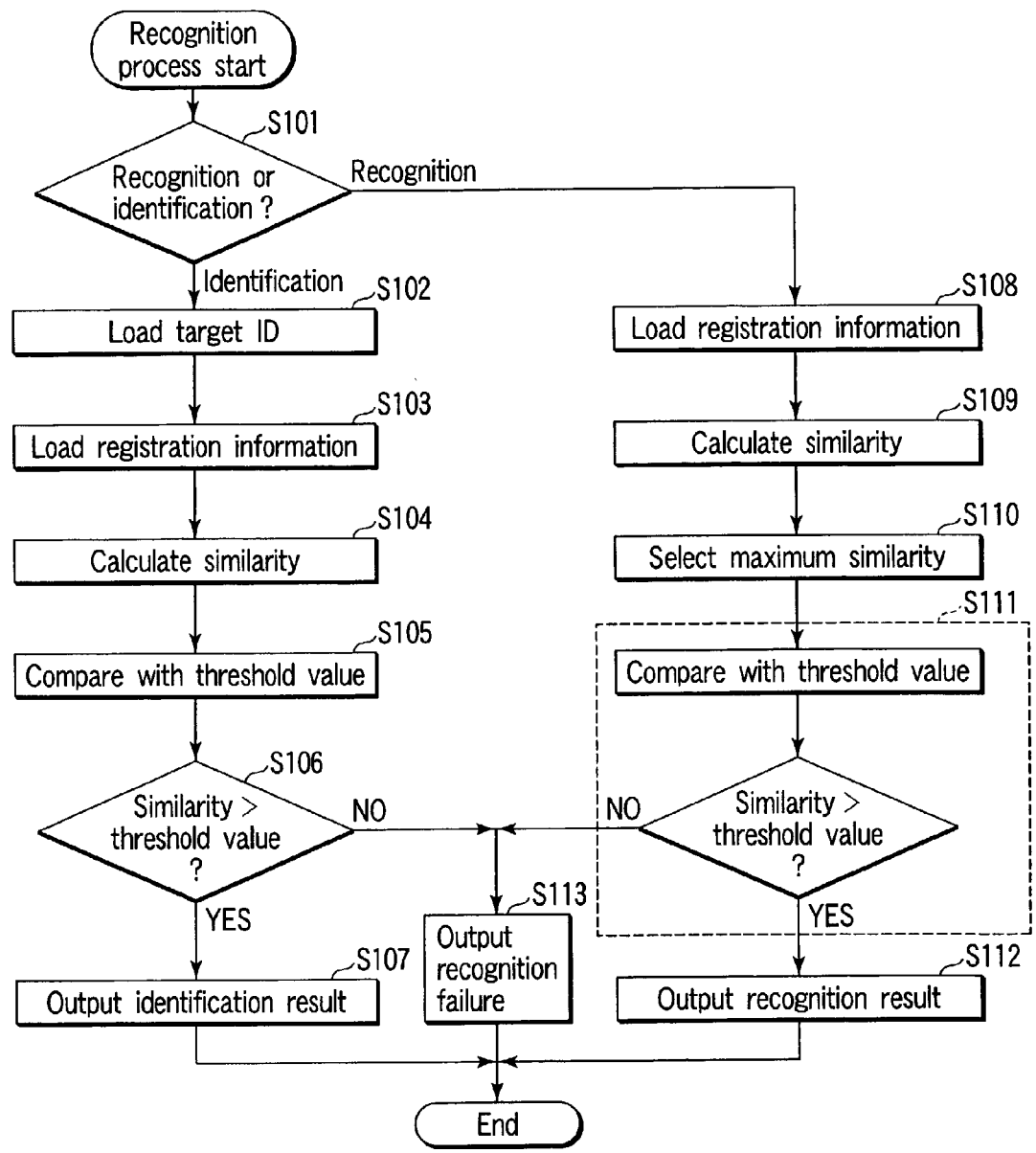
FIG. 23 is a flow chart for explaining the flow of a recognition process by a recognition unit.

FIG. 23 is a flow chart for explaining the operation of the recognition unit 110. This recognition unit 110 changes its operation in accordance with whether to perform a recognition process or an identification process (step S101).

To perform the identification process (identification in step S101), the recognition unit 110 acquires an ID code (personal information) from the person O to be authenticated (step S102). After acquiring the ID code, the recognition unit 110 reads out, from the registration information holding unit 109, registration information (partial space) corresponding to the loaded ID code (step S103).

When reading out the registration information corresponding to the ID code from the registration information holding unit 109, the recognition unit 110 calculates the similarity between a feature amount of input data extracted by the feature amount extractor 108 and the registration information (step S104). For example, to perform recognition by the partial space method described above, the recognition unit 110 calculates the similarity between the input partial space and the partial space of the registration information. After calculating the similarity, the recognition unit 110 compares the calculated similarity with a preset threshold value (step S105).

If determining by this comparison that the calculated similarity is larger than the threshold value (YES in step S106), the recognition unit 110 outputs, as the recognition result, information indicating that the identification is successful (step S107). If determining by the comparison that the calculated similarity is not larger than the threshold value (NO in step S106), the recognition unit 110 outputs, as the recognition result, information indicating that the recognition is unsuccessful (step S113).

To perform the recognition process (recognition in step S101), the recognition unit 110 reads out all registration information as objects of recognition from the registration information holding unit 109 (step S108). After reading out all registration information as objects of recognition, the recognition unit 110 calculates the similarity of each registration information with respect to a feature amount of input data extracted by the feature amount extractor 108 (step S109).

When calculating the similarities of all the registration information, the recognition unit 110 selects, as the recognition result, the largest similarity (maximum similarity) of all the calculated similarities (step S110). When thus selecting the maximum similarity, the recognition unit 110 outputs, as the recognition result, a person corresponding to registration information having this maximum similarity (step S112).

Note that as shown in step S111 surrounded by the broken lines in FIG. 23, it is also possible to check whether the recognition result is correct on the basis of the value of the maximum similarity selected in step S110. In this case, the recognition unit 110 compares the maximum similarity selected in step S110 with a predetermined threshold value. If determining by this comparison that the calculated similarity is larger than the threshold value, the recognition unit 110 outputs, as the recognition result, a person corresponding to registration information having the maximum similarity (step S112). If determining by the comparison that the maximum similarity is not larger than the threshold value, the recognition unit 110 outputs, as the recognition result, information indicating that recognition is unsuccessful (step S113).

A basic person recognizing operation can be performed by the processing explained so far. However, the recognition rate may be lowered by changes in the standing position or posture of a person to be authenticated when a face image is photographed, or by changes in the face with time. FIGS. 24, 25, and 26 are views showing examples of face images (input data) obtained from a person to be authenticated during a recognition process. FIG. 27 is a graph showing the relationship between the similarity and the threshold value. In each of FIGS. 24, 25, and 26, the size (face size) of a face during registration is indicated by a frame a of the broken lines.

For example, FIG. 24 is a view showing an example of a face image photographed under photographing conditions close to the photographing conditions (state) when the face of a person to be authenticated is photographed during registration. When recognition is performed using a face image as shown in FIG. 24 photographed in a state close to that during registration, a high similarity such as similarity r1 shown in FIG. 27 is obtained. That is, when the face of a person to be authenticated is photographed in a state close to the state during registration, a face image substantially the same as the face image acquired during registration can be obtained. Accordingly, when a face image of a person to be authenticated is acquired in a state close to the state during registration, the feature amount extractor 108 extracts a feature amount similar to the feature amount extracted during registration. This increases the similarity.

In contrast, FIG. 25 is a view showing an example of a face image in which the face is photographed to be larger than that photographed during registration. FIG. 26 is a view showing an example of a face image in which the face is photographed to be smaller than that photographed during registration. For example, when an image in which the face is photographed to be larger than that during registration as shown in FIG. 25 is acquired, the similarity obtained by recognition lowers as indicated by similarity r2 or r3 shown in FIG. 27. Likewise, when an image in which the face is photographed to be smaller than that during registration as shown in FIG. 26 is used, the similarity lowers as indicated by the similarity r3 or r2 shown in FIG. 27. The similarity also lowers if the direction of a face photographed during recognition differs from that of the face photographed during registration.

That is, the closer the state in which a person to be authenticated is photographed during authentication to the state in which the person is photographed during registration, the higher the similarity. In the seventh embodiment, therefore, guidance is so performed that the state of a person to be photographed during recognition is the same as the state of the person during registration as much as possible.

Figure 28:
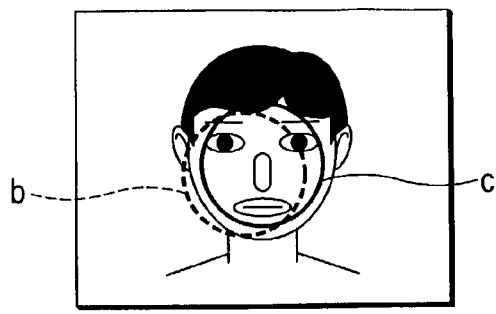

For example, FIG. 28 is a view showing a display example of the display 104. In this display example shown in FIG. 28, a frame (circle or ellipse) b and a frame (circle or ellipse) c are displayed simultaneously with a photographed face image. The frame b indicates the face position, face size, and face direction detected during registration. The frame c indicates the face position, face size, and face direction detected from the photographed image. That is, this display example shown in FIG. 28 clearly shows to the person O to be recognized the state of photographing of his or her face in which the recognition rate rises. This prevents the recognition process being terminated without a person to be authenticated knowing that his or her face is not correctly photographed.

As shown in FIG. 28, to display the frame b indicating the face position, face size, and face direction detected during registration, the registration information holding unit 109 also holds information (face feature amount) indicating the face size, face position, and face direction detected from a face image of a registrant during registration. This face feature amount is represented by the coordinate values of face feature points. Examples of the face feature points are the center of the left eye, the center of the right eye, the center of the left naris, and the center of the right naris. When a plurality of face images of a registrant are to be acquired during registration, the face feature amount held in the registration information holding unit 109 can be the average value of the feature amounts obtained from these face images or the maximum or minimum value of these feature amounts. The registration information holding unit 109 may also hold information such as the average value, maximum value, and minimum value of feature amounts obtained from images used in registration.

In the display example shown in FIG. 28, the face position and size are indicated by a circle centering around the center of the face. Therefore, if the central coordinate point and the radius are obtained, a circle indicating the face position and size can be drawn.

Assume, for example, that the central coordinate point of the circle indicating the face position and size is the barycenter of four points, i.e., the left and right eyes and the left and right nares, and that the radius of this circle indicating the face position and size is the average value of the distances between the barycenter and the four points.

In this case, the barycentric coordinates of the four points as the center coordinates of the circle are calculated from the coordinates of four points indicating the centers of the left and right eyes and left and right nares. Also, the radius of the circle is calculated as the average value of the distances from the coordinates of these four points to the barycentric coordinates of the four points. That is, the distance between the barycenter and the left eye is calculated on the basis of the barycentric coordinates and the center coordinates of the left eye. The distance between the barycenter and the right eye is calculated on the basis of the barycentric coordinates and the center coordinates of the right eye. The distance between the barycenter and the left naris is calculated on the basis of the barycentric coordinates and the center coordinates of the left naris. The distance between the barycenter and the right naris is calculated on the basis of the barycentric coordinates and the center coordinates of the right naris. The average value of the distances from the coordinates of the four points to the barycentric coordinates of the four points is calculated by averaging the distance between the barycenter and the left eye, the distance between the barycenter and the right eye, the distance between the barycenter and the left naris, and the distance between the barycenter and the right naris.

As shown in FIG. 28, the circle b indicating the registered face conditions (e.g., the position and size) and the circle c indicating the face conditions (e.g., the position and size) detected from an image photographed when recognition is to be performed are displayed with lines having different thicknesses, colors, and types on the same screen. This allows the person O to be authenticated to readily recognize the difference between the state during registration and the present state (during recognition).

Figure 29:
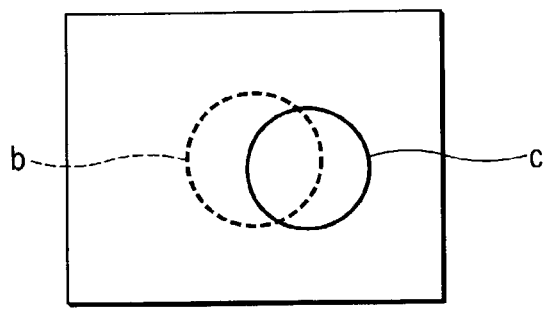

FIG. 29 shows a display example in which the circle b indicating the registered face state and the circle c indicating the face state detected from an input image during recognition are simultaneously displayed. In this display example shown in FIG. 29, the circle b indicating the registered face state is drawn with the broken line, and the circle c indicating the face state detected from an input image during recognition is drawn with the solid line. Hence, the person O to be authenticated can easily confirm the difference between the face state during registration and the face state in an input image during authentication. In the display example shown in FIG. 29, only the circles b and c are displayed. In practice, however, an input image (a face image of a photographed person to be authenticated) is displayed in the background of these circles b and c. Referring to FIG. 29, this input image is omitted in order to clearly show the circles b and c.

Figure 30:
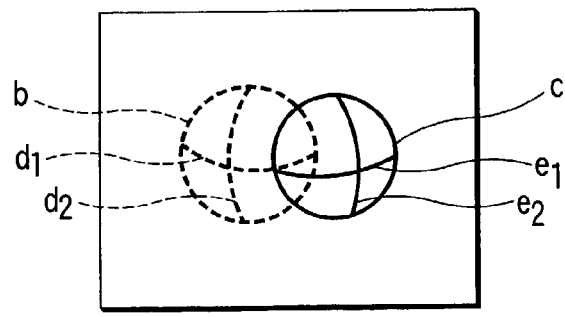

FIG. 30 shows a display example which indicates the face direction together with the face position and size. In this display example shown in FIG. 30, the face direction is indicated by curves $d_1$, $d_2$, $e_1$, and $e_2$, in addition to the display example shown in FIG. 29. As shown in FIG. 30, the curves $d_1$ and $d_2$ are drawn in the circle b, and the curves $e_1$ and $e_2$ are drawn in the circle c. Also, in the display example shown in FIG. 30, the curves $d_1$ and $d_2$ drawn by the broken lines indicate the face direction during registration, and the curves $e_1$ and $e_2$ drawn by the solid lines indicate the face direction during recognition. Furthermore, the curves $d_1$ and $e_1$ indicate the vertical center line of the face, and the curves $d_2$ and $e_2$ indicate the horizontal center line of the face. Accordingly, the intersection of the curves $d_1$ and $d_2$ and the intersection of the curves $e_1$ and $e_2$ indicate the centers of the respective corresponding faces.

If the face looks just straight ahead (in both the vertical and horizontal directions), the curves $d_1$ and $d_2$ or $e_1$ and $e_2$ are displayed as straight lines intersecting each other in the center of the face.

For example, if the face looks up rather than to the front, the curvatures of the curves $d_1$ and $e_1$ increase so that the upper portion projects; if the face looks down rather than to the front, the curvatures of the curves $d_1$ and $e_1$ increase so that the lower portion projects; if the face looks to the right rather than to the front, the curvatures of the curves $d_1$ and $e_1$ increase so that the right-hand portion projects; and if the face looks to the left rather than to the front, the curvatures of the curves $d_1$ and $e_1$ increase so that the left-hand portion projects.

That is, as the face direction deviates more and more from the front (as the face more and more moves vertically or horizontally), the curvatures of the curves $d_1$, $d_2$, $e_1$, and $e_2$ increase so that a portion in the direction in which the face points projects. With this display as shown in FIG. 30, the person O to be authenticated can easily confirm the face direction as well as the face size and position.

Figure 31:
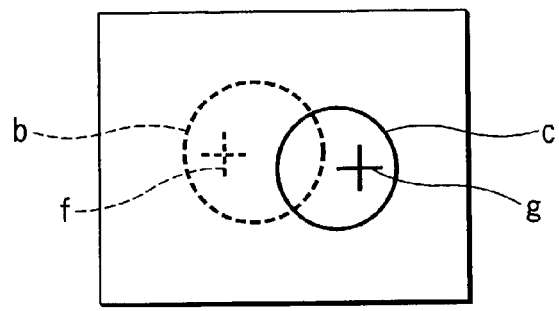

FIG. 31 shows a display example in which the center of a face is indicated by cross points f and g in the X and Y directions, respectively. The cross point f indicates the center of a registered face. This cross point f is displayed by the broken lines in the circle b. The cross point g indicates the center of a face detected from an image input during recognition. This cross point g is displayed by the solid lines in the circle c. These cross points f and g allow the person O to be authenticated to readily confirm the face directions during registration and authentication.

Figure 32:
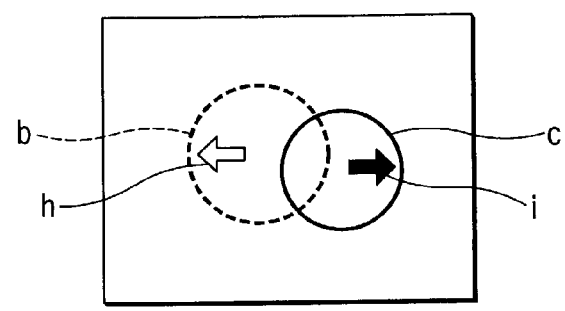

FIG. 32 shows a display example in which the face directions are indicated by arrows h and i. The arrow h indicates the direction of a registered face. This arrow h is displayed by a blank figure or broken lines in the circle b. The arrow i indicates the direction of a registered face. This arrow i is displayed by a solid figure or solid lines in the circuit c.

In the display example shown in FIG. 29, the frame (circle) b indicating the size, position, and direction of a face during registration is displayed. The center and size of this circle b shown in FIG. 29 are determined on the basis of informed held in the registration information holding unit 109.

For example, if the registration information holding unit 109 holds the average value of a plurality of feature amounts obtained from a plurality of face images during registration, the position and size of the frame (circle) b in the display example shown in FIG. 29 are determined on the basis of the average value obtained from these face images used during registration.

On the other hand, if the registration information holding unit 109 holds the maximum and minimum values of a plurality of feature amounts obtained from a plurality of face images during registration, the display 104 can also display a frame based on the maximum value and a frame based on the minimum value, as information indicating the condition of a face during registration.

Figure 33:
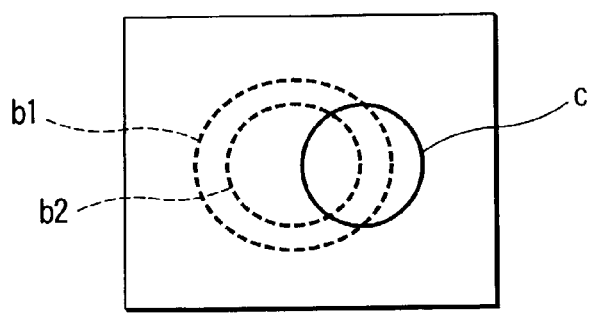

FIG. 33 shows a display example which indicates the maximum and minimum values of a face region detected from a plurality of images used in registration. In this display example shown in FIG. 33, a frame (circle) b1 and a frame (circle) b2 based on the maximum and minimum values, respectively, of feature amounts held in the registration information holding unit 109 are displayed on the same screen, as information indicating the condition of a face during registration. In the display example shown in FIG. 33, the maximum and minimum values of the size of a face during registration are indicated by the two, concentric circles b1 and b2, respectively. With this display example shown in FIG. 33, the person O to be authenticated can readily confirm the maximum and minimum values of the size of a face during registration. This facilitates adjusting the size of a face image photographed by the camera 101.

Figure 34:
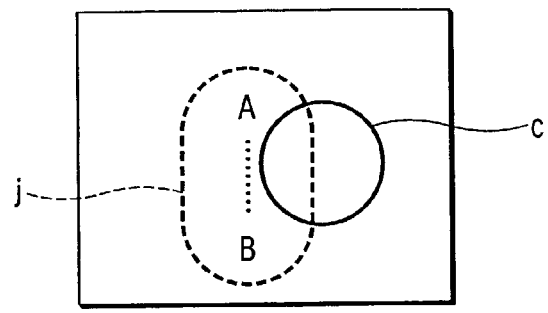

FIG. 34 shows a display example which indicates the maximum and minimum values of the center of a face detected from a plurality of images used in registration. In this display example shown in FIG. 34, the maximum and minimum values of the center of a face held in the registration information holding unit 109 are displayed on the same screen, as information indicating the condition of the face during registration. In the display example shown in FIG. 34, the maximum value (or the minimum value) and the minimum value (or the maximum value) of the center coordinates of a face during registration are points A and B, respectively.

That is, this display example shown in FIG. 34 indicates that the center coordinates of the face vertically move between the points A and B during registration. Also, the display example shown in FIG. 34 displays a region (circumscribed closed curve) j obtained when the center of a circle indicating the average size of a face detected from a plurality of images used in registration is moved between the points A and B. With this display example as shown in FIG. 34, the person O to be authenticated can easily confirm the moving range of the face position in a plurality of images used in registration. This facilitates adjusting the position of a face photographed by the camera 101.

Figure 35:
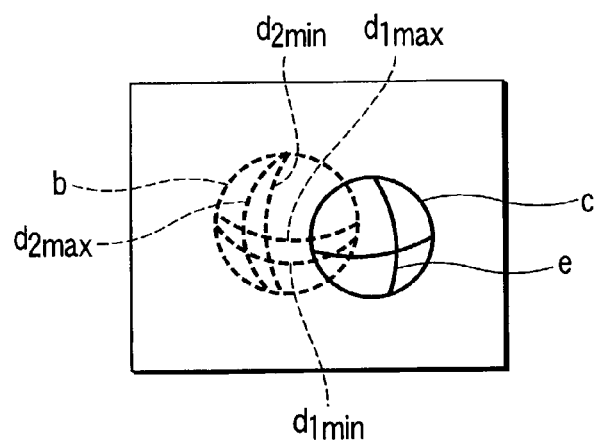

FIG. 35 shows a display example which indicates the maximum and minimum values of face directions detected from a plurality of images used in registration. In this display example shown in FIG. 35, the maximum and minimum values of the face directions held in the registration information holding unit 109 are displayed on the same screen, as information indicating the condition of the face during registration. Similar to FIG. 30, FIG. 35 indicates the face directions by curves.

That is, in the display example shown in FIG. 35, curves $d1_{min}$, $d1_{max}$, $d2_{min}$, and $d2_{max}$ are displayed on the same screen. Of a plurality of images used in registration, the curve $d1_{min}$ indicates a face direction in which the face looks down most, the curve $d1_{max}$ indicates a face direction in which the face looks up most, the curve $d2_{min}$ indicates a face direction in which the face looks to the left most, and the curve $d2_{max}$ indicates a face direction in which the face looks to the right most. This display example shown in FIG. 35 allows easy confirmation of the range of the face direction in a plurality of images used in registration. Therefore, the direction of a face photographed by the camera 101 can be readily adjusted.

The methods of displaying the position, size, and direction of a face, as information indicating the condition of the face during registration, by using the maximum and minimum values of a plurality of feature amounts obtained from a plurality of face images used in registration, are not restricted to the display examples shown in FIGS. 33, 34, and 35.

Figure 36:
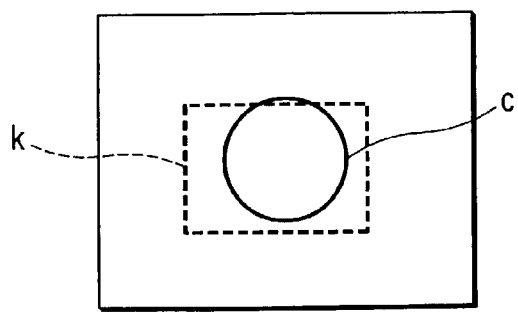

Also, the method of displaying information indicating the condition of a face is not limited to the one using a figure such as a circle or an ellipse. As an example, the condition of a face may also be indicated by using a rectangle (polygon) as shown in FIG. 36. Alternatively, as shown in FIG. 37, the condition of a face may be indicated by using a cross-shaped line pattern. FIG. 36 shows a display example in which a rectangular pattern k indicating the average position and size of a face during registration is displayed. FIG. 37 shows a display example in which a cross-shaped line pattern l indicating a region (in the vertical and horizontal directions) in which a face exists during registration.

Also, as shown in FIG. 38, an image photographed by the camera 101 can be displayed only in a face region m in which a face is present during registration. In this display example shown in FIG. 38, an image photographed by the camera 101 is not displayed in a region n other than the face region m in which a face is present during registration; the image photographed by the camera 101 is displayed on in the face region m in which the face is present during registration. With this display example shown in FIG. 38, the person O to be authenticated can readily match the condition of the face photographed by the camera 101 with that during registration, by displaying his or her face on the display.

Note that it is possible to use any method other than the above-mentioned methods, provided that the condition of a face during registration and the condition of a face photographed by the camera 101 can be displayed.

In the seventh embodiment as described above, information concerning a face during registration and information concerning a face input during recognition are simultaneously displayed. This gives a person to be authenticated an index indicating the way his or her face is correctly recognized. Consequently, it is possible to reduce the occurrence of an event in which recognition is unsuccessful and so the recognition process is retried.

The effectiveness can be further increased by voice guidance, e.g., "Please move your face a little away from the camera" or "Please move your face a little closer to the camera", or by displaying similar contents on the screen.

Note that when the recognition process is to be performed using the partial space described above, the registration information holding unit 109 holds not only this partial space but also a preliminary correlation matrix for calculating the partial space. This registration information holding unit 109 holds a face feature amount (partial space or correlation matrix) as one or a plurality of recognition data for one person or for one ID code. In addition to this face feature amount, the registration information holding unit 109 stores additional information such as the time at which the face feature amount is acquired. If the registration information holding unit 109 holds partial spaces as a plurality of recognition data for one person, the recognition unit 110 can perform recognition on the basis of the plurality of partial spaces corresponding to one person.

In the seventh embodiment as described above, a person to be authenticated is given guidance so that information indicating the conditions of a face detected from an image used in registration and the conditions of a face in an image to be recognized fall within a predetermined range. Accordingly, this seventh embodiment can reduce a lowering of the recognition rate caused by the difference between the angles of illumination to the face of a person to be authenticated, or by the difference between the conditions (e.g., the size, position, and direction) of the face during registration and the conditions (e.g., the size, position, and direction) of the face during recognition. As a consequence, a person can be recognized with high accuracy.

The eighth embodiment will be described below.

The arrangement and basic operation of a person recognition apparatus according to the eighth embodiment are analogous to the seventh embodiment described above, so a detailed explanation thereof will be omitted.

The object of this eighth embodiment is to form a dictionary capable of improving the recognition accuracy by collecting a wide variety of face images. In the eighth embodiment, to acquire various face images as images to be registered, guidance is performed for a person (registrant) who registers his or her face image. For example, when a face image for registration is to be photographed by a camera 101, a display 104 displays a guidance to teach the person how to adjust the face position, the distance from the face to the camera, and the face direction. Since face images of a registrant are acquired by performing this guidance, in this eighth embodiment not only a face image in a specific state but also a wide variety of face images are collected.

That is, in the eighth embodiment the display 104 displays the conditions (e.g., the face position, size, and direction) of a face to be registered and the face conditions of an image being photographed by the camera 101. For example, the conditions of a face to be registered and the face conditions of an image being photographed by the camera 101 are displayed by the display examples as shown in FIGS. 28 to 38. In the seventh embodiment described above, in these display examples shown in FIGS. 28 to 38 the conditions of a face during registration and the conditions of a face being photographed by the camera 101 are displayed. In contrast, in this eight embodiment, face conditions to be desirably acquired as an image to be registered (i.e., face conditions (preferred face conditions) required of a registrant) are displayed instead of the conditions of a face during registration, and at the same time the conditions of a face being photographed by the camera 101 are displayed. This makes it possible to display a guidance "Move your face to this position" to a registrant.

FIGS. 39 and 40 illustrate display examples in which information indicating face conditions required of a registrant and information indicating the conditions of a face being photographed by the camera 101 are displayed by circles q and p. In these display examples shown in FIGS. 39 and 40, the circle p as the information indicating face conditions required of a registrant is displayed by the broken line, and the circle p as the information indicating the conditions of a face being photographed by the camera 101 is displayed by the solid line. In the display example shown in FIG. 39, an image being photographed by the camera 101 is simultaneously displayed.

In addition, desired conditions of a desired face can also be presented to a registrant on the basis of the difference between face conditions required of the registrant and the conditions of a face being photographed by the camera 101.

For example, the difference between a face position required of a registrant and the position of a face being photographed by the camera 101 is detected, and guidance is so performed that the position of the face being photographed by the camera 101 matches the face position required of the registrant. That is, if the position of a face being photographed by the camera 101 is on the left of a face position required of a registrant, a guidance "Move to the right" is displayed on the display 104. If the position of a face being photographed by the camera 101 is on the right of a face position required of a registrant, a guidance "Move to the left" is displayed on the display 104. If the position of a face being photographed by the camera 101 is present above a face position required of a registrant, a guidance "Lower your face position" is displayed on the display 104. If the position of a face being photographed by the camera 101 is present below a face position required of a registrant, a guidance "Raise your face position" is displayed on the display 104.

Also, the difference between a face size required of a registrant and the size of a face being photographed by the camera 101 is detected, and guidance is so performed that the size of the face being photographed by the camera 101 matches the face size required of the registrant. That is, if the size of a face being photographed by the camera 101 is larger than a face size required of a registrant, a guidance "Move away from the camera" is displayed on the display 104. If the size of a face being photographed by the camera is smaller than a face size required of a registrant, a guidance "Move closer to the camera" is displayed on the display 104.

Furthermore, the difference between a face direction required of a registrant and the direction of a face being photographed by the camera 101 is detected, and a guidance is so performed that the direction of the face being photographed by the camera 101 matches the face direction required of the registrant. That is, if the direction of a face being photographed by the camera 101 is more downward than a face direction required of a registrant, a guidance "Turn your face a little up" is displayed on the display 104. If the direction of a face being photographed by the camera is more upward than a face direction required of a registrant, a guidance "Turn your face a little down" is displayed on the display 104.

Note that the above guidance need not be displayed on the screen but can also be given in the form of a voice message.

Note also that a face direction can be indicated by an arrow or a circle as shown in FIGS. 41 to 45 or FIGS. 46 to 50. For example, FIGS. 41 to 45 are display examples in each of which an image being photographed by the camera 101 is displayed together with an arrow indicating the direction of a face. FIGS. 46 to 50 are display examples in each of which an image being photographed by the camera 101 is displayed together with a mark (circle) indicating the center of the face as the face direction.

In the display examples shown in FIGS. 41 and 46, the direction of a face in an image being photographed by the camera 101 matches a face direction required of a registrant.

In the display examples shown in FIGS. 42 and 47, the direction of a face in an image being photographed by the camera 101 is more leftward than a face direction required of a registrant. That is, in FIG. 42 or 47, the registrant is guided to turn his or her face to the right by an arrow or a mark indicating the center of the face.

In the display examples shown in FIGS. 43 and 48, the direction of a face in an image being photographed by the camera 101 is more rightward than a face direction required of a registrant. That is, in FIG. 43 or 48, the registrant is guided to turn his or her face to the left by an arrow or a mark indicating the center of the face.

In the display examples shown in FIGS. 44 and 49, the direction of a face in an image being photographed by the camera 101 is more downward than a face direction required of a registrant. That is, in FIG. 44 or 49, the registrant is guided to look up by an arrow or a mark indicating the center of the face.

In the display examples shown in FIGS. 45 and 50, the direction of a face in an image being photographed by the camera 101 is more upward than a face direction required of a registrant. That is, in FIG. 45 or 50, the registrant is guided to look down by an arrow or a mark indicating the center of the face.

The guidance is not limited to these examples shown in FIGS. 41 to 45 or FIGS. 46 to 50. That is, the guidance can also be performed by using other figures, messages, or voices provided that a registrant is guided to change the direction of his or her face.

In the eighth embodiment as described above, it is readily possible by using various images to form a dictionary having high recognition accuracy, i.e., a dictionary which has learned by a wide variety of face images. With this dictionary, accurate recognition can be performed in an authentication process because the standing position, face direction, or posture of a person to be authenticated are not restricted. Also, when various face images different in direction, size (distance), and position are to be acquired, clear guidance can be performed for a registrant.

The ninth embodiment will be described below.

FIG. 51 schematically shows the arrangement of a person recognition apparatus according to the ninth embodiment. This person recognition apparatus according to the ninth embodiment has a function of determining the start of a recognizing operation, in addition to the person recognition apparatus according to the seventh embodiment described previously. That is, as shown in FIG. 51, the arrangement of this person recognition apparatus according to the ninth embodiment is obtained by adding an automatic recognition start determination unit 112 to the arrangement of the person recognition apparatus according to the seventh embodiment shown in FIG. 20. The rest of the arrangement except for this automatic recognition start determination unit 112 of the person recognition apparatus shown in FIG. 51 is the same as the person recognition apparatus shown in FIG. 20. Therefore, the same reference numerals denote the same parts, and a detailed description thereof will be omitted.

The ninth embodiment is the same as the first embodiment except that the automatic recognition start determination unit 112 as an automatic recognition start determining means is added, so a detailed description thereof will be omitted.

This automatic recognition start determination unit 112 detects (determines) that the face of a person O to be authenticated as an object of recognition is present before a camera 101, and automatically starts a recognizing operation when the face of the person O is detected. The automatic recognition start determination unit 112 determines whether "the face of a person is detected" on the basis of the result of face detection performed by a face detector 107 on an image photographed by the camera 101. If determining that the face of a person is detected, the automatic recognition start determination unit 112 automatically starts a recognizing operation.

If this automatic recognition start determination unit 112 determines whether a face is detected from one image (an image of one frame), the automatic recognition start determination unit 112 may start a recognizing operation even if there is no person. For example, if a poster on which the face of a person is printed exists in the viewing range of the camera 101, the automatic recognition start determination unit 112 may start a recognizing operation, although there is no person, because the face detector 107 detects a face from one image.

Accordingly, this automatic recognition start determination unit 112 determines the presence/absence of a person on the basis of the result of face detection from images of a plurality of frames photographed by the camera 101. That is, the automatic recognition start determination unit 112 determines the presence/absence of a person on the basis of changes in the result of face detection between images of a plurality of frames, not by using only the result of face detection from an image of one frame. Therefore, even when a poster having a face picture on it is present, the person recognition apparatus does not start a recognizing operation by mistake.

As shown in FIG. 21, the face detector 107 detects information such as the size and center coordinates of a face and the detected coordinates of the left and right eyes and nose. Hence, the automatic recognition start determination unit 112 performs a person detecting process and a recognizing operation starting process in accordance with the flow of processing as indicated by a flow chart shown in FIG. 52. That is, this person recognition apparatus automatically starts a recognizing operation only when "a face is detected over a predetermined number of frames in succession, and a fluctuation caused by the motion of the face is detected". The automatic recognition start determination unit 112 has a face detection counter 112a for storing the number of frames in which a face is detected. Also, the camera 101 continuously photographs images, and these images photographed by the camera 101 are sequentially captured into a processor 105 by an image input unit 106.

Figure 52:
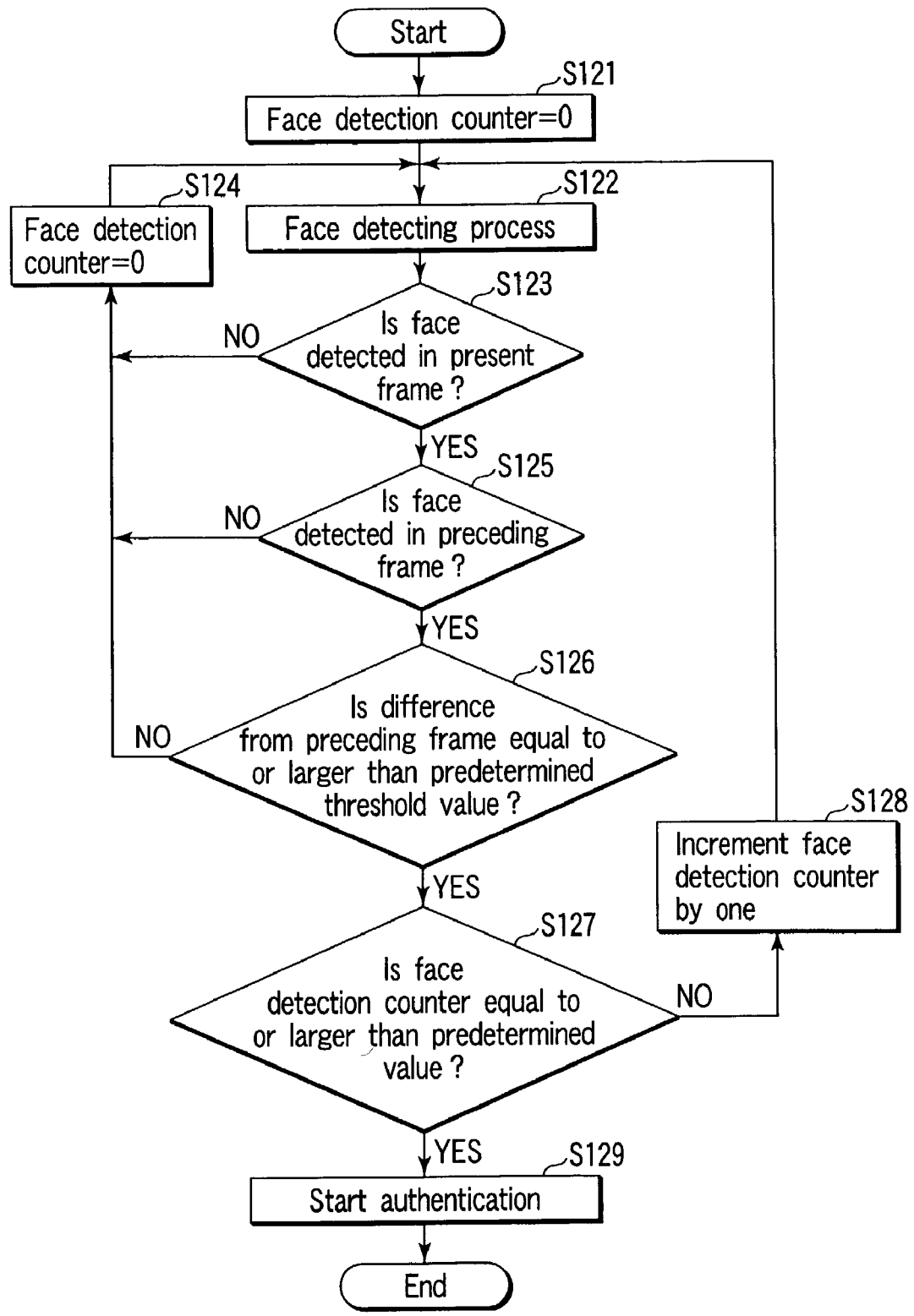
FIG. 52 is a flow chart for explaining the flow of processing by an automatic recognition start determination unit.

The flow of processing based on the flow chart shown in FIG. 52 will be explained below.

First, the automatic recognition start determination unit 112 sets the internal face detection counter 112a to "0" (step ST121), and performs a face detecting process based on the result of detection by the face detector 107 (step ST122). In this face detecting process, the automatic recognition start determination unit 112 checks whether a face is detected from an image of a present frame (step S123). If determining that no face is detected from the image of the present frame, the automatic recognition start determination unit 112 sets the face detection counter 112a to "0" (step ST124), and the flow returns to step ST122.

If determining in step ST123 that a face is detected from the image of the present frame, the automatic recognition start determination unit 112 records, in a memory (not shown), information indicating that a face is detected from the image of the present frame, and also records the image of the present frame (or a feature amount of the face detected from the image of the present frame). Additionally, if determining that a face is detected from the image of the present frame, the automatic recognition start determination unit 112 checks whether a face is also detected from an image of a preceding frame (step ST125). If determining that no face is detected from the image of the preceding frame, the automatic recognition start determination unit 112 sets the face detection counter 112a to "0" (step ST124), and the flow returns to step ST122.

If determining in step ST125 that a face is also detected from the image of the preceding frame, the automatic recognition start determination unit 112 checks whether the difference between the image of the present frame and the image of the preceding frame is equal to or larger than a predetermined threshold value (step ST126). If determining that the difference is smaller than the predetermined threshold value, the automatic recognition start determination unit 112 sets the face detection counter 112a to "0" (step ST124), and the flow returns to step ST122.

If determining in step ST126 that the difference is equal to or larger than the predetermined threshold value, the automatic recognition start determination unit 112 checks whether the value of the face detection counter 112a is equal to or larger than a predetermined threshold value (step ST127). If determining that the value of the face detection counter 112a is smaller than the predetermined threshold value, the automatic recognition start determination unit 112 sets the face detection counter 112a to "+1" (step ST128), and the flow returns to step ST122.

If determining in step ST127 that the value of the face detection counter 112a is equal to or larger than the predetermined threshold value, the automatic recognition start determination unit 112 determines that the camera 101 is photographing a person's face, and causes a recognition unit 110 to start a recognizing process.

A method of evaluating a difference indicating the motion of a face will be described below. This method will be explained by taking as an example the displacement of coordinates detected as information indicating the center of a face. As shown in FIG. 21, assuming that the center coordinates of a face detected from an image of a present frame are (fx,fy) and the center coordinates of a face detected from an image of an immediately preceding frame are (pfx,pfy), a difference Diff between the images of these two frames is calculated by the following equation. With this difference Diff, the automatic recognition start determination unit 112 can detect the motion of a person's face (i.e., detect whether there is an actual person).

$$\text{Difference Diff}=|fx-pfx|+|fy-pfy|$$

Accordingly, this difference Diff is 0 if no face is detected from at least one of the image of the preceding frame and the image of the present frame, and has a value larger than 0 if faces are continuously detected. If this difference Diff is larger than a predetermined threshold value Th, the automatic recognition start determination unit 112 increments the value of the face detection counter 112a for determining that "a moving face is present". If this condition is not met, the automatic recognition start determination unit 112 resets the face detection counter 112a to "0".

If the value of this face detection counter 112a is equal to or larger than a predetermined threshold value ThCount, the automatic recognition start determination unit 112 can determine that "a moving face is present in consecutive frames", and thereby determines that a recognizing process can be automatically started.

The presence of a person may also be determined on the basis of the total value of the absolute values of displacements with respect to coordinates indicating the positions of face parts such as the eyes and nose. It is also possible to determine the presence of a person on the basis of the absolute value of a difference with respect to the area (face size) of a face region. Alternatively, the presence of a person may be determined on the basis of the difference between an image of a preceding frame and an image of a present frame in a rectangular region represented by a width ±fw/2 and a length ±fh/2 around the center coordinates (fx,fy) of the detected face, or on the basis of an evaluation amount such as a correlation value. That is, the presence of a person can be determined by setting a difference in face feature amount between images of consecutive frames and a threshold value corresponding to the difference.

In the person recognition apparatus according to the ninth embodiment as described above, the camera 101 continuously photographs images, and the presence of a person is determined on the basis of a difference in feature amount between faces detected from the consecutive images photographed by the camera 101. If the presence of a person is found, a recognizing process is started. Therefore, even when something like a person's face is detected from an image photographed by the camera, no recognizing process is started if the motion of the face is not detected. Accordingly, even if the camera has photographed an object, such as a poster having a person's face printed on it, which is easily detected as a person's face by mistake, no recognizing operation is started (no operation error is caused) by detecting the presence of a person by mistake.

The 10th embodiment will be described below.

This 10th embodiment is a gate control apparatus which controls passage of a passerby on the basis of the result of recognition of a passerby performed by the person recognition apparatus explained in the seventh (or eighth) embodiment. That is, the 10th embodiment is an example in which the person recognition apparatus explained in the seventh (or eighth) embodiment is applied to a gate control apparatus.

Figure 53:
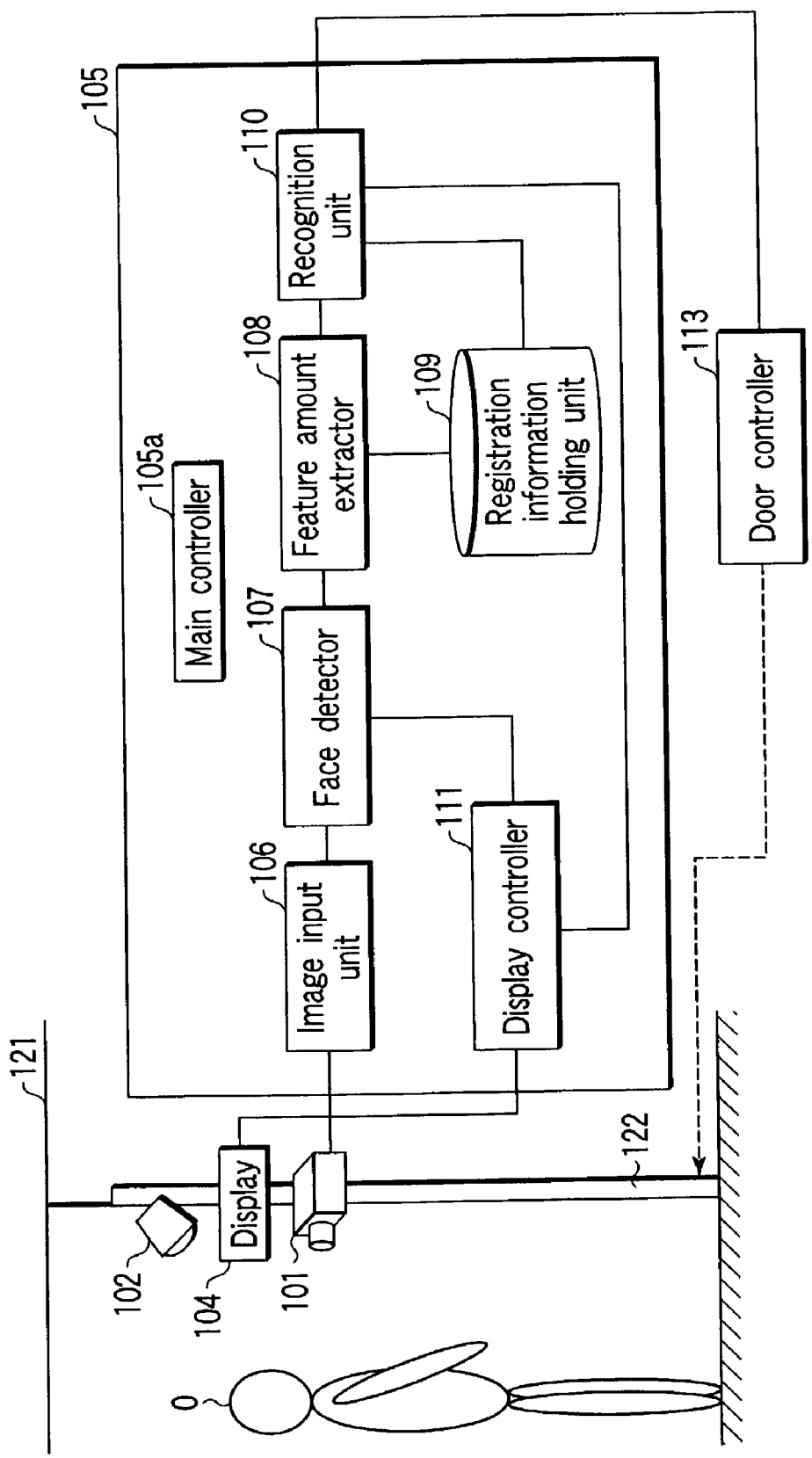
FIG. 53 is a block diagram schematically showing the arrangement of a gate control apparatus according to the 10th embodiment.

FIG. 53 schematically shows the arrangement of the gate control apparatus according to the 10th embodiment. This gate control apparatus performs doorway monitoring of an important facility (e.g., a high-security room). The gate control apparatus recognizes a face image of a user (passerby) and, on the basis of the recognition result, controls opening/closure of the door of the important facility. As shown in FIG. 53, this gate control apparatus comprises a camera 101, an illuminator 102, a display 104, processor 105, and a door controller 113 which controls opening/closure of a door 202 of an important facility 201 in accordance with the result of recognition by a recognition unit 110.

The arrangement shown in FIG. 53 is the same as the person recognition apparatus shown in FIG. 20 except for the door controller 113. Therefore, the same reference numerals as in the person recognition apparatus shown in FIG. 20 denote the same parts in FIG. 53, and a detailed explanation thereof will be omitted.

If the calculated similarity is larger than the threshold value in step S106 or S111 of FIG. 23, the recognition unit 110 outputs a "door open" signal to the door controller 113. If the calculated similarity is smaller than the threshold value in step S111 of FIG. 23, the recognition unit 110 outputs a "door close" signal to the door controller 113.

When receiving the "door open" signal from the recognition unit 110, the door controller 113 opens the door 202 to permit the entrance of a person (in this case, a passerby) O to be recognized. When receiving the "door close" signal from the recognition unit 110, the door controller 113 keeps the door 202 closed to reject the entrance of the passerby O.

In the 10th embodiment as described above, the passage of a passerby can be controlled by using the person recognition apparatus explained in the seventh (or eighth) embodiment.

In the above 10th embodiment, operation when the person recognition apparatus explained in the seventh (or eighth) embodiment is applied is explained. However, the person recognition apparatus explained in the ninth embodiment is also applicable. This arrangement using the person recognition apparatus explained in the ninth embodiment is shown as the 11th embodiment in FIG. 54. This gate control apparatus according to the 11th embodiment shown in FIG. 54 uses the person recognition apparatus according to the ninth embodiment described earlier. The passerby authenticating process by this 11th embodiment is the same as the operation explained in the ninth embodiment. Also, the operation of controlling the passage of a passerby is the same as the 10th embodiment. Therefore, a detailed description thereof will be omitted.

As described in detail above, the seventh to 11th embodiments can provide a person recognition apparatus and gate control apparatus capable of reducing a lowering of the person recognition rate caused by the angle at which a person is illuminated or a difference between the sizes of face images, thereby performing high-accuracy recognition.

Also, the seventh to 11th embodiments can provide a person recognition apparatus and gate control apparatus capable of performing stable high-accuracy recognition regardless of the posture, standing position, or face direction during recognition, thereby improving the person recognition rate.

Furthermore, the seventh to 11th embodiments can provide a person recognition apparatus and gate control apparatus which hardly cause detection errors or operation errors even if a poster having a person's face printed on it exists in the viewing range of a camera as an image input unit.

The 12th to 17th embodiments of the present invention will be described below.

FIGS. 55 and 56 are front views showing the external appearance of user interface units 210 of face image collating apparatuses as person recognition apparatuses according to the 12th to 17th embodiments. In the arrangement of the face image collating apparatus shown in FIG. 55, the user interface unit 210 has a display 201, camera 202, and linear light sources 203 and 204. In the arrangement of the face image collating apparatus shown in FIG. 56, the user interface unit 210 has an operation unit 205 in addition to the display 201, camera 202, and linear light sources 203 and 204.

The display 201 displays an image being photographed by the camera 202 and displays guidance to a user (person to be authenticated). The camera 202 photographs a motion image or a continuous image. This camera 202 is placed below the display 201 and photographs, slightly from below, the face of a user watching the display 201.

The linear light source 203 laterally illuminates the face of a user in front of the camera 202 with light. The linear light source 204 illuminates, obliquely from below, the face of a user in front of the camera 202 with light. If the illumination environment of the installation place of the face image collating apparatus is good, illuminators such as the linear light sources 203 and 204 are unnecessary.

The face image collating apparatus shown in FIG. 56 has the operation unit 205 in addition to the display 201, camera 202, and linear light sources 203 and 204. This operation unit 205 is a ten-key pad or the like. A user uses this operation unit 205 to input an ID code as identification information which is given to each user to specify that individual, or to input a password (to be described later).

Figure 57:
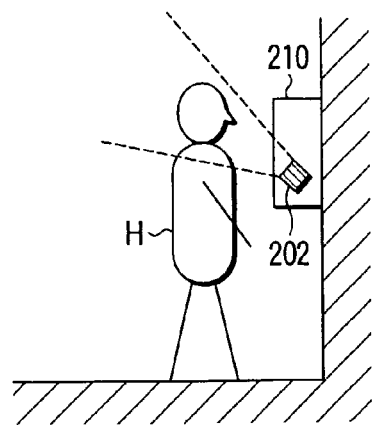
FIGS. 57 and 58 are side views showing installation examples of the face image collating apparatus.
Figure 58:
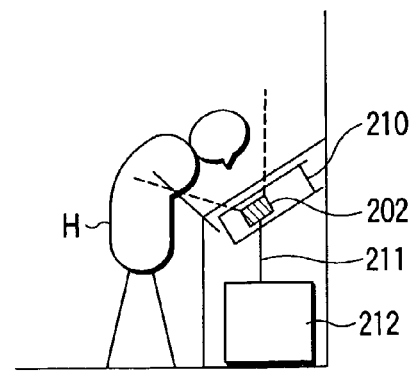

FIGS. 57 and 58 are side views showing installation examples of the face image collating apparatus.

FIG. 57 is a side view showing an installation example of the face image collating apparatus having a hanging-up-on-the-wall type user interface unit 210. Referring to FIG. 57, the user interface unit 210 configured as shown in FIG. 55 or 56 is hung on the wall. The face of a user H standing in front of this user interface unit 210 is photographed by the camera 202 from below.

FIG. 58 is a side view showing an installation example of the face image collating apparatus having a stationary type user interface unit 210. Referring to FIG. 58, the camera 202 is installed diagonally below a user H standing in front of the user interface unit 210. Therefore, the user H looks into the camera 202 from above. In this installation example shown in FIG. 58, the user interface unit 210 configured as shown in FIG. 55 or 56 of the face image collating apparatus is connected to a processing unit 221 by a cable 211.

Figure 59:
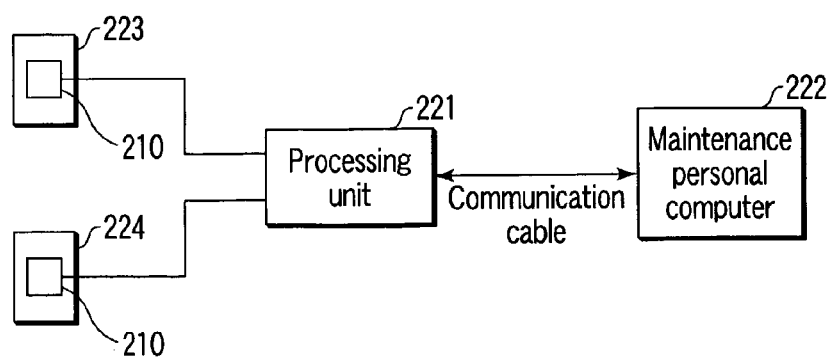
FIG. 59 is a block diagram showing an arrangement when the user interface units are attached to doors.

FIG. 59 is a block diagram showing an arrangement when the user interface units 210 are installed in a plurality of locations such as doors 223 and 224. In this arrangement shown in FIG. 59, the user interface units 210 at the doors 223 and 224 are connected to a processing unit 221. This processing unit 221 is connected to a maintenance personal computer 222 via a communication cable. Note that an arrangement in which a maintenance personal computer is connected to a face image collating apparatus will be described in detail later in the 14th embodiment.

FIG. 60 is a block diagram showing the overall arrangement as a control system of the face image collating apparatus.

As shown in FIG. 60, a processing unit 230 (212, 221) of the face image collating apparatus includes a processor 231, work memory 232, program memory 233, image memory 234, capture board 235, recorder interface 236, face collating dictionary 237, recorder 238, display controller 239, and illumination controller 240.

The processor 231 controls the entire face image collating apparatus. Also, this processor 231 is connected to the display 201, camera 202, and linear light sources 203 and 204 of the user interface unit 210 shown in FIG. 55 or 56 and controls these components. When the user interface unit 210 is equipped with the operation unit 205 as shown in FIG. 56, this operation unit 205 is connected to the processor 231. Information input from the operation unit 205 is supplied to the processor 231.

The work memory 232 temporarily stores an image currently being processed. The program memory 233 stores control programs and the like. The image memory 234 stores image data. This image memory 234 stores a face image photographed by the camera 202 and supplied to the processing unit 230 via the capture board 235. The capture board 235 is an interface for capturing an image photographed by the camera 202 into the processing unit 230.

The recorder interface 236 performs data read and write to the face collating dictionary (dictionary) 237 and to the recorder 238. The face collating dictionary (dictionary) 237 stores data to be collated with a face image photographed by the camera 202. This dictionary 237 also registers a face image and user information as collation data and a face feature pattern (face pattern) as a face feature amount for each user.

In the following explanation, each user data registered in the dictionary 237 will be also referred to as face data. The recorder 238 records a face image and log information as log data. Note that the face collating dictionary 237 and the recorder 238 may also be installed outside the processing unit 30. Note also that the face collating dictionary 237 and the recorder 238 may be installed in an external apparatus on a network capable of communication via an interface.

The display controller 239 controls the display screen of the display 201. When the display 201 is a display device having a built-in touch panel, the display controller 239 has functions of controlling the display screen of the display 201 and supplying the contents input from the touch panel by a user to the processor 231. The illumination controller 240 controls the light sources 203 and 204, thereby controlling light emitted by these light sources 203 and 204.

The camera 202 is a monochromatic video camera using a CCD or CMOS image sensor. If a color camera is used as this camera 202, the process of converting a color image into a monochromatic image is added. The capture board 235 converts a video signal (analog data) into digital data (A/D conversion), and supplies this digital data to the image memory 234 (buffering). The processor 231 sequentially loads image data stored in the image memory 234 into the work memory 232 and performs various processes.

If the camera 202 includes a USB (Universal Serial Bus) interface, the capture board 235 need only be given a USB interface without having any A/D conversion circuit. Even when the camera 202 includes another digital interface such as IEEE1394, the capture board 235 need only be given a corresponding interface.

In the following explanation, one face image (still image) photographed by the camera 202 is to be processed. However, a plurality of face images photographed by the camera 202 can also be processed. This is to obtain good data from a plurality of face images by taking account of variations in the photographing conditions caused by the position and motion of a person to be photographed or by environmental variations such as illumination. As a plurality of face images, consecutive face images (motion images) are captured at predetermined time intervals and buffered into the image memory of the capture board shown in FIG. 56.

Such motion images are used in two ways, i.e., used only in face image registration or used in both face image registration and collation. When motion images are to be processed, the flow of face image registration or collation is as follows. That is, from a plurality of feature vectors (to be described later) obtained from a plurality of face images, a face pattern (to be described later) of a user is generated by statistical processing such as main component analysis, and this face pattern is registered and collated. This method of extracting a face pattern from a plurality of face images can be, e.g., the method disclosed in reference 2.

When the user interface unit 210 is attached to a door as shown in FIG. 59, the processing unit 230 includes a door control mechanism for opening/closing or locking/unlocking the door. This door control mechanism is connected to the processor 231. This allows the face image collating apparatus to be applied to a doorway monitoring system for controlling opening/closure of a door.

The basic face image registration and authentication processes by the face image collating apparatus configured as above will be explained below.

FIG. 61 is a flow chart showing the flow of the face image registration process performed by the processor 231. As shown in FIG. 61, an operator such as the manager of the face image collating apparatus enters a user's ID code and password from the operation unit such as a keyboard (not shown) (step S211). Generally, the ID code is provided by the manager of the apparatus, and a user freely sets the password.

When the ID code and password are thus input, the processor 231 of the face image collating apparatus performs the process of inputting a user's face image (step S212). In this face image input process, under the control of the processor 231 a user's face image is photographed by the camera 202 and captured by the capture board 235. After capturing the photographed face image, the processor 231 searches the whole captured image for a face image region (step S213).

If no face image region can be detected, the processor 231 returns to the face image input process and again executes the face image region detecting process. If a face image region is detected, the processor 231 extracts feature points from the detected face image region (step S214). In this feature point extraction process, pupil regions and naris regions substantially regarded as circular regions are detected in the detected face image region, and the centers of these detected regions are extracted as feature points of the face image.

After extracting the feature points, the processor 231 sequentially extracts collation regions based on the positions of these feature points (step S215). After thus extracting the collation regions, the processor 231 normalizes the size of each collation region by geometric correction (step S216). The processor 231 also normalizes the density distribution of each collation region by density correction (step S217). When completing these processes, the processor 231 calculates (generates) a feature vector (face pattern) as a face feature amount on the basis of the extracted feature points (step S218). The processor 231 then registers the calculated feature vector into the face collating dictionary 237 in one-to-one correspondence with the face image, user information, and the like (step S219). By the above processing, the data of one user is completely registered. The whole registration process is completed by performing the above processing for all users.

Next, the face image collating process will be explained.

FIG. 62 is a flow chart for explaining the face image collating process performed by the processor. Note that this collating process is similar to the registration process shown in FIG. 61. That is, the processes in steps S222 to S228 in FIG. 62 are the same as the processes in steps S212 to S218 in FIG. 61, so a detailed description thereof will be omitted. Note also that the operation of a 1:1 collation mode in which a face image is collated with face data in the dictionary 237 designated by the ID code by a user (this mode will be simply referred to as a "1:1 collation mode" hereinafter) will be explained.

That is, the user first enters the ID code from the operation unit 205 (step S221). The processor 231 specifies a face image registered in the dictionary 237 and corresponding to the input ID code. When the ID code is input, the processor 231 photographs the face of the user who has entered the ID code, and generates a feature vector (face pattern) as a face image feature amount from the photographed face image, as the processes in steps S222 to S228. After generating the face pattern from the photographed face image, the processor 231 performs collation with the dictionary 237 (step S229).

In this collation, the processor 231 first calculates the degree of collation (similarity) between the feature vector generated in step S228 and the feature vector of the face image corresponding to the ID code input in step S221. If this calculated collation degree is larger than a predetermined threshold value, the processor 231 determines that "collation is successful"; if not, the processor 231 determines that "collation is unsuccessful". If the collation is unsuccessful, the face image collating apparatus performs user authentication by a substitute means such as collation of a password. Note that the threshold value for determining whether face image collation is successful can be fixed on the program or stored in the dictionary 237 in one-to-one correspondence with each face pattern.

Next, a collating process in which no ID code input is performed will be described below. That is, the operation of a 1:N collation mode in which a photographed face image is collated with all face images in the dictionary 237 (in this embodiment, the number of face images registered in the dictionary 237 is N) without designating any face image in the dictionary by using the ID code by a user (this mode will be simply referred to as a "1:N collation mode" hereinafter) will be explained.

Figure 63:
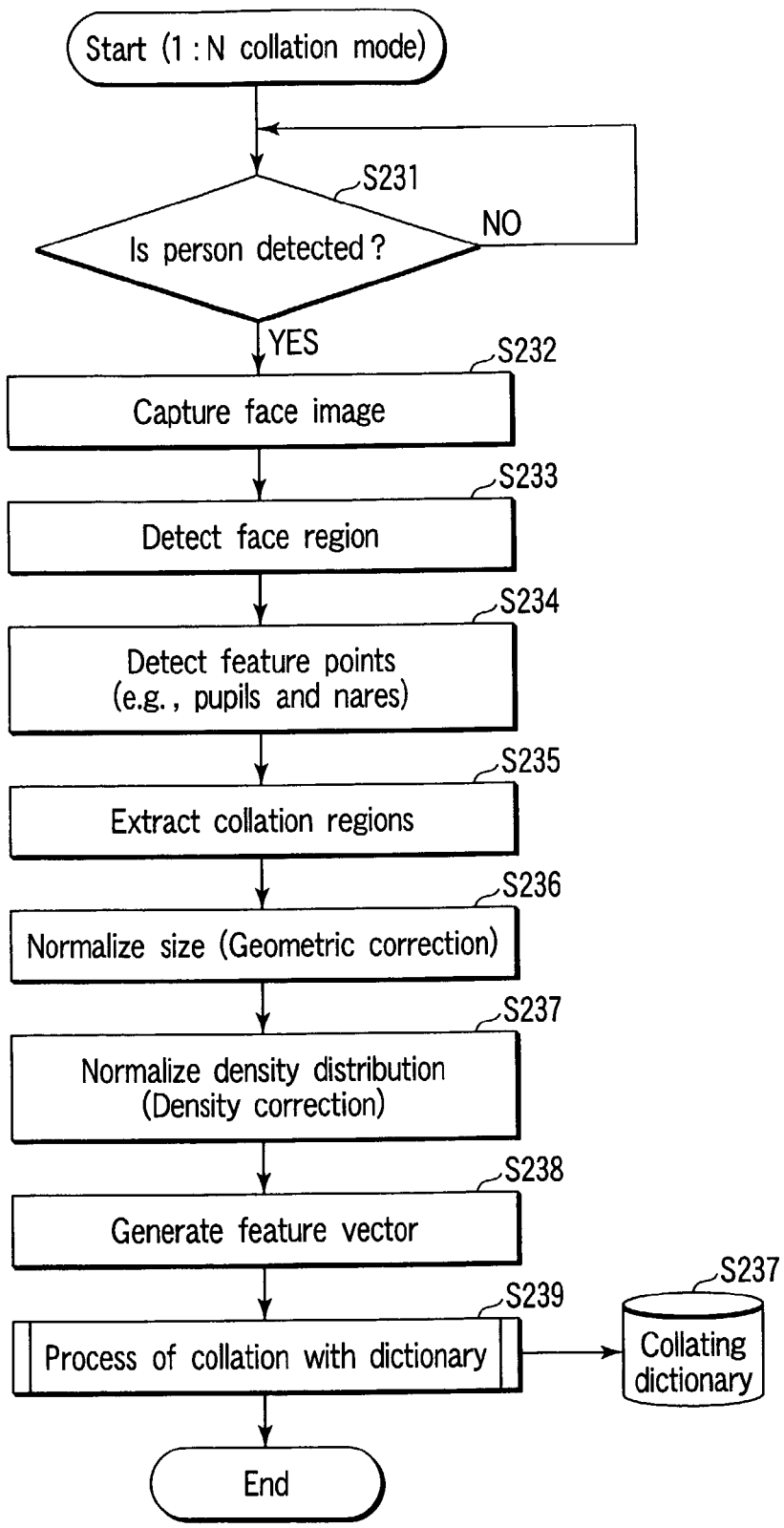
FIG. 63 is a flow chart for explaining the operation of a 1:N collation mode.

FIG. 63 is a flow chart for explaining the operation of this 1:N collation mode. As shown in FIG. 63, the face image collating apparatus first starts photographing a user's face image if the presence of a user is sensed by a human sensor 255 (YES in step S231). The processes from capturing of the photographed image to generation of a face pattern are the same as in steps S222 to S228 (steps S232 to S238). After generating the face image from the photographed face image, the processor 231 collates the face pattern of the photographed face image with all face patterns (the total number is N) registered in the dictionary 237.

On the basis of this collation, the processor 231 determines that the collation is successful only when the degree of collation with the photographed face image is a maximum and this collation degree is equal to or larger than a predetermined threshold value. The processor 231 outputs the ID code of a face pattern having the maximum collation degree. In other cases, the processor 231 determines that the collation is unsuccessful. If the collation is unsuccessful, this face collating apparatus performs authentication by using a substitute means which performs authentication to check whether the user is the person himself or herself by accepting input of the ID code or password.

In FIGS. 62 and 63, the operations of the 1:1 collation mode and 1:N collation mode are explained. However, there is also a "group collation mode" as an intermediate mode of these collation modes. In this "group collation mode", a dictionary is formed for each of several groups, or each face image is given identification information indicating a group to which the face image belongs. In the first step of a collating process, a group ID code rather than a personal ID code is input, and the processor 231 narrows down face images to be collated. Then, the processor 231 collates a photographed face image with all the narrowed down face images. In this group collation mode, therefore, no matter how the number of face images registered is large, face images to be collated can be narrowed down. This maintains a certain collation accuracy.

The 12th to 17th embodiments using the face image collating apparatus configured as above will be described below.

First, the 12th embodiment will be explained.

Figure 64:
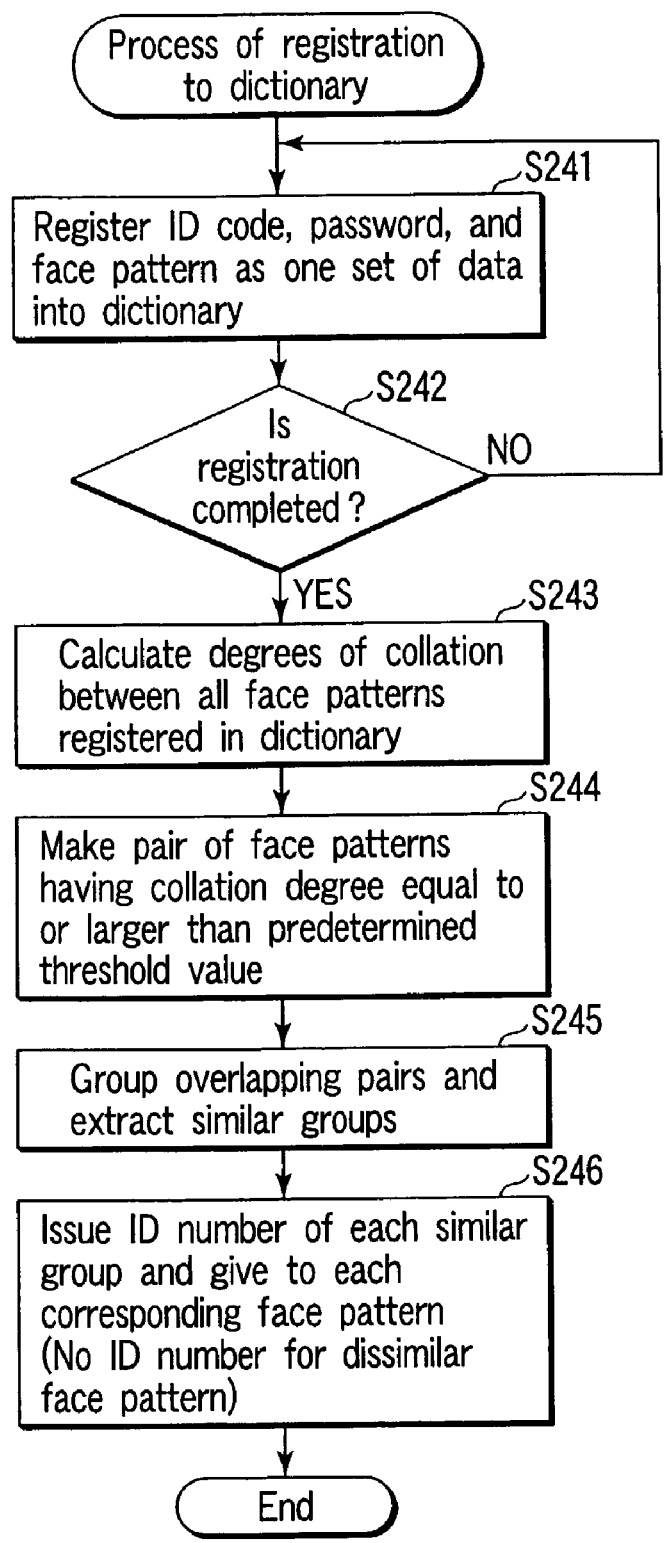
FIG. 64 is a flow chart for explaining a dictionary registration process as the 12th embodiment.

This 12th embodiment is characterized in the processes of dictionary registration and dictionary collation. FIG. 64 shows a detailed process flow. The dictionary registration process as the 12th embodiment will be explained below with reference to this flow chart shown in FIG. 64. The process of registration to the dictionary 237 is basically performed following the procedure shown in FIG. 61. The processing explained using FIG. 64 corresponds to step S219 in FIG. 61.

That is, the processor 231 writes in the dictionary 237 the ID code, password, and face image feature vector obtained in steps S211 to S218 as one set of data (step S241). Consequently, one user (or one face image) is registered in the dictionary 237. The processor 231 returns to step S211 to repeat the registration process for other unregistered users, until it is determined that all registrants are completely registered in the dictionary 237 (NO in step S242).

If determining that all registrants are completely registered in the dictionary 237 (YES in step S242), the processor 231 determines the degrees of collation between all the face patterns registered in the dictionary 237 (step S243). On the basis of the result of this determination, the processor 231 checks whether a collation degree equal to or larger than a predetermined threshold value exists.

If determining that a collation degree equal to or larger than the predetermined threshold value exists, the processor 231 pairs face patterns having this collation degree equal to or larger than the predetermined threshold value (step S244). After extracting all pairs of face patterns having collation degrees equal to or larger than the predetermined threshold value, the processor 231 groups pairs whose face patterns overlap, thereby extracting groups having similar face patterns (step S245).

Figures 65, 66:
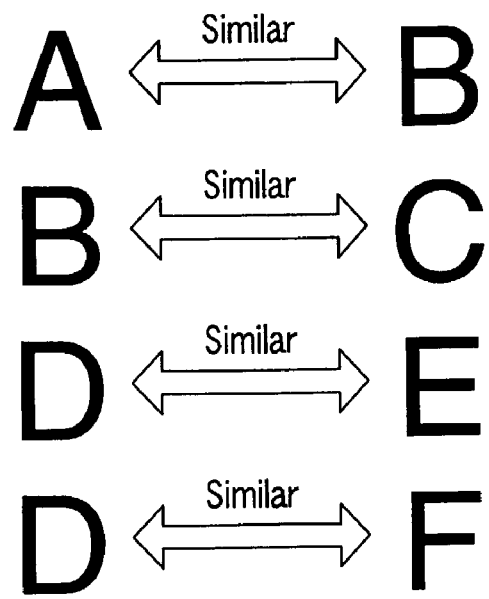
FIG. 65 is a view for explaining combinations of similar face patterns.
FIG. 66 is a view for explaining combinations of similar face patterns.

For example, as shown in FIGS. 65 and 66, assume that a plurality of face data A, B, C, D, E, F, . . . , are registered in the dictionary 237. From face patterns of these face data, the processor 231 extracts, as shown in FIG. 65, A and B, B and C, D and E, and E and F, as pairs having collation degrees equal to or larger than the predetermined threshold value (step S244). In this case, as shown in FIG. 66, the processor 231 extracts a group (A,B,C) and a group (D,E,F) as similar groups (step S245).

After thus extracting similar groups, the processor 231 issues an ID number (information indicating that there is a similar face pattern) to each similar group. After issuing ID numbers to these similar groups, the processor 231 gives each face data the ID number of the corresponding similar group, and terminates the registration process (step S246). It is also possible to give information indicating that there is no similar face pattern to face data which does not belong to any similar group.

In this embodiment, similar groups having similar face patterns are extracted after the registration of all users is completed. However, the extraction and registration of similar groups as described above may be performed at any timings. For example, similar groups can be extracted and registered for every predetermined period.

Figure 67:
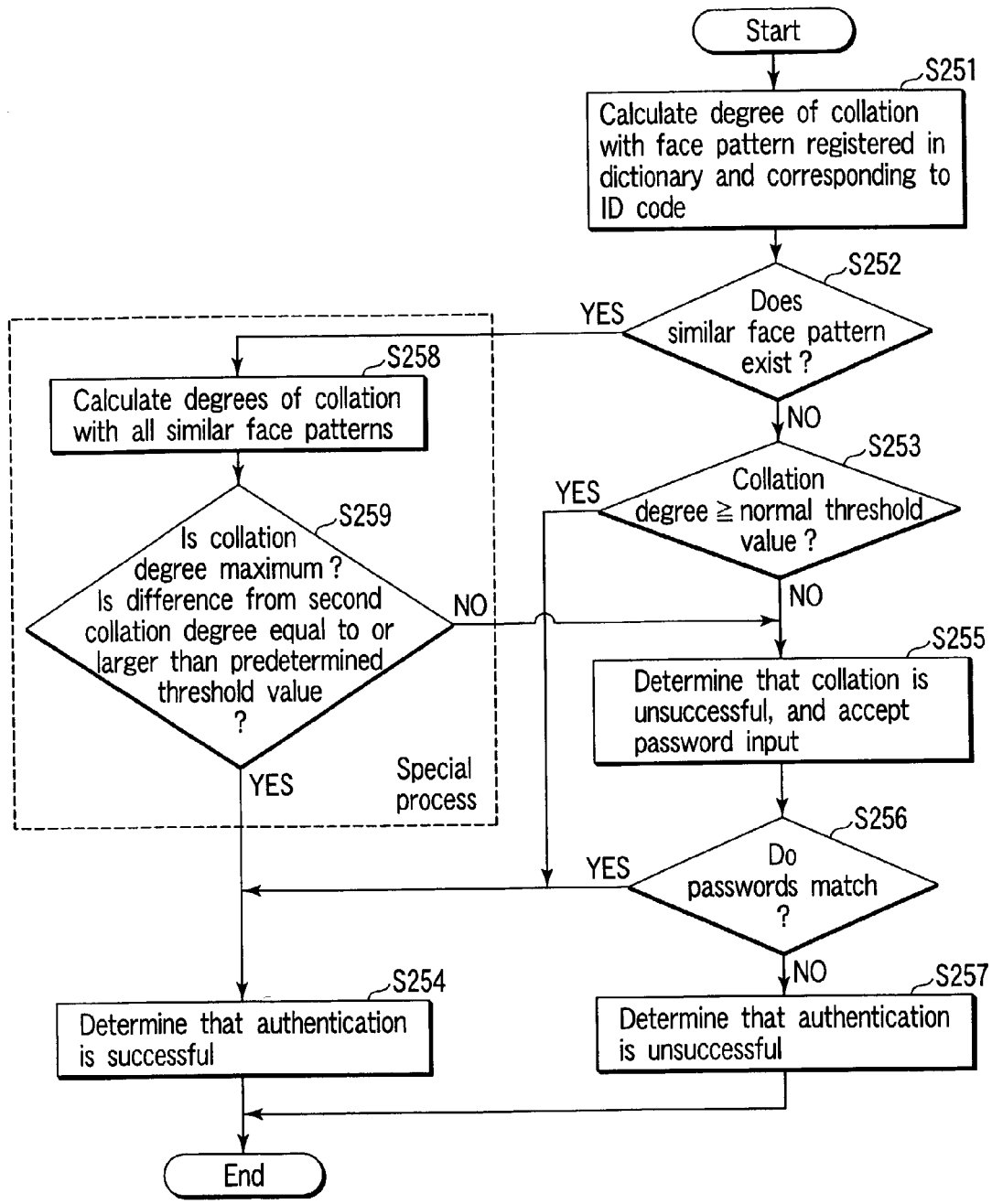
FIG. 67 is a flow chart for explaining collation for face data registered in a dictionary by the registration process shown in FIG. 64.

A collating process for the face data registered in the dictionary 237 by the registration process as shown in FIG. 64 will be described with reference to a flow chart shown in FIG. 67.

This process of collating photographed face data with the face data registered in the dictionary 237 corresponds to step S229 described above. That is, the processor 231 reads out a face pattern corresponding to the ID code input by the user in step S221 from the dictionary 237. The processor 231 then calculates the degree of collation between a face pattern obtained from the photographed face image and the face pattern read out from the dictionary 237 (step S251).

After thus calculating the collation degree, the processor 231 checks whether another face pattern similar to the face pattern corresponding to the ID code input by the user exists in the dictionary 237 (step S252). This is done by checking the presence/absence of information given to each face pattern and indicating the existence of a similar pattern. If determining that no similar face pattern exists (NO in step S252), the processor 231 performs a normal collating process (first collating process).

In this normal collating process, the processor 231 checks whether the calculated collation degree is equal to or larger than a predetermined threshold value (step S253). If determining that the calculated collation degree is equal to or larger than the predetermined threshold value, the processor 231 determines that the collation is successful, and authenticates the user as the person himself or herself (step S254).

If determining that the calculated collation degree is smaller than the predetermined threshold value, the processor 231 determines that the collation is unsuccessful. In this case, the processor 231 prompts the user to enter a password and accepts the password input from the user, as a substitute means for the face collating process (step S255). When the user enters the password, the processor 231 checks whether the input password matches a preset password corresponding to the ID code (step S256). If determining that the two passwords match, the processor 231 authenticates the user as the person himself or herself (step S254). If determining that the passwords do not match, the processor 231 determines that the user is not authenticated as the person himself or herself (step S257).

If determining in step S252 that a similar pattern exists, the processor 231 performs a special process (second collating process) different from the normal collating process. This special process is performed for a face pattern having a similar face pattern in the dictionary 237. In this example shown in FIG. 67, the following processing is performed as the special process.

That is, if determining in step S252 that a similar pattern exists, the processor 231 searches for all face patterns which belong to the same similar group as the face pattern of interest, on the basis of ID information indicating the existence of similar face patterns. The processor 231 then calculates the degrees of collation between the face pattern of interest and all the face patterns found which belong to the similar group (step S258).

On the basis of this calculation result, the processor 231 checks whether the degree of collation with the face pattern corresponding to the ID code input by the user is a maximum, and the difference between this collation degree and the collation degree of a (second) face pattern whose collation degree is second highest is equal to or larger than a predetermined threshold value (step S259). If determining that the degree of collation with the face pattern of interest is a maximum and the difference from the second highest collation degree is equal to larger than the predetermined threshold value, the processor 231 determines that the collation is successful, and authenticates the user as the person himself or herself (step S254).

In the above example, the operation of the 1:1 collation mode is explained. However, this embodiment is also applicable to the 1:N collation mode. In this 1:N collation mode, the processor 231 calculates the degrees of collation with all face patterns in the dictionary 237, and finds a face pattern having the maximum collation degree. If this face pattern with the maximum collation degree has a similar pattern, the processor 231 performs the special process as described above. Consequently, even in the 1:N collation mode, the collating process including the special process can be performed in the same manner as in the 1:1 collation mode.

In the 12th embodiment as described above, if a plurality of similar face patterns are registered in the dictionary, these similar face patterns are grouped into a similar group, and these face patterns which belong to the similar group are collated by the special process different from the normal collating process. Accordingly, even when similar face patterns exist in the dictionary, it is possible to maintain a certain collating performance and security level.

Next, a modification to this 12th embodiment will be described.

In the operation explained with reference to FIG. 67, the special process is to check, if similar face patterns exist, whether the degree of collation with the face pattern of interest is a maximum, and the difference between this degree of collation with the face pattern of interest and the degree of collation with the second face pattern is equal to or larger than a predetermined threshold value. However, the special process is not limited to this one. For example, in a case where a similar pattern exists, in step S246, it is also possible to set a threshold value higher than a normal threshold value used in a collating process performed when no similar pattern exists. And, if a similar pattern exists in step S252, check as a special process whether the degree of collation with the face pattern of interest is equal to or larger than the threshold value higher than the normal threshold value. Alternatively, if the degree of collation with the face pattern of interest is lower than the degree of collation with any other face pattern (if no similar face pattern exists), it is also possible to set a threshold value lower than a normal threshold value in step S246. This collation degree is compared with a threshold value lower than the normal threshold value.

That is, in this modification the threshold value of the collating process is changed in accordance with the presence/absence of a similar pattern. The operation when the threshold value of a collating process is set for each face pattern registered in the dictionary 237 in accordance with a difference from the degree of collation with another face pattern will be explained.

Figure 68:
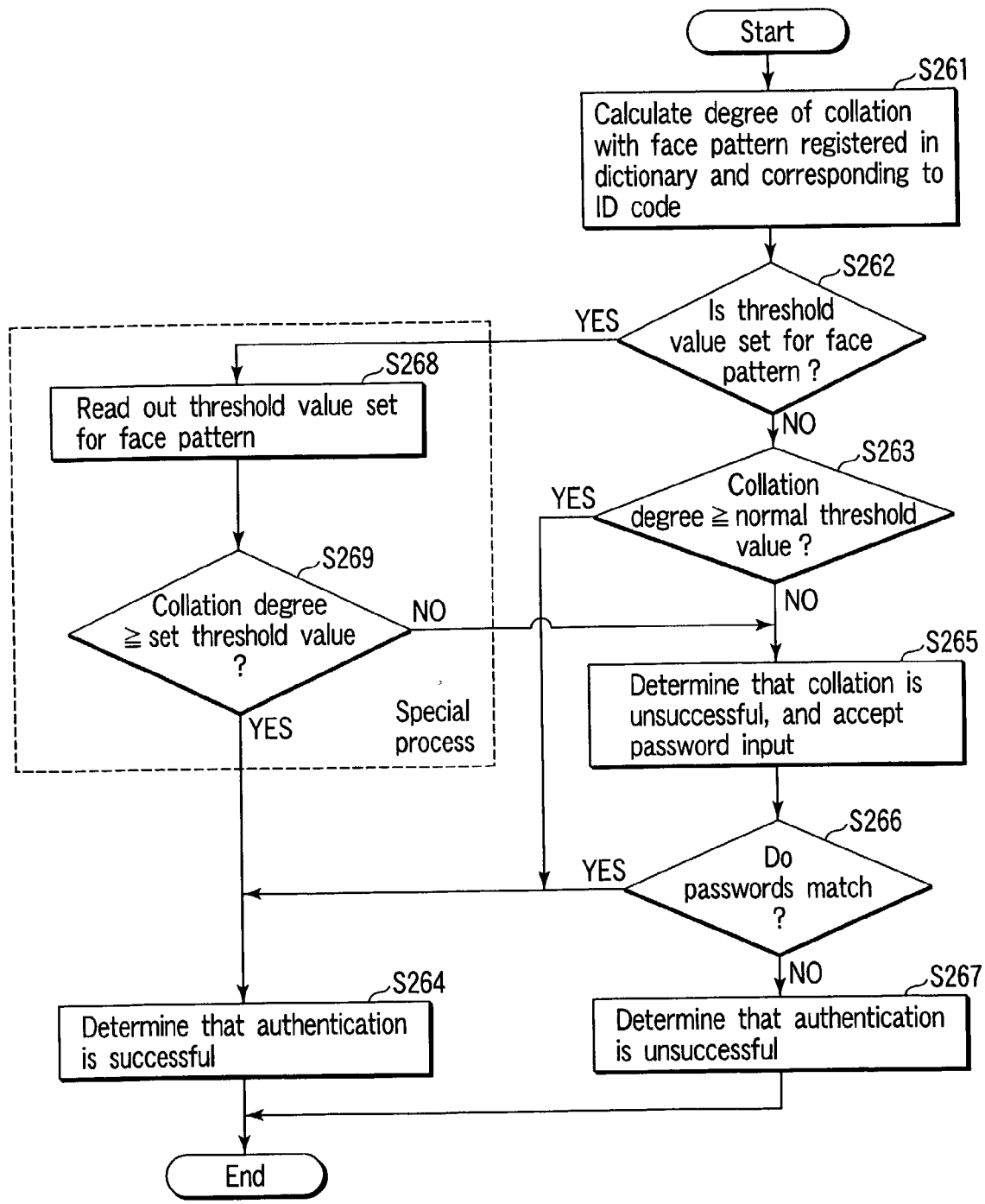
FIG. 68 is a flow chart for explaining a modification according to the 12th embodiment.

FIG. 68 is a flow chart for explaining the operation of this modification. In this operation shown in FIG. 68, a threshold value is set for a face pattern to be collated by a threshold value different from a normal threshold value (in step S246), and a face pattern to which a threshold value different from the normal threshold value is set is collated by using the set threshold value. Note that step S261 and steps S263 to S267 in FIG. 68 are the same as step S251 and steps S253 to S257 in FIG. 67, so a detailed description thereof will be omitted.

That is, as shown in FIG. 68, if a threshold value different from a normal threshold value is set for a face pattern which is registered in the dictionary 237 and which corresponds to the ID code (YES in step S262), the processor 231 performs a special process. In this special process, the processor 231 first reads out the threshold value set for this face pattern (step S268).

Then, the processor 231 checks whether the degree of collation between the photographed user's face pattern and that face pattern in the dictionary 237, which corresponds to the ID code is equal to or larger than the threshold value set for the latter face pattern (step S269). If determining that the collation degree is equal to or larger than the threshold value, the processor 231 determines that the collation is successful, and authenticates the user as the person himself or herself (step S264). If determining that the collation degree is smaller than the threshold value, the processor 231 determines that the collation is unsuccessful, and the flow advances to step S265.

In this modification of the 12th embodiment as described above, when a face pattern is registered, a threshold value of a collation degree is set for this face pattern on the basis of a difference from similarity with another face pattern in the dictionary. As a consequence, efficient collation can be performed while a certain collating performance is maintained.

The 13th embodiment will be described below.

This 13th embodiment is characterized in that a plurality of face patterns of the same user are registered in (added to) the dictionary 237. This dictionary 237 will be referred to as a "multi-entry dictionary" hereinafter. Since a plurality of face data of the same user are registered in this multi-entry dictionary, an additional code is registered as user information in addition to an ID code. This additional code is information given to each face data and used to specify the face data.

Figure 69:
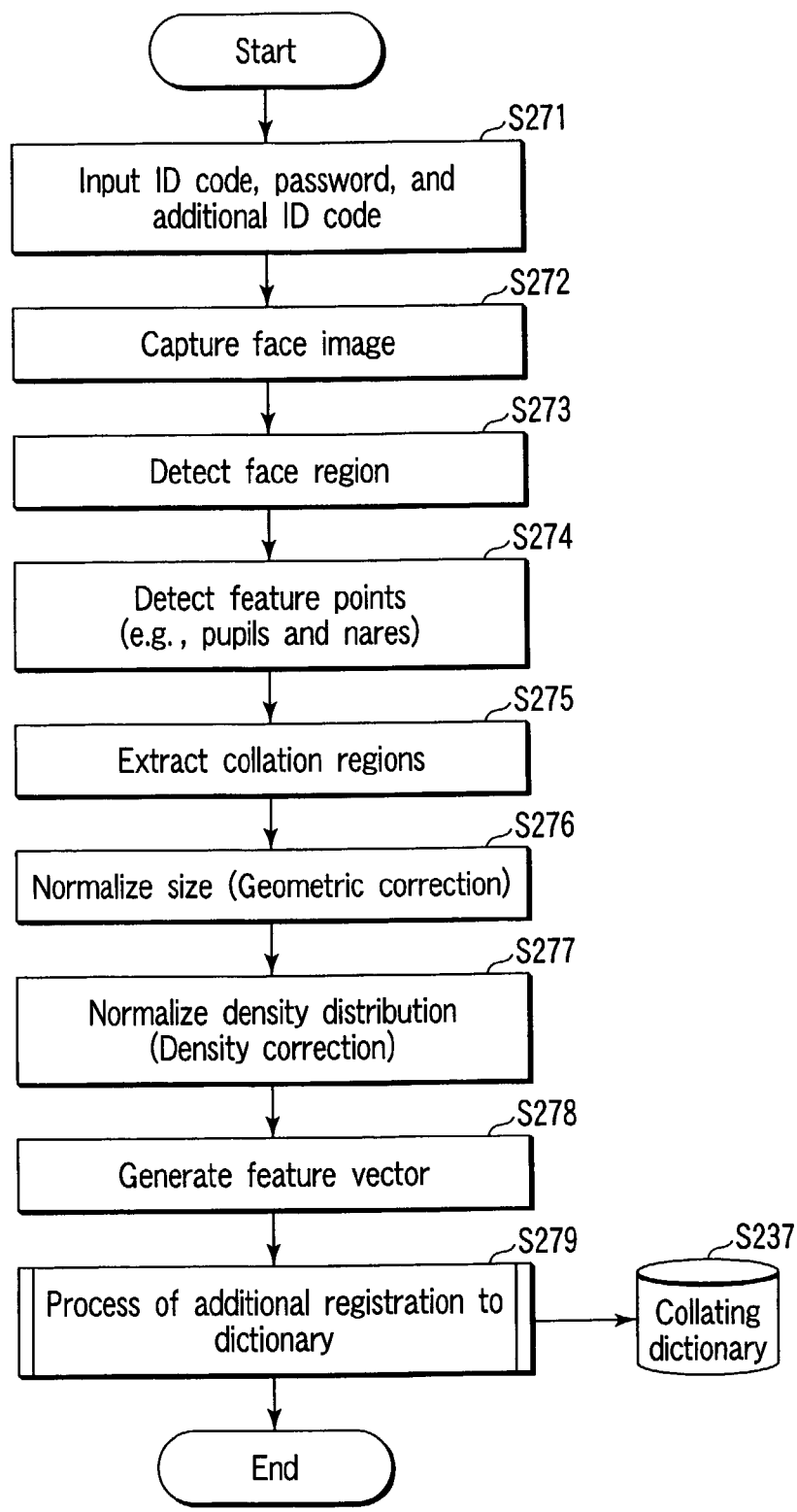
FIG. 69 is a flow chart for explaining the flow of processing when a face pattern of the same user is to be added to the dictionary.

FIG. 69 is a flow chart for explaining the flow of a process of adding a face pattern of the same user to the dictionary 237. First, an operator such as the manager of the face image collating apparatus 230 inputs user information such as the ID code, password, and additional code by using the operation unit such as a keyboard (not shown) (step S271). Since the user is the same person, the ID code and password other than the additional code must be the same as the data (already registered data) input during initial registration. The additional code can be freely determined by the user or can be determined by the manager. This additional code can also be determined beforehand like "glasses" if the user wears glasses.

When the user information such as the ID code, additional code, and password are input, the face image collating apparatus 230 performs processes such as user face image input (step S272), face image region search (step S273), feature point extraction (step S274), collation region extraction (step S275), size normalization (step S276), density distribution normalization (step S277), and feature vector generation (step S278), as in steps S212 to S218 described earlier. After generating a feature vector (face pattern), the processor 231 additionally registers the generated face pattern together with the user information into the face collating dictionary 237 (step S279). By the above processing, a face pattern of the same user is added. That is, by this additional registration, a plurality of face data of the same user are registered in the dictionary 237.

Figure 70:
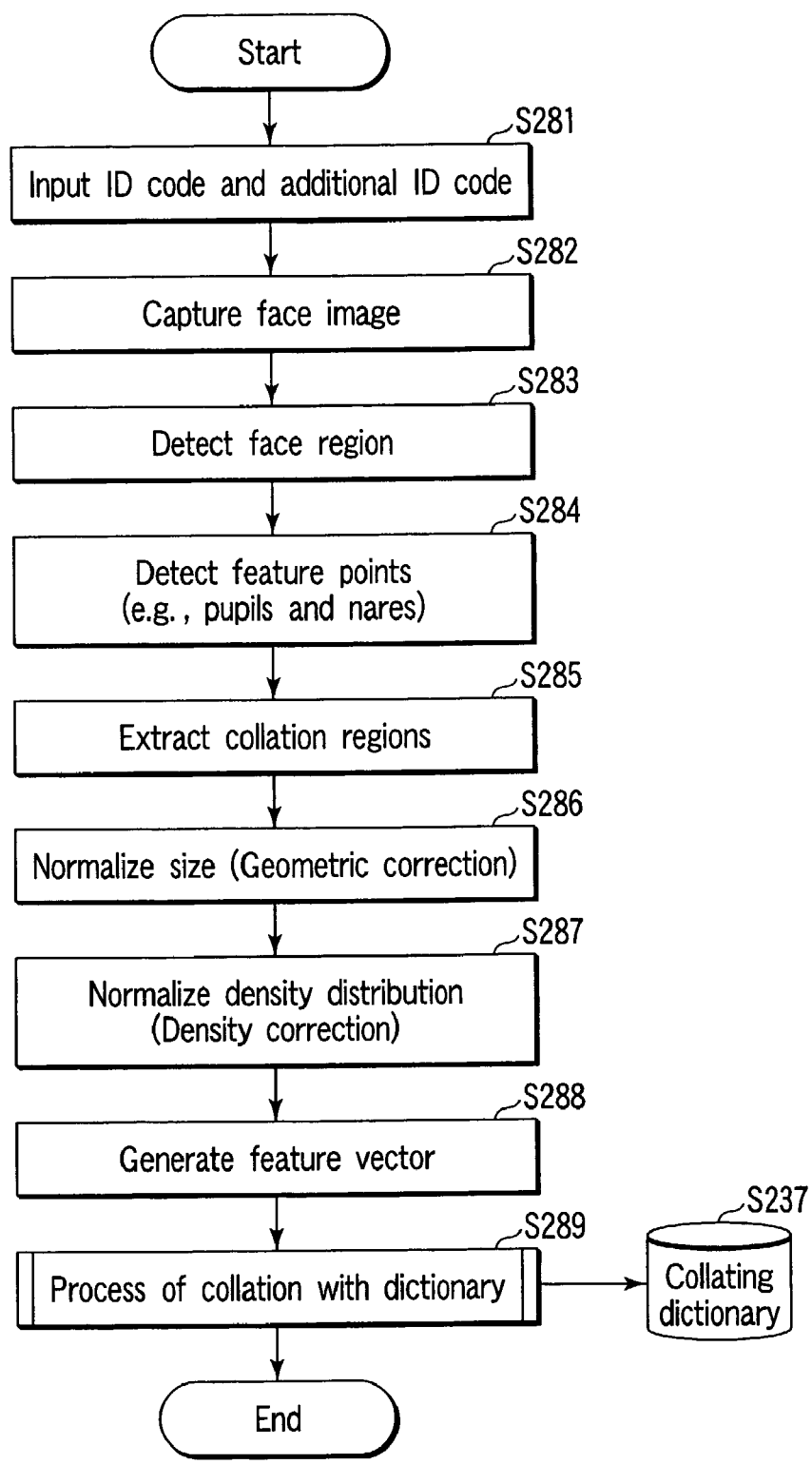
FIG. 70 is a flow chart for explaining the flow of collation for a multi-entry dictionary.

FIG. 70 is a flow chart for explaining the flow of collation to the multi-entry dictionary. As shown in FIG. 70, the user first enters the ID code and additional code from the operation unit 205 (step S281). The processor 231 specifies a face pattern registered in the dictionary 237 and corresponding to the input ID code and additional code.

When the face pattern in the dictionary is specified, the processor 231 photographs a face image of the user who has entered the ID code and additional code, and generates a feature vector (face pattern) from the photographed face image, as in the processes in steps S212 to S218 or steps S222 to S228. After generating the face pattern from the photographed face image, the processor 231 collates this face pattern with that face pattern in the dictionary 237, which is specified by the ID code and additional code entered in step S281 (step S289).

Note that when a plurality of face data of the same user are to be registered, face data to be used as default data can also be preset for each user. For example, if no additional code is input in step S281, the processor 231 selects a face pattern initially registered as a default face pattern. Note also that a face pattern used as a default face pattern with respect to an ID code can be easily changed by a changing process and deleting process performed for face patterns registered in the dictionary 237. When a plurality of face patterns of the same user are registered, a face pattern to be used as a default face pattern can also be made selectable.

In the above example, the processing in the 1:1 collation mode is explained. However, even in the 1:N collation mode, a plurality of face patterns of the same user can be registered by performing collation for all face patterns registered in the dictionary 237.

As described above, a plurality of face patterns of the same user are additionally registered by attaching an additional code to an ID code. In a collating process, this additional code is designated together with the ID code to uniquely specify a face pattern in the dictionary 237. This face pattern is collated in one-to-one correspondence with a face pattern generated from a photographed user's face image. This controls fluctuations in the user's face pattern caused by an external factor such as the use/nonuse of glasses or the type of glasses. Consequently, the collating performance and security level for each user can be held constant.

A modification to the 13th embodiment will be described below.

The important characteristic feature of the 13th embodiment is that a plurality of face patterns of the same user are registered. When the convenience for users and the manager is taken into consideration, face patterns are preferably registered in the dictionary as easily as possible. Especially when face patterns of the same user are to be additionally registered, this additional registration is desirably performed during actual operation without the user's or manager's knowing it. In the following modification, the process of additionally registering face patterns of a user while the face image collating apparatus is in operation (during collation) will be explained.

Figure 71:
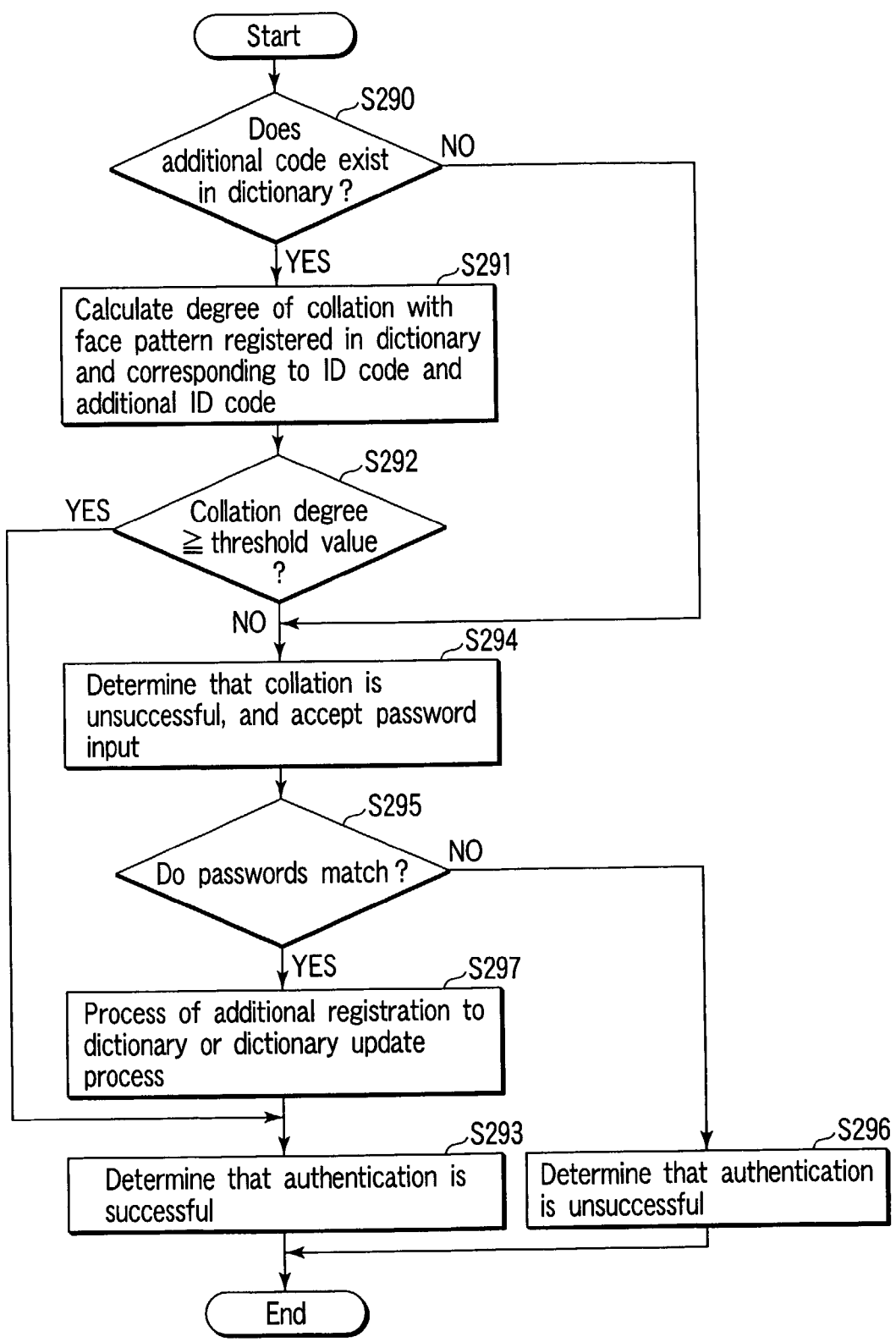
FIG. 71 is a flow chart for explaining a modification according to the 13th embodiment.

FIG. 71 is a flow chart for explaining this modification to the 13th embodiment. Note that the process of collating a photographed face image with the dictionary 237 herein explained corresponds to, e.g., step S289 shown in FIG. 70. First, in step S281 the processor 231 checks whether a face pattern corresponding to the ID code and additional code entered by the user exists in the dictionary 237 (step S290). If no ID code exists, the input is rejected. If no additional code exists although the ID code exists, the flow advances to step S294.

If determining in step S290 that the ID code and additional code entered by the user exist, the processor 231 reads out from the dictionary 237 a face pattern corresponding to the ID code and additional code entered by the user in step S281. Subsequently, by the processes in steps S282 to S288 described above, the processor 231 calculates the degree of collation between a face pattern obtained from a photographed face image and the face pattern read out from the dictionary 237 (step S291).

After calculating the collation degree, the processor 231 checks whether the calculated collation degree is equal to or larger than a predetermined threshold value (step S292). If determining that the calculated collation degree is equal to or larger than the predetermined threshold value, the processor 231 determines that the collation is successful, and authenticates the user as the person himself or herself (step S293).

If determining that the calculated collation degree is smaller than the predetermined threshold value, the processor 231 determines that the collation is unsuccessful. In this case, the processor 231 prompts the user to enter the password and accepts the password input from by the user, as a substitute means for the face collating process (step S294). When the user enters the password, the processor 231 checks whether the input password matches a preset password corresponding to the ID code (step S295).

If determining that the two passwords do not match, the processor 231 determines that the user is not authenticated as the person himself or herself (step S296). If determining that the two passwords match, the processor 231 updates that face pattern in the dictionary 237, which corresponds to the ID code and additional code, if it is determined in step S290 that the additional code exists (step S297), and authenticates the user as the person himself or herself (step S293).

If determining in step S290 that no additional code exists although the ID code exists, the processor 231 accepts the password input from the user (step S294), and checks whether the input password matches the preset password corresponding to the ID code (step S295). If determining that the two passwords do not match, the processor 231 determines that the user is not authenticated as the person himself or herself (step S296). If determining that the two passwords match, the processor 231 additionally registers in the dictionary 237 the face pattern generated from the photographed face image as face data corresponding to the input additional code (step S297), if it is determined in step S290 that no additional code exists although the ID code exists, and authenticates the user as the person himself or herself (step S293).

The dictionary updating process in step S297 will be described in detail below. This process of updating a face pattern in the dictionary 237 generates a face pattern for update by merging a face pattern of a photographed face image into a face pattern registered in the dictionary, thereby rewriting the face pattern in the dictionary 237. That is, assuming that a face pattern of a photographed face image is a pattern $i$ and a face pattern registered in the dictionary is a pattern $d$, a face pattern d' for update is d'=αi+βd (0≦α, β≦1, and α+β=1). The values of α and β determine how to reflect the face pattern of the photographed face image and the face pattern registered in the dictionary onto the face pattern for update.

In the face pattern d' for update described above, the influence of the face pattern $i$ of the photographed face image increases if the value of α is made larger than the value of β, and the influence of the face pattern $d$ registered in the dictionary increases if the value of β is made larger than the value of α. Therefore, when the values of α and β are ½, the face pattern d' for update which is the average of the face patterns $i$ and $d$ is obtained, so the dictionary 237 is rewritten by the average face pattern of these face patterns $i$ and $d$. When the value of α is 1 and the value of β is 0, i=d', so the dictionary 237 is rewritten by the face pattern $i$.

In this modification, the processing of the 1:1 collation mode is explained. However, this modification is also applicable to the 1:N collation mode. For example, in this 1:N collation mode, the processor 231 first executes collation in the 1:N collation mode. If the user is not authenticated by this collation, the processor 231 performs authentication using the ID code and password. If this authentication using the ID code and password is successful, the processor 231 updates the dictionary with respect to the face pattern of the input ID code. Consequently, even in the 1:N collation mode, the dictionary can be updated in the flow of the collating process as in the 1:1 collation mode.

In this modification to the 13th embodiment as described above, if dictionary collation using a face image is unsuccessful and the user is authenticated by password input as a substitute means for the authentication process, face data in the face collating dictionary is updated or face data is additionally registered in the dictionary. Accordingly, it is readily possible to update a face pattern registered in the dictionary or additionally register another face pattern different from an already registered face pattern of the same user, without the user's or manager's knowing it.

The 14th embodiment will be described below.

In this 14th embodiment, a warning such as an alarm is generated to a specific unauthorized accessing person (unregistered person). This warning is used when the face image collating apparatus is applied to a doorway monitoring system. In the following explanation, assume that the face image collating apparatus is attached to the door of a room.

As shown in FIG. 72, the arrangement of the face image collating apparatus according to this 14th embodiment is obtained by adding a log database 238a, special dictionary 238b, loudspeaker 241, radio communication board 242, and LAN board 243 to the arrangement of the face image collating apparatus shown in FIG. 60. In addition, a personal computer (maintenance PC) 244 for maintenance is connected to a LAN which is connected via the LAN board 243. The log database 238a and the special dictionary 238b are installed in the recorder 238 which is a hard disk drive (HDD) or the like. The rest of the arrangement is the same as the face image collating apparatus shown in FIG. 60, so the same reference numerals denote the same parts, and a detailed description thereof will be omitted.

If collation is unsuccessful, the log database 238a stores a photographed face image, a face pattern extracted from the photographed face image, and attribute data such as the location, date, and time. The special dictionary 238b registers a face pattern extracted from a face image of a specific person not registered in the dictionary 237. The loudspeaker 241 generates an alarm in accordance with an instruction from the processor 231.

The radio communication board 242 has a radio communication function of notifying a warning to an information terminal such as a radio terminal of the manager. The LAN board 243 connects to the maintenance PC 244 across the LAN. The maintenance PC 244 is a terminal device which has a display 244a and the like and maintains and controls the face image collating apparatus. This maintenance PC 244 is installed in, e.g., a control center and used by the manager (supervisor) to control the face image collating apparatus and monitor the processing status and the operating state.

Figure 73:
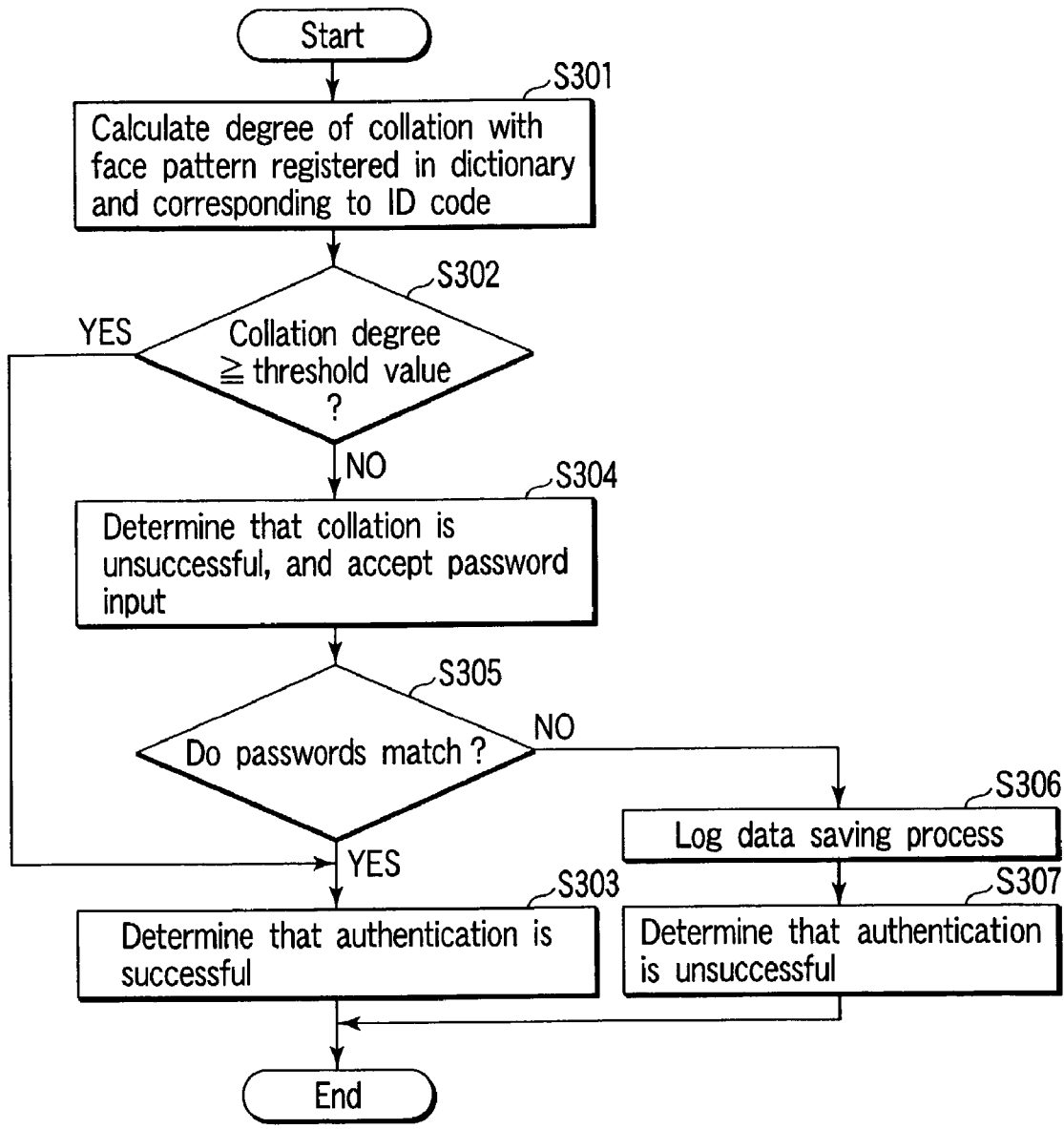
FIG. 73 is a flow chart for explaining the process of storing log data in a log database.

FIG. 73 is a flow chart for explaining the process of storing log data in the log database 238a. Note that the processes in steps S301 to S305 shown in FIG. 73 are the same as the processes in steps S291 to S295 shown in FIG. 71, so a detailed explanation thereof will be omitted.

That is, if collation by a face image is unsuccessful and the passwords do not match (NO in step S305), the processor 231 stores in the log database 238a the photographed face image, a face pattern extracted from the photographed face image, and log data such as the date and time as one set of data (step S306). In this case, the processor 231 determines that the user is not authenticated (step S307).

This operation is based on the assumption that the process of generating a feature vector (face pattern) from a photographed face image is successful. In practice, however, the process sometimes fails before a face pattern is generated. In a case like this, three processes presented below are performed.

(1) If detection of a face image region is unsuccessful, neither a face image nor a face pattern is acquired, so no log is stored.

(2) If detection of a face image region is successful and detection of feature points is unsuccessful, no face pattern is acquired, so the detected face pattern alone is stored as a log.

(3) If generation of a face pattern is successful, this face pattern and a face image from which feature points are successfully detected are stored as log data.

In the above example, log data is recorded only when authentication by a password is unsuccessful. However, log data can also be recorded when this authentication is successful. Also, since a person may leave before entering a password, log data can be recorded immediately after collation fails. Furthermore, in face collation, a face region is sensed or feature points are extracted from a face image before the collation. Therefore, if these processes are unsuccessful, even inputting of a password can also be rejected. This raises the security level.

Next, the formation of the special dictionary 238b for outputting an alarm will be explained. This special dictionary for alarm output is formed from log data stored in the log database 238a by the above processing. That is, the alarm output dictionary is formed by displaying face images based on the log data on the display 244a of the maintenance PC 244, and selecting a suspicious person and a habitual offender of unauthorized access or mischief by the manager.

This can be realized by manually executing processing similar to normal dictionary registration by the manager. It is also possible to allow the maintenance PC 244 to collate face patterns based on the log data, determine a person who is recorded as a log a number of times, and select a person to be registered in the special dictionary 238b on the basis of the determination result. Note that registration to the dictionary 238b can also be performed by the face image collating apparatus without using the maintenance PC 244.

Figure 74:
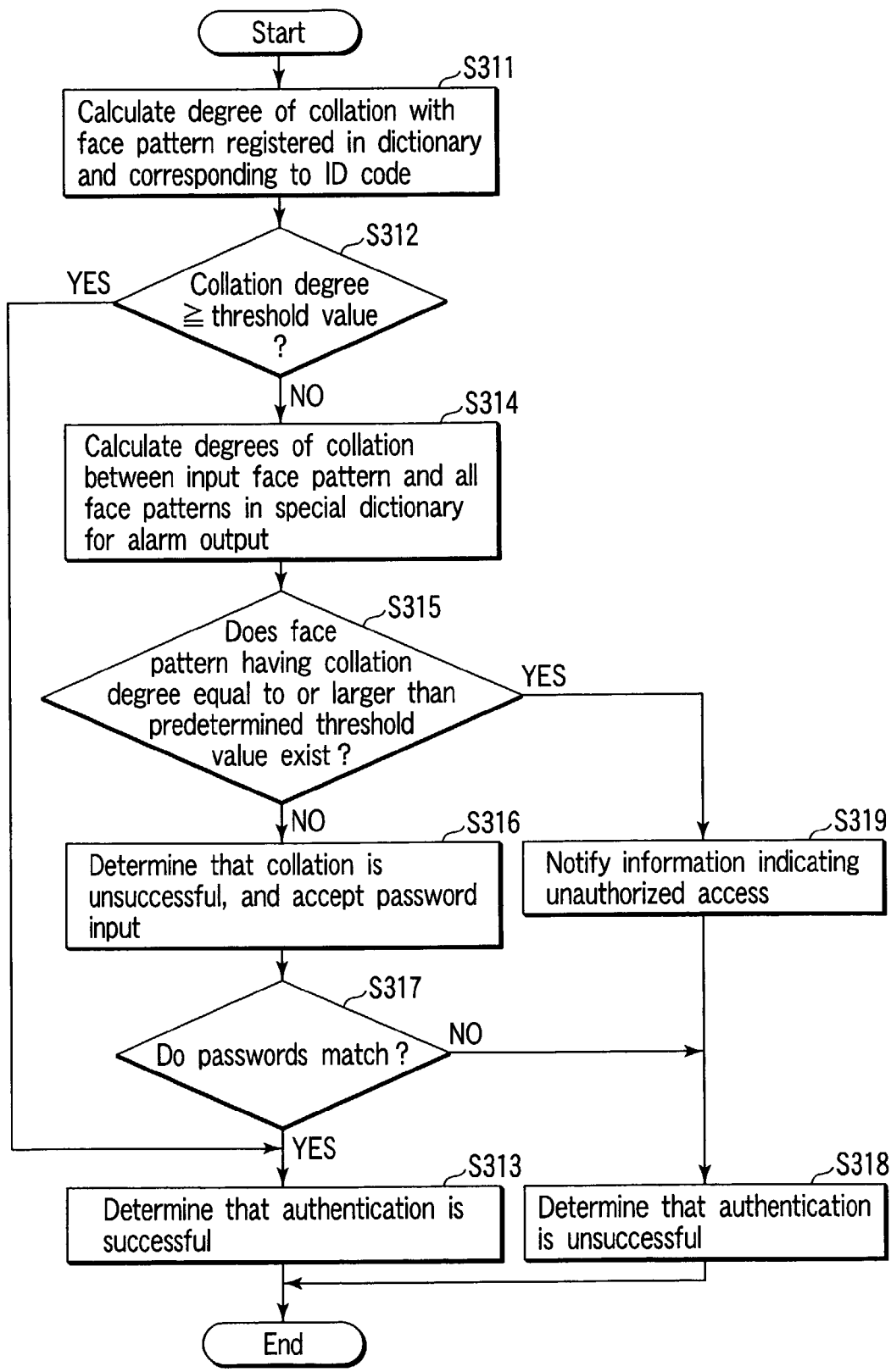
FIG. 74 is a flow chart for explaining the flow of collation when a collating process using a special dictionary for alarm output is added.

FIG. 74 is a flow chart for explaining the flow of a collating process to which collation using the special dictionary 238 for alarm output is added. That is, the processor 231 reads out a face pattern corresponding to the ID code input by the user from the dictionary 237, and calculates the degree of collation between this readout face pattern and a face pattern (input face pattern) from a photographed face image (step S311).

After calculating the collation degree, the processor 231 checks whether the calculated collation degree is equal to or larger than a predetermined threshold value (step S312). If determining that the collation degree is equal to or larger than the predetermined threshold value, the processor 231 determines that the collation is successful, and authenticates the user as the person himself or herself (step S313).

If determining that the collation degree is smaller than the predetermined threshold value, the processor 231 calculates the degrees of collation between the input face pattern and all face patterns in the special dictionary 238b for alarm output (step S314). After calculating the degree of collation with each face pattern in the special dictionary 238b, the processor 231 checks whether a face pattern equal to or larger than a predetermined threshold value exists in this special dictionary 238b (step S315).

If determining that there is no face pattern equal to or larger than the predetermined threshold value, the processor 231 performs authentication by the password, as a substitute means for the face collating process, as in steps S255 and S256 described above (steps S316 and S317). If determining that a face image equal to or larger than the predetermined threshold value exists, the processor 231 determines that the user is not authenticated (step S318), generates an alarm by the loudspeaker 241, and displays a warning message to the user on the display 244a (step S319).

In the above embodiment, a warning message to the user is displayed on the display 244a together with the alarm by the loudspeaker 241. However, information indicating unauthorized access can also be notified to the manager in another location via the radio communication board 242 or the LAN board 243. For example, to notify the manager of unauthorized access by the maintenance PC 244, information indicating the unauthorized access and a photographed face image are transmitted to the maintenance PC 244 across the LAN and displayed on the display 244a. In this manner, the unauthorized access can be immediately notified to the manager monitoring the maintenance PC 244. To notify the manager of unauthorized access via the radio communication board 242, the processor 231 transmits information indicating the unauthorized access and a photographed face image to a radio terminal such as a cell phone by the radio communication board 242. In this case, the unauthorized access can be notified to the manager not in a specific location but in a remote place.

In the above embodiment, unauthorized access is notified on the basis of the result of collation with the special dictionary 238b for alarm output. However, the manager can also be notified if collation with all face patterns registered in the face collating dictionary 237 is unsuccessful. In this case, the special dictionary 238b for alarm output need not be formed in addition to the normal face collating dictionary 237. This can reduce the processing of the face image collating apparatus as a whole.

In the above embodiment, if collation with a face pattern registered in the normal face collating dictionary 237 is unsuccessful, collation with the special dictionary 238b for alarm output is performed. However, as a modification it is possible to prepare two processors 231 and perform collation using the normal face collating dictionary 237 and collation using the special dictionary 238b for alarm output in parallel. This simplifies the basic configuration of the apparatus and shortens the processing time.

In the above embodiment, the special dictionary 238b for detecting unauthorized access is formed to notify unauthorized access. However, it is also possible to search for a specific person by a face image by using another means. For example, when an available period for using the face image collating apparatus is set, a face pattern of a person whose available period has expired or is close to expiration is registered in the special dictionary 238b. If this person whose available period has expired (or is close to expiration) is detected, information indicating that the available period has expired (or is close to expiration) is displayed on the display 244a. This allows the user to readily recognize that his or her available period has expired (or is close to expiration).

In the 14th embodiment as described above, a special dictionary different from a normal face collating dictionary is formed. If a person registered in this special dictionary is detected in a collating process, a predetermined message is notified to the person or the manager. Accordingly, unauthorized access by a person other than registrants can be notified to the manager or that person. Since this makes a rapid response to a suspicious person feasible, the security level can be improved.

The 15th embodiment will be explained below.

As shown in FIG. 59, this 15th embodiment improves the collating performance and security level by interlocking doorway monitoring and face image collation, when the face image collating apparatus is applied to a doorway monitoring system.

In this 15th embodiment, as shown in FIG. 59, assume a doorway monitoring system in which face image collating apparatuses are installed on both the outside and inside of the area of a door as an object of doorway monitoring. In this doorway monitoring system, a user from the outside of the area is subjected to monitoring of entrance, and a user from the inside of the area is subjected to monitoring of leaving. In addition, a person-in-room list 250 indicating persons staying in the room is formed in the work memory 232, dictionary 237, or storage device 238 on the basis of doorway monitoring as described above. This person-in-room list 250 is updated whenever a user enters or leaves the room.

A user using this doorway monitoring system registers his or her face on the face image collating apparatus installed outside the area or the face image collating apparatus installed inside the area. In the process of registration of a face image to the dictionary 237, a user's face pattern is registered in the dictionary 237 by a normal registration process as shown in FIG. 61.

Figure 75:
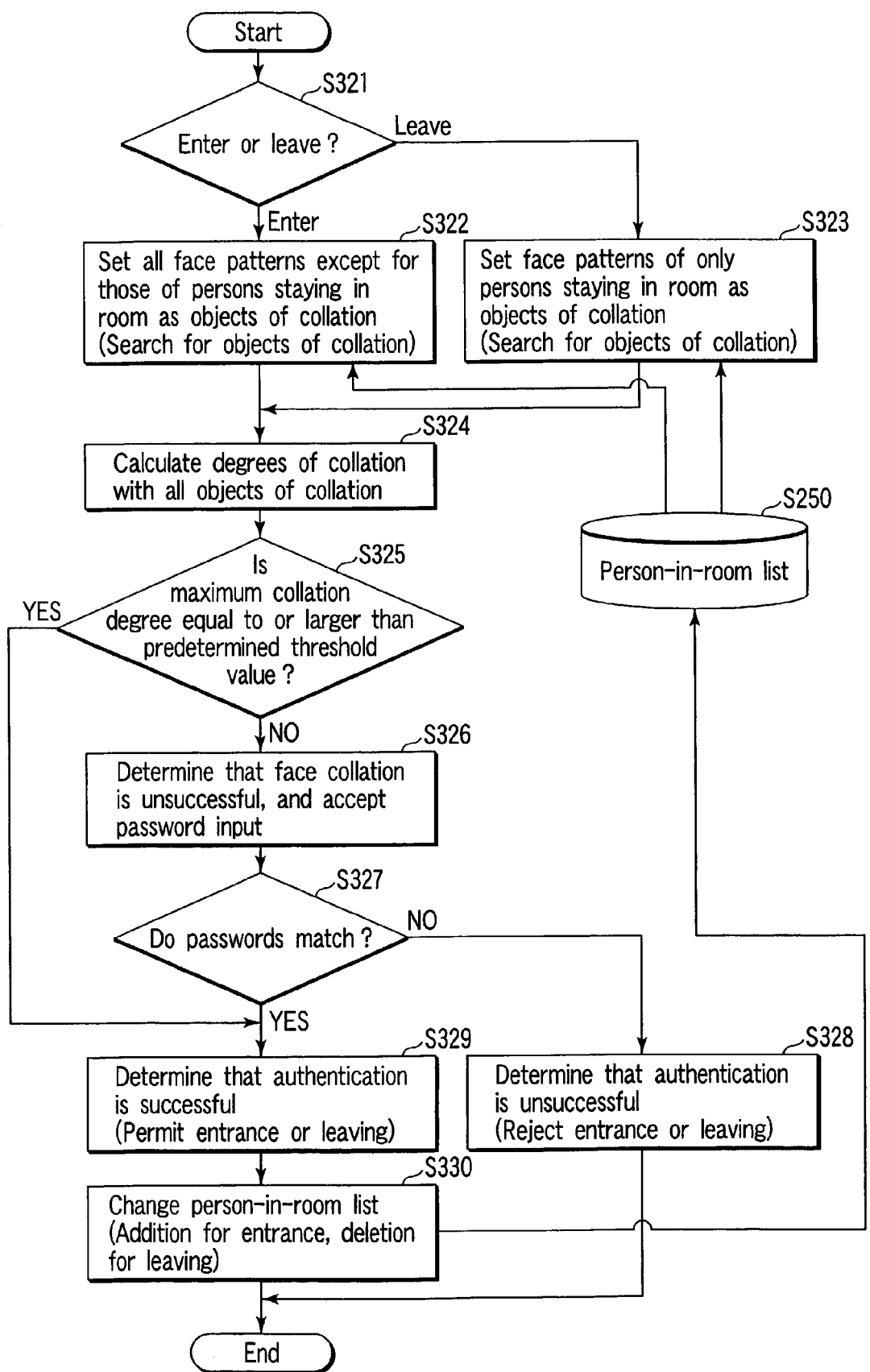
FIG. 75 is a flow chart for explaining a collating process performed by a doorway monitoring system when a person enters or leaves.

FIG. 75 is a flow chart for explaining a collating process when a user enters or leaves the room in the doorway monitoring system as described above. A collating process in the 1:N collation mode will be described below. This collating process corresponds to the process of collation with the dictionary in the 1:N collation mode as shown in FIG. 63. The processing from photographing of a user's face image to generation of a face pattern from the photographed face image is the same as in FIG. 63, so a detailed description thereof will be omitted.

That is, as shown in FIG. 75, on the basis of the person-in-room list 250 the processor 231 narrows down objects to be collated in a collating process when a person enters the room, and narrows down objects to be collated in a collating process when a person leaves the room. For example, when a person enters the room (step S321), the processor 231 searches for all face patterns except for those staying in the room, as objects to be collated, on the basis of the person-in-room list 250 (step S322). When a person leaves the room, the processor 231 regards only persons staying in the room as objects to be collated, and searches for face patterns of all these persons staying in the room (step S323).

After extracting all objects of collation by the search process as above, the processor 231 calculates the degrees of collation between a face pattern from the loaded face image and the face patterns of all the objects of collation (step S324). After calculating the degrees of collation with all the objects of collation, the processor 231 checks whether the maximum collation degree is equal to or larger than a predetermined threshold value (step S325). If determining that the maximum collation degree is equal to or larger than the predetermined threshold value (YES in step S325), the processor 231 determines that the face collation is successful, and permits the user to enter or leave the room (step S329).

If determining that the maximum collation degree is smaller than the predetermined threshold value (NO in step S325), the processor determines that the collation is unsuccessful, and accepts password input as a substitute means (step S326). When the user enters the password, the processor 231 checks whether a password matching the input password exists in the objects of collation found by the above search process (step S327).

If determining that there is no matching password (NO in step S327), the processor 231 determines that the user is not authenticated, and rejects the entrance of the user (step S328). If determining that the matching password exists (YES in step S327), the processor authenticates the user and permits the entrance or leaving of the user (step S329).

After thus permitting the entrance or leaving of the user, the processor 231 monitors by a sensor (not shown) whether the user has actually entered or left the room. If sensing the entrance or leaving of the user, the processor 231 updates the person-in-room list 250 (step S330). For example, when the user has entered the room, the processor 231 updates the person-in-room list 250 by adding that user to the persons staying in the room. When the user has left the room, the processor 231 updates the person-in-room list 250 by deleting that user from the persons staying in the room.

In the above embodiment, doorway monitoring performed for one door is explained. However, even when a certain area has a plurality of entrances and exits, it is also possible to install a face image collating apparatus at each of these entrances and exits, connect these face image collating apparatuses across a network such as a LAN, and perform doorway monitoring for that area by using a single person-in-room list.

In the above embodiment, the operation in the 1:N collation mode is explained. However, the operation can be similarly realized in the 1:1 collation mode. In this case, when a user enters the ID code, it is possible to check on the basis of the input ID code whether the user is an object of collation. That is, if the ID code entered by a user when he or she is entering the room is the same as the ID code of a person already staying in the room, the entrance of that user can be rejected; if the ID code entered by a user when he or she is leaving the room is not any of the ID codes of persons staying in the room, the leaving of that use can be rejected. In the 1:1 collation mode as described above, if a user is not found to be an object of collation when he or she enters the ID code, the entrance or leaving of that user can be rejected without performing face collation for the user.

In the above embodiment, face image collating apparatuses are installed on both the outside and inside of the room. However, one of these apparatuses can also be another person recognition apparatus such as a wireless ID card reader. For example, it is possible to perform person authentication by means, such as an ID card, other than face collation, when a person enters the room, and perform personal authentication by face collation when a person leaves the room. In this case, face patterns to be collated when a person leaves the room can be greatly narrowed down, so the face collating process can be efficiently performed. Also, when this system is applied to a monitoring system which checks only entrance by using an ID card or the like, the security level can be improved without lowering the convenience for users.

As described above, a collating process is performed by narrowing down face patterns to be collated when a person enters or leaves the room, on the basis of information indicating the statuses of entrance and leaving of persons in an area to be monitored. Consequently, the number of persons to be collated with the dictionary can be limited. So, it is possible to increase the efficiency of the face collating process and improve the security level.

The 16th embodiment will be described below.

In this 16th embodiment, operation when both the 1:1 collation mode and the 1:N collation mode are used will be explained. More specifically, operation when the 1:1 collation mode or the group collation mode is performed while the 1:N collation mode is given preference will be explained.

Figure 76:
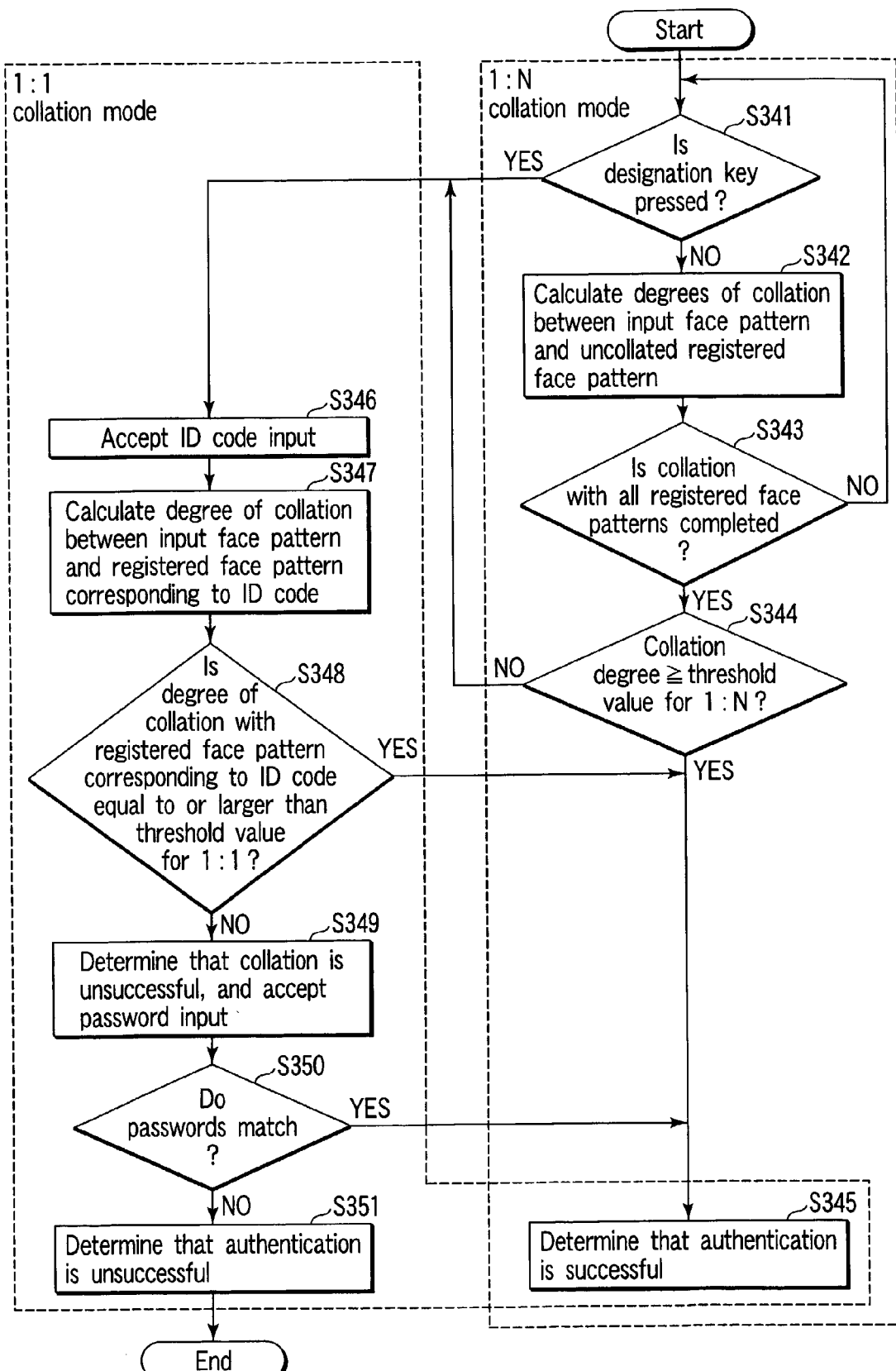
FIG. 76 is a flow chart for explaining an operation when collation is performed in a 1:1 collation mode while the 1:N collation mode is given preference.

FIG. 76 is a flow chart for explaining the operation when collation is performed in the 1:1 collation mode while the 1:N collation mode is given priority. As shown in FIG. 76, the processor 231 first operates in the 1:N collation mode and, if a designation key is pressed (step S341) or if collation in the 1:N collation mode is unsuccessful (NO in step S345), shifts from the 1:N collation mode to the 1:1 collation mode.

That is, when sensing a person (user) in front of a camera by a sensor 255, the processor 231 photographs a face image of that user. The processor 231 detects a face image region from the image photographed by the camera, and generates a face pattern (input face pattern) from the detected face image. After thus generating the input face pattern, the processor 231 operates in the 1:N collation mode until the designation key for designating shift to 1:1 collation is pressed.

That is, if this designation key is not pressed, the processor 231 extracts face patterns (registered face patterns) registered in the dictionary 237 one by one, and calculates the degree of collation between each extracted registered face pattern and the input face pattern (step S342). If completing calculations of the degrees of collation between all the registered face patterns and the input face pattern (YES in step S343), the processor 231 checks whether the maximum one of the calculated collation degrees is equal to or larger than a predetermined threshold value for 1:N collation (step S344). If determining that the maximum collation degree is equal to or larger than the threshold value for 1:N collation, the processor 231 determines that the user is authenticated (step S345).

If determining in step S344 that the maximum collation degree is smaller than the threshold value for 1:N collation (NO in step S344), or if the designation key is pressed before collation with all the registered face patterns is completed (YES in step S341), the processor 231 shifts to the 1:1 collation mode. In this 1:1 collation mode, the processor 231 first accepts inputting of the ID code by the user (step S346). When the user enters the ID code, the processor 231 searches the dictionary 237 for a registered face pattern corresponding to the ID code, and calculates the degree of collation between the input face pattern and the registered face pattern corresponding to the ID code (step S347).

After calculating the degree of collation between the input face pattern and the registered face pattern corresponding to the ID code, the processor 231 checks whether the calculated collation degree is equal to or larger than a predetermined threshold value for 1:1 collation (step S348). If the registered face pattern corresponding to the ID code is also an object of collation in the 1:N collation mode, the result of collation is also the same if the collation degree calculation method and threshold value in the 1:1 collation mode are the same as in the 1:N collation mode.

For example, therefore, the threshold value for 1:1 collation is made smaller than that for 1:N collation, or the collation degree calculation method in the 1:1 collation mode is made different from that in the 1:N collation mode. As will be described later, if the registered face pattern corresponding to the ID code is not an object of collation in the 1:N collation mode, the collation degree calculation method in the 1:1 collation mode may be the same as that in the 1:N collation mode.

If determining in step S348 that the calculated collation degree is equal to or larger than the predetermined threshold value for 1:1 collation, the processor 231 determines that the user is authenticated. If determining in step S348 that the calculated collation degree is smaller than the predetermined threshold value for 1:1 collation, the processor 231 determines that this user authentication by face collation is unsuccessful, and performs authentication by the password as a substitute means for face collation (steps S349 and S350). If this authentication by the password is successful, the processor 231 authenticates the user; if this authentication by the password is also unsuccessful, the processor 231 determines that the user is not authenticated.

As described above, if the designation key is pressed while the 1:N collation mode is preferentially performed, or if collation in the 1:N collation mode is unsuccessful, collation is performed by shifting from the 1:1 collation mode or group collation mode. Since a plurality of collation modes can be selectively used, the convenience can be improved while the security level is maintained.

In the above embodiment, the operation is shifted to the 1:1 collation mode while the 1:N collation mode is given preference. However, it is also possible to shift to the group collation mode while giving preference to the 1:N collation mode. In this case, a dictionary for 1:N collation (this dictionary is also a group collating dictionary and can be regarded as a default dictionary) and a plurality of dictionaries for a plurality of groups are registered beforehand.

Users in each group are given an ID code (group code) indicating the group. In this group collation mode, therefore, a group to which the user belongs is specified by the ID code (group code) given to the group, instead of the ID code (user code) given to each user in the 1:1 collation mode.

If collation fails after the collation mode is switched to the group collation mode, group password matching can be performed in the same group, although this can also be user password matching. Furthermore, the operation of inputting the group ID code can be omitted by using designation keys in one-to-one correspondence with group IDs. If the mode to be switched is a unique mode, the designation key can be any arbitrary key.

It is also possible to separately manage users to be collated in the 1:N collation mode and users to be collated in the 1:1 collation mode. In this case, a dictionary for 1:N collation and a dictionary for 1:1 collation are prepared. Face patterns of users to be collated in the 1:N collation mode are registered in the 1:N collation dictionary, and face patterns of users to be collated in the 1:1 collation mode are registered in the 1:1 collation dictionary.

Accordingly, the face image collating apparatus starts operating in the 1:N collation mode and performs collation in the 1:1 collation mode for users who cannot be collated in the 1:N collation mode. That is, a user to be collated in the 1:N collation mode is collated in the 1:N collation mode. However, a user to be collated in the 1:1 collation mode is collated in the 1:1 collation mode if collation in the 1:N collation mode is unsuccessful or if the designation key is pressed while the 1:N collation mode is being executed.

For example, when a face collating process is applied to a doorway monitoring system, the manager and users who use the system daily are collated in the 1:N collation mode. Users who have authority to enter and leave but do not use the system daily are collated in the 1:1 collation mode. In this manner, the manager and users who use the system daily can enter and leave the room with almost free admission without touching any keys. For users who do not use the system daily, a high-accuracy collating process by 1:1 collation can be performed.

The 17th embodiment will be described below.

This 17th embodiment is characterized in that a face image or face pattern to be registered in a dictionary used by the face image collating apparatus is formed by a personal computer or an information terminal such as a cell phone usable by each user. That is, the characteristic feature of the 17th embodiment is that each user registers his or her face image into a dictionary from a remote place across, e.g., the Internet.

Figure 77:
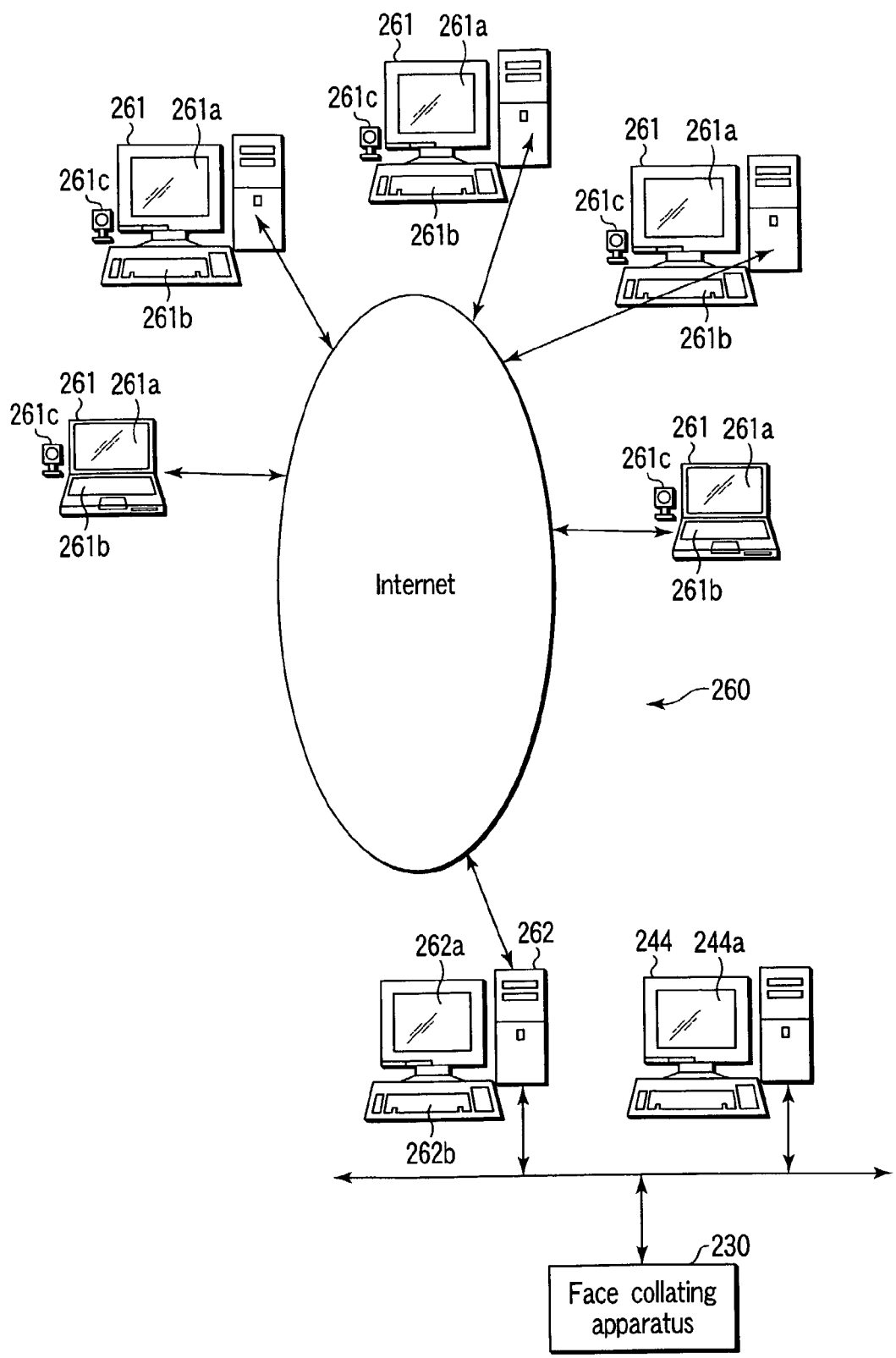
FIG. 77 is a view showing the configuration of a face image registration system by which each user registers his or her face image into a dictionary across a network such as the Internet.

FIG. 77 is a view showing the configuration of a face image registration system 260 with which each user registers his or her face image into a dictionary across a network such as the Internet.

As shown in FIG. 77, this face image registration system 260 comprises a plurality of information terminals (personal computers PC1, PC2, PC3, . . . ) 261 usable by registrants (users), a registration server 262, a maintenance PC 244, and the face image collating apparatus 230.

Figure 78:
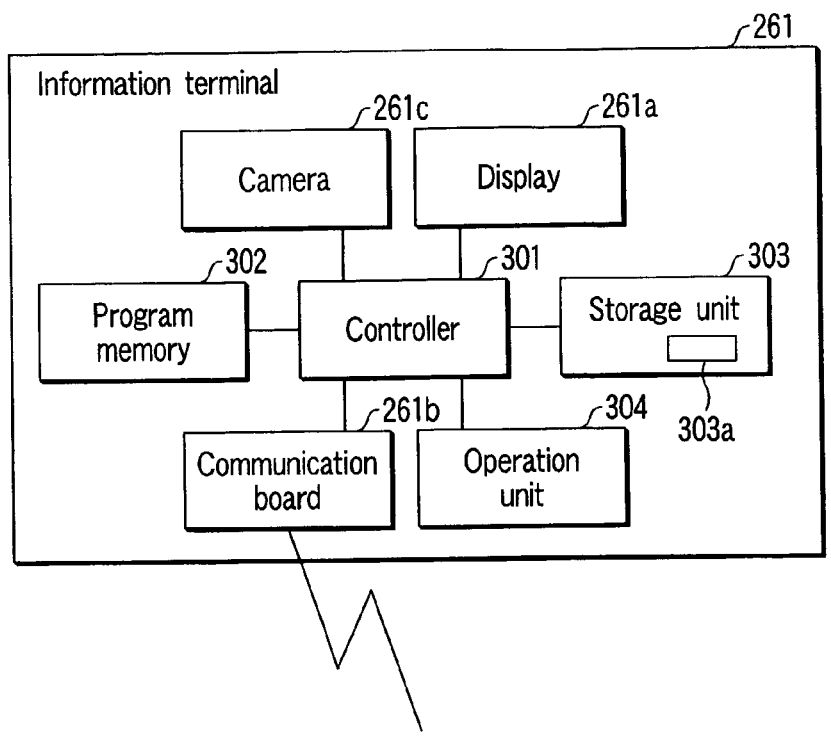
FIG. 78 is a block diagram schematically showing the arrangement of a information terminal.

As shown in FIG. 77 and FIG. 78, each information terminal 261 has a display 261a, an operation unit 261b, a camera 261c, a controller 301, a program memory 302, a storage unit 303, and a communication board 304. The display 261a display operation guidance to the user. The operation unit 261b accept operation by the user. The camera 261c photograph a user's face image. This information terminal 261 need have functions of connecting to the Internet and allowing a dictionary formation program (to be described later) to run on the terminal.

In the following explanation, assume that this information terminal 261 is a personal computer with a camera installed on a desk in a house or in an office. However, this information terminal 261 can also be a portable personal computer, cell phone, or portable terminal, as long as it has a camera and an Internet connecting function.

Also, a personal computer with a camera or a portable information apparatus need not be of a user but can be one rented for the purpose of forming a dictionary. For example, a rental face image capturing system having a camera connectable to a personal computer can be used.

The relative distance to an image to be photographed, height, direction, and the like of the camera 261*c* for obtaining a face image are set to be as close as possible to those of an actual apparatus. That is, a user is guided by a manual or the like such that the geometrical conditions of this face image are as equal as possible to those of a face image photographed when the face image collating apparatus is in operation.

Figure 79:
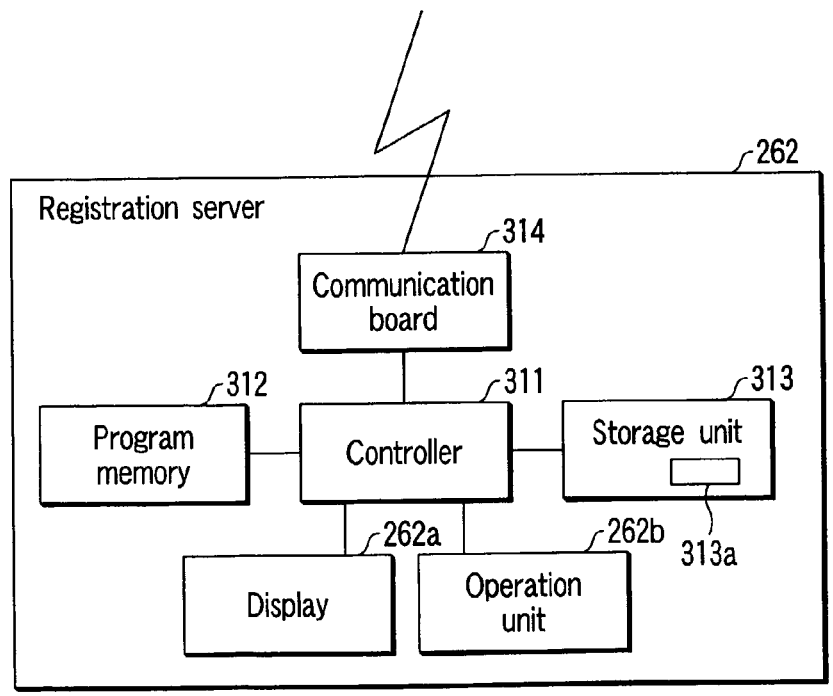
FIG. 79 is a block diagram schematically showing the arrangement of a registration server.

As shown in FIG. 77 and FIG. 79, the registration server 262 has a display 262*a*, an operation unit 262*b*, a controller 311, a program memory 312, a storage unit 313, and a communication board 314. The storage unit 313 stores face data such as face images and face patterns transferred across the Internet. The registration server 262 is a server computer such as a WWW (World Wide Web) server or an FTP (File Transfer Protocol) server. The maintenance PC 244 is configured similarly to the maintenance PC 244 shown in FIG. 72. This maintenance PC 244 forms and edits a dictionary from the face data stored in the registration server 262.

When data communication is performed between the personal computers 261 and the registration server 262, PKI (Public Key Infrastructure) can also be used or a dedicated line can be used in order to increase the security.

Next, the operation of the face image registration system configured as above will be described below.

Figure 80:
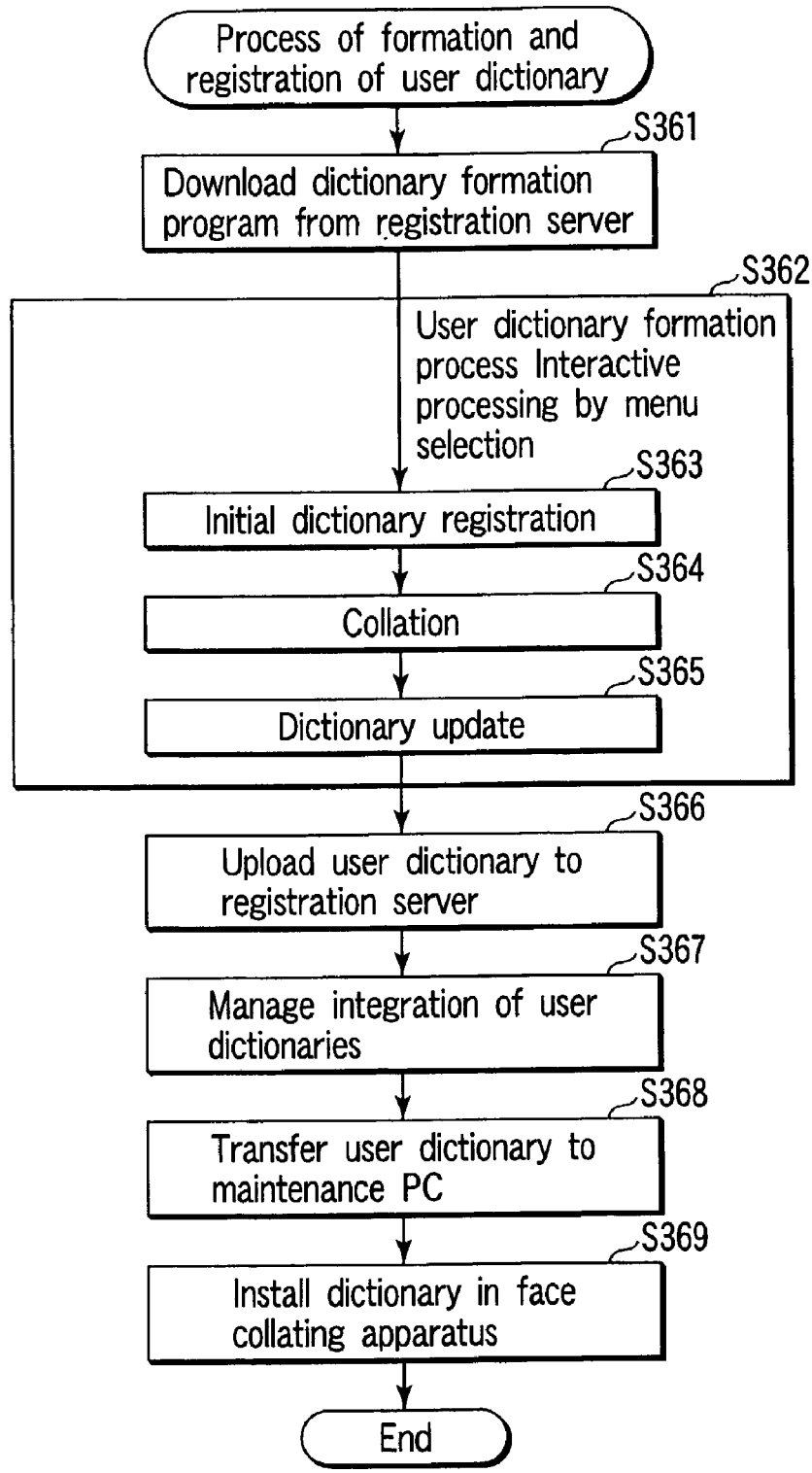
FIG. 80 is a flow chart for explaining the operation of a face image registration system according to the 17th embodiment.

FIG. 80 is a flow chart for explaining the operation of this face image registration system. First, the user downloads a program (to be referred to as a dictionary formation program hereinafter) for initially registering, collating, and updating face data from the registration server 262 (step S361). That is, the user activates the WWW browser of his or her personal computer 261, and downloads through this WWW browser the dictionary formation program open to the public on the WWW by the registration server 262.

In this embodiment, the program is transmitted and installed across the Internet into the user's personal computer. However, this program may also be recorded on a recording medium such as a CD and sent to each registrant.

Figures 81, 82:
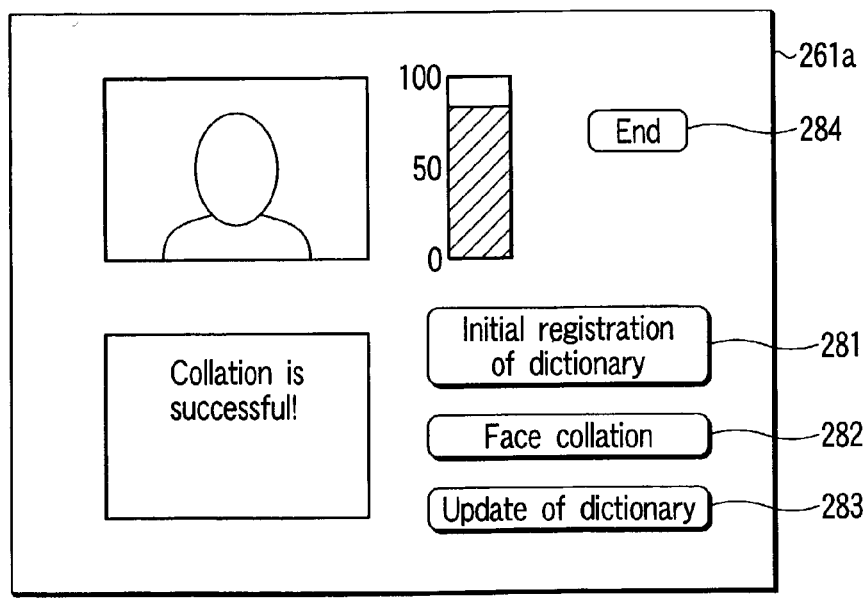
FIG. 81 is a view showing a display example of a WWW browser.
FIG. 82 is a view showing a display example of a menu window by a dictionary formation program.

When the dictionary formation program is to be downloaded, a WWW browser window as shown in FIG. 81 is displayed on the display 261*a* of the user's personal computer 261. In this window, the user enters user information such as the ID number (ID code), name, age, sex, height, use/nonuse of glasses, and password.

In the following explanation, one face pattern is registered. However, as in the 13th embodiment described earlier, a plurality of face patterns of the same user may also be registered by selecting, e.g., the use/nonuse of glasses. When this is the case, a user dictionary is formed as a multi-entry dictionary by the same method as in the 13th embodiment. The ID code may be provided by the registration server 262. Alternatively, the user may enter a given ID code, and the registration server 262 may approve this ID code entered by the user.

When the user selects a key 271 for designating program download after entering the user information as described above, the dictionary formation program is downloaded. The user information as described above may also be input only when the user uploads a dictionary formed by his or her personal computer.

After downloading the dictionary formation program, the user activates this dictionary formation program on the personal computer 261 to form user's face data (user dictionary) (step S362). When the dictionary formation program is activated, the personal computer 261 executes various processes by interacting with the user by using key selection in a menu window as shown in FIG. 82.

That is, the controller 301 of this personal computer 261 performs initial dictionary registration (step S363), collating process trial (step S364), and dictionary update (step S365), thereby forming user's face data (user dictionary 303*a*) to be registered in the registration server 262 within a predetermined period.

In this dictionary formation program, face collation is repeated within a predetermined period, and the dictionary is repeatedly updated on the basis of the collation result. This is so because face data for collation by which stable collation can be performed is generated when the dictionary is repeatedly updated by repetitive collation. Therefore, when determining that stable collation can be performed, the user presses a key 284 for terminating the formation of the user dictionary 303*a* as shown in FIG. 82, thereby completing the formation of the user dictionary 303*a*.

Also, whether stable collation can be performed by the user dictionary 303*a* can be determined by the controller 301 of the personal computer 261 on the basis of the dictionary formation program. In this case, whether stable collation can be performed by the user dictionary 303*a* is determined by checking whether the collation failure ratio (the number of failures of face collation/the number of trials) is smaller than a predetermined value when trials are successively performed at a predetermined frequency for a predetermined period. The stability of the user dictionary 303*a* may also be determined by checking whether the collation degree is equal to or larger than a predetermined value for a predetermined period (or a predetermined number of times).

When completing the formation of the user dictionary 303*a*, the user presses a key 272 for designating upload of the user dictionary 303*a* in the window as shown in FIG. 81. In response to this, the controller 301 of the personal computer 261 uploads the formed user dictionary 303*a* to the registration server 262 via the WWW browser (step S366). The controller 301 of the personal computer 261 may also upload the user dictionary 303*a* on the basis of the dictionary formation program, without designation by the user, when the formation of the user dictionary 303*a* is completed.

The registration server 262 stores in the storage unit the user dictionary 303*a* uploaded from the personal computer as a dictionary file together with the user information. Accordingly, dictionary files containing face data and user information from individual users are stored in the storage unit of the registration server 262. The registration server 262 integrates these dictionary files stored in the storage unit to generate a dictionary. After generating the dictionary by integrating the user dictionaries from all users, the registration server 262 sends this final dictionary to the maintenance PC 244 across the LAN. This maintenance PC 244 has the same arrangement as the maintenance PC 244 shown in FIG. 72.

In this embodiment, the dictionaries of all users are collected and simultaneously transferred to the maintenance personal computer. However, if some users change with time, and whenever dictionaries of these users are generated, the dictionaries can be added to the maintenance computer and edited on the computer.

Details of the user dictionary 303*a* formation process by the dictionary formation program will be explained below.

Figure 83:
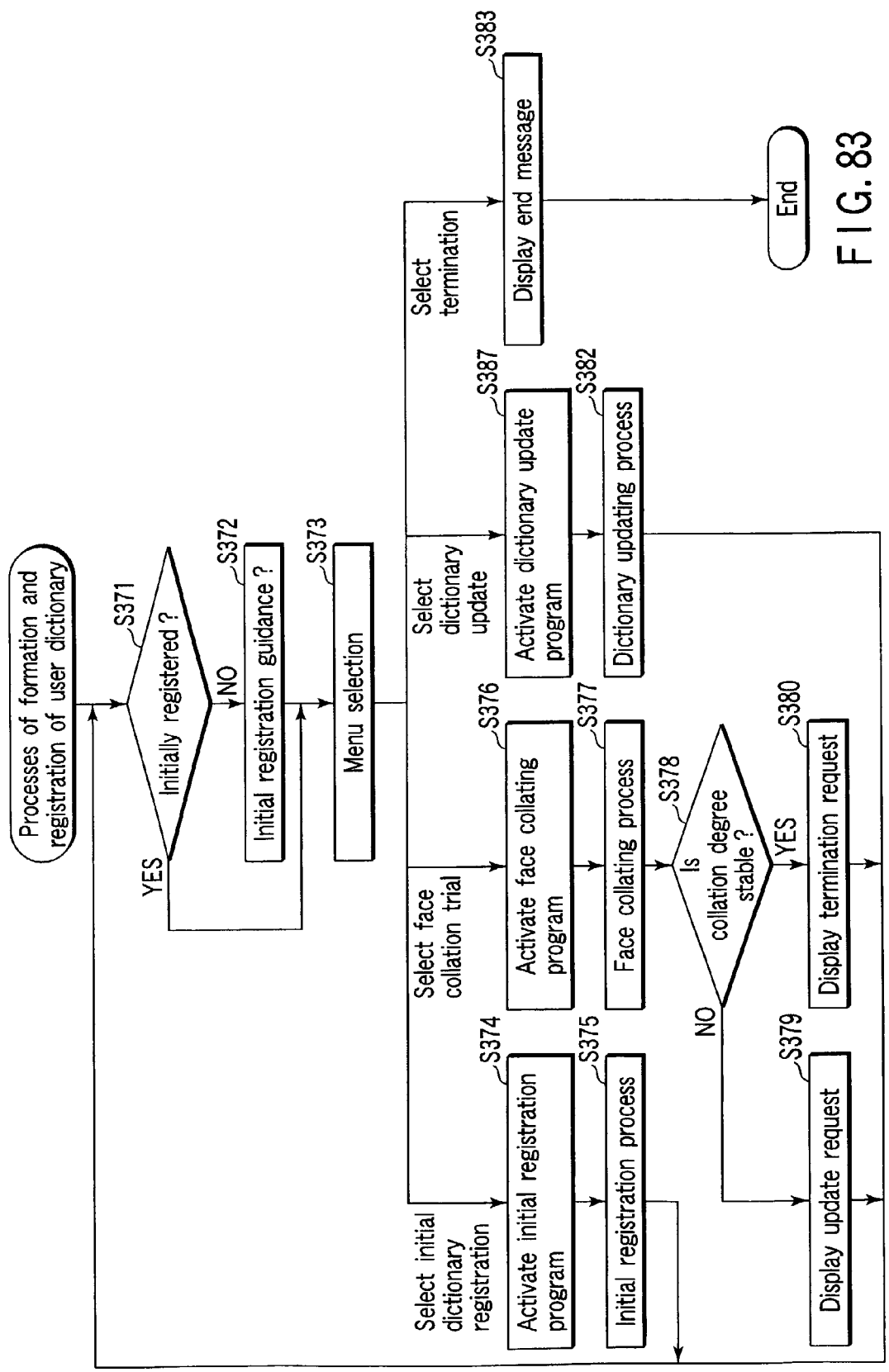
FIG. 83 is a flow chart for explaining the operation of the dictionary formation program.

FIG. 83 is a flow chart for explaining the user dictionary 303*a* formation process by the user's personal computer 261. As shown in FIG. 83, after downloading the dictionary formation program into the personal computer 261, the user activates the dictionary formation program. This dictionary formation program contains an initial registration program for initially registering user's face data, a face collating program for trying face collation, and a dictionary update program for updating the dictionary. Each program is activated in accordance with selection by the user.

When the dictionary formation program is activated, the display 261a of the personal computer 261 displays the menu window as shown in FIG. 82 (step S373). This menu window displays a key 281 for designating initial dictionary registration, a key 282 for designating a face collation trial, a key 283 for designating dictionary update, and the key 284 for designating termination of user dictionary 303a formation.

For example, if the user selects from the menu window the key 281 for designating initial dictionary registration, the controller 301 of the personal computer 261 activates the program for initially registering a face pattern to the user dictionary 303a (step S374). When this initial registration program is activated, the controller 301 of the personal computer 261 initially registers user's face data to the user dictionary 303a (step S375). This initial registration process is performed under the control of the controller 301 of the personal computer 261. That is, in this initial registration program, the camera 261c photographs a user's face image, and a face pattern is generated from this photographed face image and registered in a user dictionary 303a formed in the storage unit of the personal computer 261. This initial registration process is the same as the registration process shown in FIG. 61, so a detailed explanation thereof will be omitted.

Note that the initial registration process is to be performed at the beginning of the dictionary formation process. Therefore, this initial registration program may also be automatically activated when the downloaded dictionary formation program is activated for the first time. In this case, no menu window is displayed and no other processing is performed unless this initial registration is completed. For example, as shown in FIG. 83, if initial registration is not completed (NO in step S371), a guidance of initial registration is displayed (step S372), and user dictionary 303a initial registration is performed.

If the user selects from the menu window the key 282 for designating a face collation trial, the controller 301 of the personal computer 261 activates the face collating program (step S376). When this face collating program is activated, the controller 301 of the personal computer 261 performs face collation with the user dictionary 303a stored in the storage unit (step S377). This face collating process is performed under the control of the controller 301 of the personal computer 261. That is, in this face collating process, the camera 261c photographs a user's face image, a face pattern is generated from this photographed face image, and the degree of collation between this face pattern generated from the photographed face image and a face pattern in the user dictionary 303a registered in the storage unit of the personal computer is determined. This face collating process is the same as the collating process shown in FIG. 62 except for ID code input in step S221, so a detailed description thereof will be omitted.

When the face collating process is performed, a guidance may also be displayed on the basis of the collation result. That is, the face collating process is repeatedly performed in order to form a user dictionary 303a by which a stable collation result can be obtained within a predetermined period. Therefore, update of the dictionary or termination of formation of the user dictionary 303a is notified on the basis of the collation result.

For example, as shown in FIG. 83, the stability of the user dictionary 303a is checked whenever the face collating process is performed (step S378). The guidance of update of the user dictionary 303a is displayed until the user dictionary 303a becomes stable (step S379). If the user dictionary 303a becomes stable, termination of formation of the user dictionary 303a is informed (step S380). As described above, the stability of the user dictionary 303a is checked on the basis of the collation failure ratio (the number of failures of face collation/the number of trials) or the continuity of a collation degree equal to or larger than a predetermined value.

If the user selects from the menu window the key 283 for designating update of the dictionary, the controller 301 of the personal computer 261 activates the dictionary updating program (step S381). When this dictionary updating program is activated, the controller 301 of the personal computer 261 updates the user dictionary 303a stored in the storage unit (step S382). This dictionary updating process is performed under the control of the controller 301 of the personal computer 261.

For example, if the result of the collating process indicates that the collation is unsuccessful, the controller 301 of the personal computer 261 displays a message for prompting dictionary update on the display 261a. When the user reads this message, he or she determines whether to update the dictionary. If the user decides to update the dictionary, he or she presses the key 283 for designating the start of dictionary update. Accordingly, the controller 301 of the personal computer 261 activates the dictionary updating program.

It is also possible to automatically execute dictionary update, instead of displaying the dictionary update message, when collation is unsuccessful. In this case, a function of activating the dictionary updating program on the basis of the collation result is incorporated into the face collating program. Consequently, the dictionary is updated on the basis of the collation result without any intervention of the user.

In the dictionary updating process, if the user decides to update the dictionary registered in the user dictionary 303a on the basis of the result of the face collating process, the dictionary is updated on the basis of a face pattern generated from a face image photographed in the collating process. For example, as this dictionary updating process, the updating method explained in the modification of the 13th embodiment is used. Therefore, the dictionary updating process is the same as the updating process explained in step S297 of FIG. 71, so a detailed description thereof will be omitted.

If the user selects from the menu window the key 284 for designating termination of dictionary formation, the controller 301 of the personal computer 261 terminates the formation of the user dictionary 303a, and displays guidance for terminating the formation of the user dictionary 303a or guidance for uploading the user dictionary 303a to the registration server 262 (step S383). In accordance with this guidance, the user uploads the formed user dictionary 303a.

The procedure shown in FIG. 83 explains the operation of the dictionary formation program formed by integrating all the functions such as dictionary registration, collation, dictionary update, and dictionary upload. However, the collating program and the dictionary updating program can also be separated and realized as application programs for releasing a lock of a screen saver. This saves the user the trouble of performing collation and facilitates performing collation at a predetermined frequency.

Also, the user dictionary 303a may be installed anywhere on the network connected to the information terminal 261 or the registration server 262. That is, as long as the information terminal 261 captures a user's face image and the registration server 262 integrates and edits individual user dictionaries, the processes such as collation and dictionary update may be performed by any apparatus on the network. Accordingly, the configuration of the dictionary registration system is preferably totally designed on the basis of the processing capability of each apparatus configuring the system, the communication capability of the network line, or the like.

For example, when an apparatus such as a cell phone having low processing capability is used as the information terminal 261, a large load is applied to this cell phone if collation with the user dictionary 303a, update of the user dictionary 303a, and upload of the user dictionary 303a to the registration server are performed on the cell phone. In this case, therefore, the cell phone may only capture a face image and transfer a compressed image to the registration server 262, and the registration server 262 may perform the rest.

In this arrangement, the user dictionary 303a is placed in the registration server 262. A face image capturing program is downloaded into the cell phone from the registration server 262. This cell phone which has downloaded the face image capturing program transmits only a face image to the registration server 262 whenever capturing a user's face image. When a face image is transmitted from the cell phone, the registration server 262 collates the face image with the user dictionary 303a, and returns only a message such as the collation result to the cell phone. The dictionary updating process is performed by the registration server 262. As a result, the cell phone need not perform the collating process and the process of uploading the user dictionary 303a to the registration server 262. With this processing, processes such as user dictionary 303a formation and registration can be efficiently performed even with an information terminal such as a cell phone having low processing capability.

As described above, a program for forming a user dictionary of each user is supplied, and a dictionary used in a face image collating apparatus is formed on the basis of the user dictionaries formed by individual users. Therefore, dictionary collation can be performed efficiently and inexpensively even for a large number of registrants. Also, dictionary registration is completed before the apparatus is installed, so the apparatus can start operating at once.

Furthermore, user dictionaries formed by individual users are collected across the network, integrated by a registration server, and registered as a dictionary used in a face image collating apparatus via a maintenance PC or the like. This can save the manager or the user of the face image collating apparatus the trouble of registering the dictionary, and make efficient dictionary formation feasible.

The 12th to 17th embodiments described above have the functions and effects independently of each other. However, it is of course also possible to practice these embodiments by combining them.

As has been described in detail above, the 12th to 17th embodiments can provide a face image collating apparatus and face image collating system capable of improving the collating performance and security level without deteriorating the merits of authentication by face collation, i.e., a very small load on users and high convenience, and also capable of further improving the convenience.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A person recognition apparatus, comprising:
an authentication data input unit which acquires authentication data from a person;
a dictionary storage which stores dictionary data for authentication;
a dictionary formation unit which forms first dictionary data for authentication on the basis of authentication data acquired from the person by said authentication data input unit;
an authenticator which, after the first dictionary data is formed by said dictionary formation unit, reacquires authentication data from the person by said authentication data input unit, and collates the reacquired authentication data from said authentication data input unit with the first dictionary data formed by said dictionary formation unit; and
a dictionary updating unit which, in a case where the collation by said authenticator is successful, updates the first dictionary data to second dictionary data by using the authentication data acquired by said authentication data input unit.

2. An apparatus according to claim 1, wherein in a case where the collation by said authenticator is unsuccessful, authentication data is reacquired from the person by said authentication data input unit, and subjected to collation performed by said authenticator.

3. An apparatus according to claim 1, wherein said dictionary updating unit updates the first dictionary data to the second dictionary data by using the first dictionary data and the authentication data acquired by said authentication data input unit after the dictionary data is formed by said dictionary formation unit.

4. A person recognition apparatus, comprising:
an authentication data input unit which acquires authentication data from a person;
a dictionary storage which stores dictionary data for authentication;
a display which displays the authentication data acquired by said authentication data input unit to a person to be authenticated;
a selector which selects whether to form dictionary data of the person to be authenticated on the basis of the authenticated data displayed on said display;
a dictionary formation unit which, in a case where said selector selects formation of the dictionary data, forms first dictionary data for authentication on the basis of the authentication data displayed on said display;
an authenticator which, after the first dictionary data is formed by said dictionary formation unit, reacquires authentication data from the person by said authentication data input unit, and collates the reacquired authentication data from said authentication data input unit with the first dictionary data formed by said dictionary formation unit; and
a dictionary updating unit which, in a case where the collation by said authenticator is successful, updates the first dictionary data to second dictionary data by using the authentication data acquired by said authentication data input unit.

5. An apparatus according to claim 4, wherein in a case where the collation by said authenticator is unsuccessful, authentication data is reacquired from the person by said authentication data input unit, and subjected to collation performed by said authenticator.

6. An apparatus according to claim 4, wherein said dictionary updating unit updates the first dictionary data to second dictionary data by using the first dictionary data and the authentication data acquired by said authentication data input unit after the dictionary data is formed by said dictionary formation unit.

7. A method of forming dictionary data for authentication to be used in a person recognition apparatus having an authentication data input unit which acquires authentication data from a person, a dictionary storage which stores dictionary data for authentication, and an authenticator, comprising:

forming first new dictionary data for authentication on the basis of authentication data acquired by the authentication data input unit from the person;

reacquiring authentication data from the person by the authentication data input unit, and collating the reacquired authentication data from the authentication data input unit with the formed first dictionary data, after the dictionary data is formed; and updating the first dictionary data second dictionary date by using the authentication data acquired by the authentication data input unit, in a case where this collation is successful.

* * * * *